(12) United States Patent
Takayama et al.

(10) Patent No.: US 11,929,557 B2
(45) Date of Patent: Mar. 12, 2024

(54) ANTENNA MODULE AND COMMUNICATION DEVICE EQUIPPED WITH THE SAME

(71) Applicant: Murata Manufacturing Co., Ltd., Nagaokakyo (JP)

(72) Inventors: Keisei Takayama, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 127 days.

(21) Appl. No.: 17/847,254

(22) Filed: Jun. 23, 2022

(65) Prior Publication Data

US 2022/0328983 A1  Oct. 13, 2022

Related U.S. Application Data

(63) Continuation of application No. PCT/JP2020/039810, filed on Oct. 23, 2020.

(30) Foreign Application Priority Data

Dec. 26, 2019 (JP) ................... 2019-236703

(51) Int. Cl.
*H01Q 21/30* (2006.01)
*H01Q 21/00* (2006.01)
(Continued)

(52) U.S. Cl.
CPC ......... *H01Q 21/30* (2013.01); *H01Q 21/0025* (2013.01); *H01Q 21/065* (2013.01); *H04M 1/026* (2013.01)

(58) Field of Classification Search
CPC .. H01Q 21/30; H01Q 21/0025; H01Q 21/065; H04M 1/026
See application file for complete search history.

(56) References Cited

U.S. PATENT DOCUMENTS

2004/0196203 A1* 10/2004 Lier ..................... H01Q 21/067
343/824

FOREIGN PATENT DOCUMENTS

JP          60-1014 U1    1/1985
JP       2000-269735 A   9/2000
(Continued)

OTHER PUBLICATIONS

International Search Report and Written Opinion dated Dec. 28, 2020, received for PCT Application PCT/JP2020/039810, filed on Oct. 23, 2020, 10 pages including English Translation.
(Continued)

*Primary Examiner* — Jimmy T Vu
(74) *Attorney, Agent, or Firm* — XSENSUS LLP

(57) ABSTRACT

An antenna module radiates radio waves upon receiving a radio-frequency signal output from an RFIC. The antenna module includes flat radiating elements that radiate radio waves in a first polarization direction, feed conductors that each supply a radio-frequency signal from the RFIC to an associated one of the radiating elements, and a ground electrode disposed opposite the radiating elements. As viewed from the RFIC, frequency characteristics of an impedance of the radiating element are different from frequency characteristics of an impedance of the radiating element. Under a condition a frequency band in which a return loss is less than or equal to a predetermined value is defined as an operable band width in each of the radiating elements, the operable band width of the radiating element partially overlaps the operable band width of the radiating element.

20 Claims, 47 Drawing Sheets

(51) Int. Cl.
*H01Q 21/06* (2006.01)
*H04M 1/02* (2006.01)

(56) References Cited

FOREIGN PATENT DOCUMENTS

| | | |
|---|---|---|
| JP | 2001-274620 A | 10/2001 |
| JP | 2003-198230 A | 7/2003 |
| JP | 2004-112397 A | 4/2004 |
| JP | 2018-56937 A | 4/2018 |
| WO | 2016/067969 A1 | 5/2016 |
| WO | 2019/188471 A1 | 10/2019 |

OTHER PUBLICATIONS

English translation of Written Opinion dated Dec. 28, 2020, corresponding PCT Application No. PCT/JP2020/039810, 4 pages.

\* cited by examiner

| | ANTENNA SIZE | ELEMENT SPACING GP | BAND WIDTH WB0 (RL:6dB) |
|---|---|---|---|
| COMPARATIVE EXAMPLE 1 | 27GHz/27GHz | 1.0mm | 3.0GHz |
| EXAMPLE 1-1 | 26GHz/28GHz | 1.0mm | 3.3GHz |
| EXAMPLE 1-2 | | 0.75mm | 3.4GHz |
| EXAMPLE 1-3 | | 0.50mm | 3.4GHz |
| EXAMPLE 1-4 | | 0.25mm | 3.8GHz |

|  | ANTENNA SIZE | ELEMENT SPACING GP | BAND WIDTH WB0 (RL:6dB) |
|---|---|---|---|
| COMPARATIVE EXAMPLE 2 | 27GHz/27GHz | 0.5mm | 6.4GHz |
| EXAMPLE 2-1 | 26GHz/28GHz | | 6.7GHz |
| EXAMPLE 2-1 | 25GHz/29GHz | | 7.9GHz |
| EXAMPLE 2-3 | 24GHz/30GHz | | 8.9GHz |

FIG.10

|  | POWER SUPPLY LINE LENGTH (SL1/SL2) | ANTENNA SIZE | ELEMENT SPACING GP | BAND WIDTH WB0 (RL:6dB) |
|---|---|---|---|---|
| COMPARATIVE EXAMPLE 3 | 2.5mm/2.5mm | 27GHz/27GHz | 2.2mm | 2.8GHz |
| EXAMPLE 3-1 | 4.0mm/3.0mm | | 2.2mm | 7.2GHz |
| EXAMPLE 3-2 | 1.5mm/3.5mm | | 1.0mm | 7.2GHz |
| EXAMPLE 3-3 | 2.5mm/3.5mm | | 0.75mm | 8.0GHz |

FIG.11

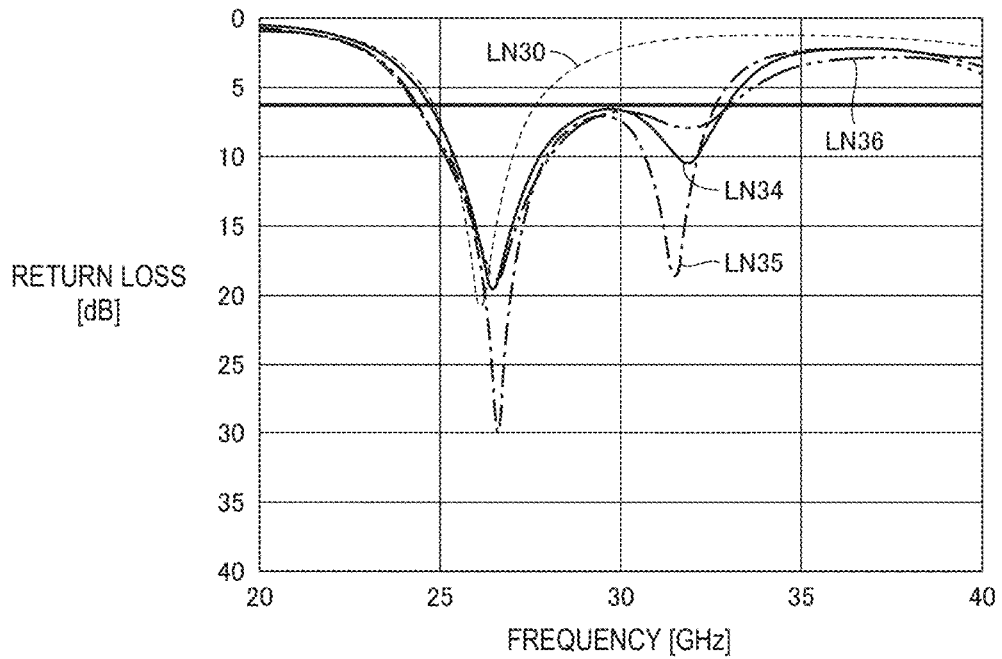

FIG.12

|  | POWER SUPPLY LINE LENGTH (SL1/SL2) | ANTENNA SIZE | ELEMENT SPACING GP | BAND WIDTH WB0 (RL:6dB) |
|---|---|---|---|---|
| COMPARATIVE EXAMPLE 3 | 2.5mm/2.5mm | 27GHz/27GHz | 2.2mm | 2.8GHz |
| EXAMPLE 3-4 | 4.0mm/3.0mm | | 2.2mm | 8.4GHz |
| EXAMPLE 3-5 | 1.5mm/3.5mm | 26GHz/28GHz | 1.0mm | 8.4GHz |
| EXAMPLE 3-6 | 2.5mm/3.5mm | | 0.75mm | 8.9GHz |

FIG.15

| | STUB LENGTH (ST1/ST2) | ANTENNA SIZE | ELEMENT SPACING GP | POWER SUPPLY LINE LENGTH (SL11(SL12)/SL21(SL22)) | BAND WIDTH WB0 (RL:6dB) |
|---|---|---|---|---|---|
| COMPARATIVE EXAMPLE 4 | NOT PROVIDED | 27GHz/27GHz | 2.2mm | 2.5mm/2.5mm | 2.9GHz |
| EXAMPLE 4-1 | 3.4mm/2.9mm | | 2.2mm | 1.3(1.2)mm/1.3(1.2)mm | 5.8GHz |
| EXAMPLE 4-2 | 3.7mm/3.0mm | | 2.2mm | 0.5(1.0)mm/0.5(1.0)mm | 7.1GHz |
| EXAMPLE 4-3 | 3.7mm/3.0mm | 26GHz/28GHz | 1.0mm | 0.5(1.0)mm/0.5(1.0)mm | 7.1GHz |
| EXAMPLE 4-4 | 3.8mm/3.3mm | | 0.75mm | 0.2(1.6)mm/0.2(1.6)mm | 8.6GHz |
| EXAMPLE 4-5 | 3.7mm/3.5mm | | 0.75mm | 2.6(2.5)mm/2.6(0.4)mm | 9.5GHz |

FIG.16
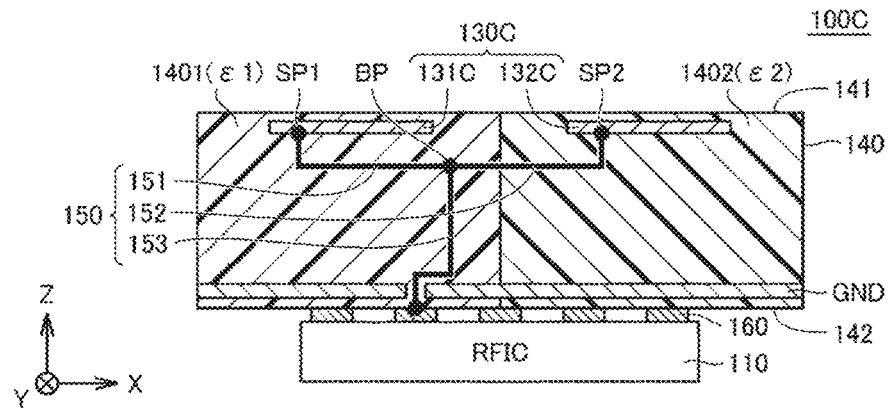
FIG.17
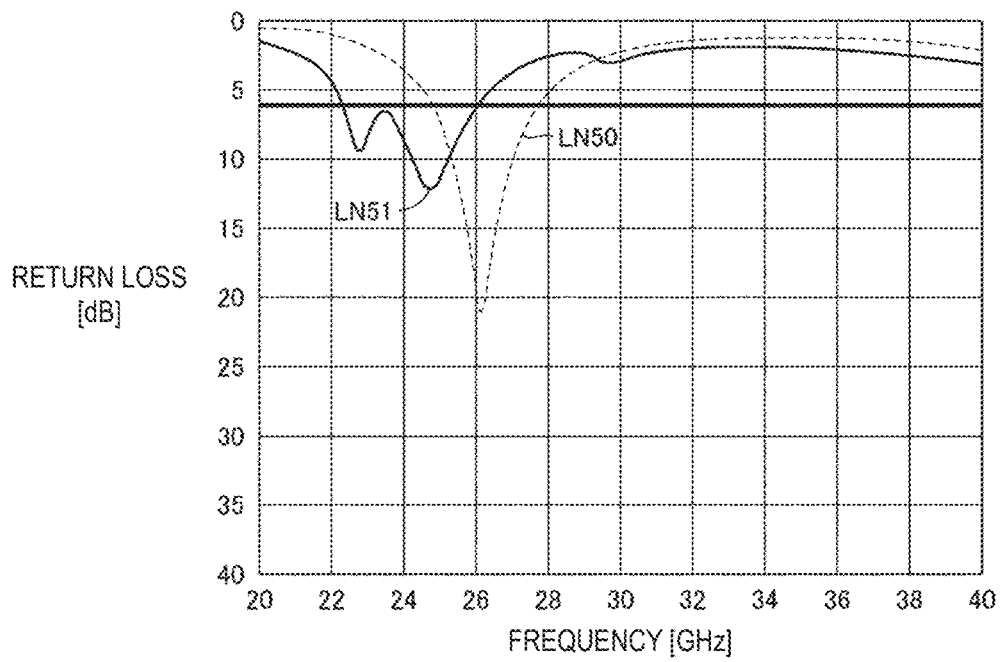
FIG.18
| | DIELECTRIC CONSTANT (ε1/ε2) | ANTENNA SIZE | ELEMENT SPACING GP | BAND WIDTH WB0 (RL:6dB) |
|---|---|---|---|---|
| COMPARATIVE EXAMPLE 5 | 2.9/2.9 | 27GHz/27GHz | 2.2mm | 2.9GHz |
| EXAMPLE 5 | 2.9/3.5 | | 0.75mm | 3.6GHz |

|  | POWER SUPPLY POINT SHIFT (SF1/SF2) | ANTENNA SIZE | ELEMENT SPACING GP | BAND WIDTH WB0 (RL:6dB) |
|---|---|---|---|---|
| COMPARATIVE EXAMPLE 6 | 0.7mm/0.7mm | 27GHz/27GHz | 2.2mm | 2.9GHz |
| EXAMPLE 6-1 | 1.3mm/0.7mm | 27GHz/27GHz | 2.2mm | 5.0GHz |
| EXAMPLE 6-2 | 1.3mm/0.7mm | 27GHz/27GHz | 0.75mm | 5.4GHz |
| EXAMPLE 6-3 | 1.3mm/0.7mm | 26GHz/28GHz | 2.2mm | 5.7GHz |
| EXAMPLE 6-4 | 1.3mm/0.7mm | 26GHz/28GHz | 0.75mm | 5.9GHz | ns
ANTENNA MODULE AND COMMUNICATION DEVICE EQUIPPED WITH THE SAME

CROSS-REFERENCE TO RELATED APPLICATIONS

The present application is a continuation of PCT/JP2020/039810, filed Oct. 23, 2020, which claims priority to Japanese patent application JP 2019-236703, filed Dec. 26, 2019; and contains subject matter related to U.S. Ser. No. 17/847,230, entitled ANTENNA MODULE AND COMMUNICATION DEVICE EQUIPPED WITH THE SAME, filed on Jun. 23, 2022, and U.S. Ser. No. 17/847,239, entitled ANTENNA MODULE AND COMMUNICATION DEVICE EQUIPPED WITH THE SAME, filed on Jun. 23, 2022, the entire contents of each of which being incorporated herein by reference.

TECHNICAL FIELD

The present disclosure relates to an antenna module and a communication device equipped with the same and, more specifically, to a structure for expanding the frequency band width of an antenna module.

BACKGROUND ART

Hitherto, there is known an antenna module in which a planar patch antenna is formed on or in a dielectric substrate. For example, International Publication No. 2016/067969 (Patent Document 1) describes an array antenna in which a plurality of patch antennas with the same shape is disposed at a constant pitch.

Japanese Unexamined Patent Application Publication No. 2000-269735 (Patent Document 2) describes a configuration in which, in an array antenna that includes a plurality of flat radiating elements arranged linearly on a dielectric substrate, the element width of the inner-side radiating elements is narrower than the element width of the outer-side radiating elements. With the configuration described in Japanese Unexamined Patent Application Publication No. 2000-269735 (Patent Document 2), the directivity gain of the inner-side radiating elements is higher than the directivity gain of the outer-side radiating elements, with the result that side lobes of radio waves to be radiated are reduced.

CITATION LIST

Patent Documents

Patent Document 1: International Publication No. 2016/067969
Patent Document 2: Japanese Unexamined Patent Application Publication No. 2000-269735

SUMMARY

Technical Problems

In recent years, mobile terminals, such as smartphones, become widespread, and, furthermore, home electronic appliances and electronic devices with mobile communication functions have been increasing due to technological innovation, such as IoT. As a result, communication traffic of wireless networks has been increasing, and there are concerns about a decrease in communication rate and communication quality.

As one of measures for solving such an inconvenience, development of a fifth generation mobile communication system (5G) has been proceeding. In 5G, advanced beam-forming and spatial multiplexing are performed by using a plurality of radiating elements, and an increase in communication rate and improvement in communication quality are intended to be achieved by using signals in a higher-frequency (several tens of GHz) millimeter wave band in addition to signals with frequencies in a 6 GHz band used as before.

When such a high frequency in a millimeter wave band is used, it is desired to implement a wide operating frequency band width in an antenna used for communication.

Specifically, in a 60 GHz band, an antenna is desired, as recognized by the present inventors, to operate with a 5 GHz frequency band width wider than an existing 3 GHz frequency band width.

The present disclosure is made to solve such an inconvenience, and as well as other issues, and thus at least one objective of the present disclosure to expand a frequency band width in an antenna module in which radiating elements are arranged in an array.

Solutions to Problems

According to the present disclosure, an antenna module radiates radio waves upon receiving a radio-frequency signal output from a feed circuit. The antenna module includes a first radiating element that is flat and a second radiating element that is flat which radiate radio waves in a first polarization direction, a first feed conductor that supplies a radio-frequency signal from the feed circuit to the first radiating element, a second feed conductor that supplies a radio-frequency signal from the feed circuit to the second radiating element, and a ground electrode disposed opposite the first radiating element and the second radiating element. When viewed from the feed circuit, frequency characteristics of an impedance of the first radiating element are different from frequency characteristics of an impedance of the second radiating element. Under a condition a frequency band in which a return loss is less than or equal to a predetermined value is defined as an operable band width in each of the radiating elements, the operable band width of the first radiating element partially overlaps the operable band width of the second radiating element.

Advantageous Effects of the Disclosure

With the antenna module of the present disclosure, two radiating elements disposed adjacent to each other are formed such that the frequency characteristics of the impedances are different from each other, and the operable band widths partially overlap. With such a configuration, by supplying a common radio-frequency signal to the two radiating elements, the frequency band width of the overall antenna module is a combination of the frequency band widths of the radiating elements. Therefore, the frequency band width in the antenna module is expanded.

BRIEF DESCRIPTION OF DRAWINGS

FIG. 10 is a second view for illustrating operable band widths in Example 3 and Comparative Example 3.

FIG. 11 is a third view for illustrating operable band widths in Example 3 and Comparative Example 3.

FIG. 12 is a fourth view for illustrating operable band widths in Example 3 and Comparative Example 3.

FIG. 15 is a second view for illustrating operable band widths in Example 4 and Comparative Example 4.

FIG. 16 is a side see-through view of an antenna module according to Example 5.

FIG. 17 is a first view for illustrating operable band widths in Example 5 and Comparative Example 5.

FIG. 18 is a second view for illustrating operable band widths in Example 5 and Comparative Example 5.

DESCRIPTION OF EMBODIMENTS

Figure 1:
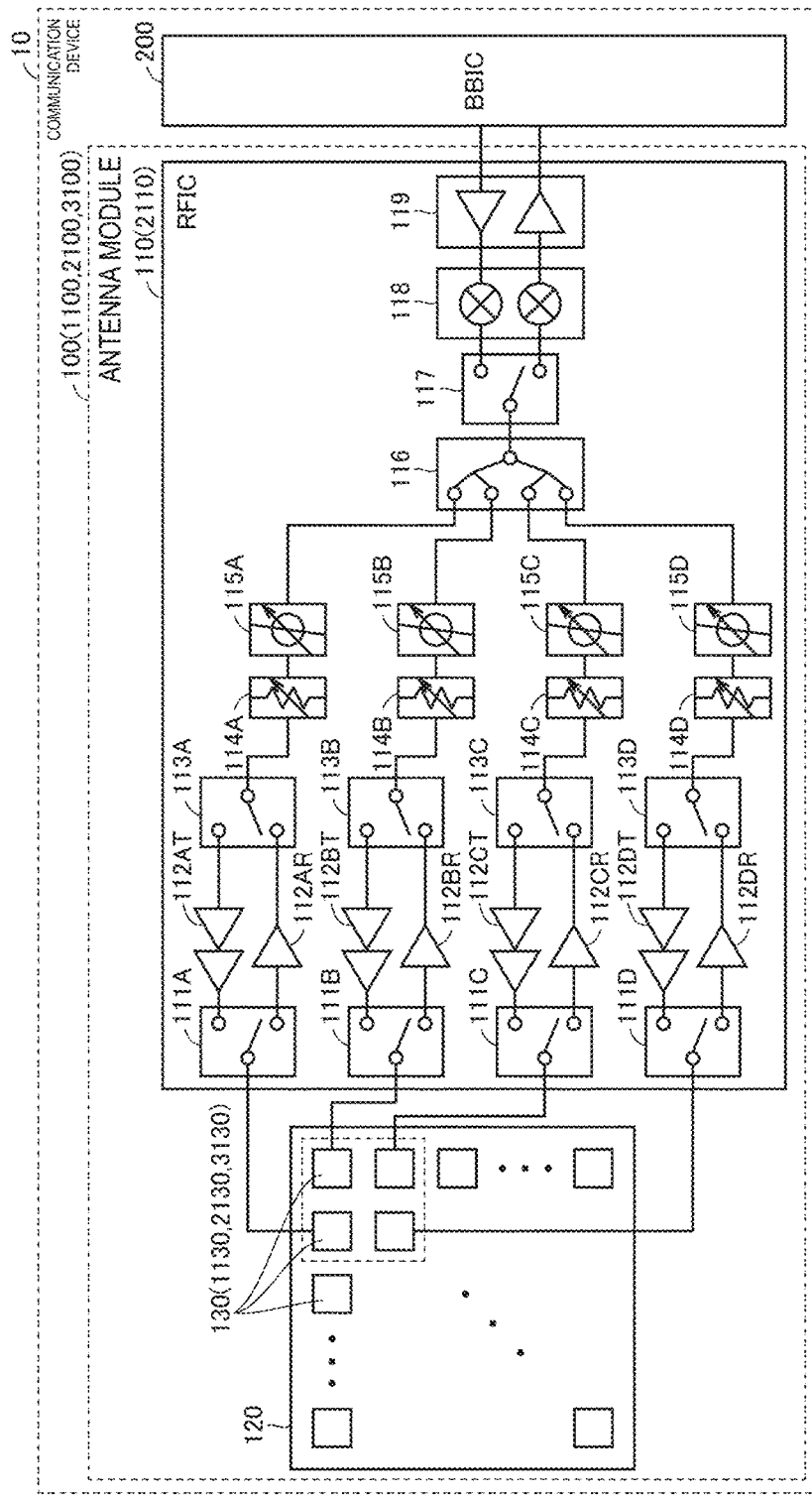
FIG. 1 is a block diagram of a communication device to which an antenna module according to a first embodiment is applied.

Hereinafter, embodiments of the present disclosure will be described in detail with reference to the drawings. Like reference signs denote the same or corresponding portions in the drawings, and the description thereof will not be repeated.

First Embodiment

<Basic Configuration of Communication Device>

FIG. 1 is an example of a block diagram of a communication device 10 to which an antenna module 100 according to a first embodiment is applied. Examples of the communication device 10 include a mobile terminal, such as a cellular phone, a smartphone, and a tablet, and a personal computer with a communication function. One example of the frequency band of radio waves used in the antenna module 100 according to the present embodiment is, for example, radio waves in a millimeter wave band with a center frequency of 28 GHz, 39 GHz, 60 GHz, or the like, and is also applicable to radio waves in a frequency band other than the above.

As shown in FIG. 1, the communication device 10 includes the antenna module 100, and a BBIC 200 that makes up a baseband signal processing circuit. The antenna module 100 includes an RFIC 110 that is an example of a feed circuit, and an antenna apparatus 120. While the present disclosure sometimes uses the term "power supply circuit" as part of the antenna module, it should be understood that it is an antenna feed circuit. Similarly, feed conductors and conductors should be construed as antenna feeds (e.g., conductors or waveguides). The communication device 10 up-converts a signal transmitted from the BBIC 200 to the antenna module 100 to a radio-frequency signal and radiates the radio-frequency signal from the antenna apparatus 120, and down-converts a radio-frequency signal received by the antenna apparatus 120 and processes the signal in the BBIC 200.

In FIG. 1, for easy illustration, among a plurality of sub-arrays 130 that make up the antenna apparatus 120, only the configuration corresponding to four sub-arrays 130 is shown, and the configuration corresponding to the other sub-arrays 130 with a similar configuration is omitted. At least one radiating element is included in the sub-array 130.

FIG. 1 shows an example in which the antenna apparatus 120 is made up of the plurality of sub-arrays 130 arranged in a two-dimensional array. However, the number of sub-arrays 130 does not always need to be multiple, and the antenna apparatus 120 may be made up of a single sub-array 130. The antenna apparatus 120 may be made up of a plurality of sub-arrays 130 arranged in a one-dimensional array in which the plurality of sub-arrays 130 is arranged in a line. In the first embodiment, the radiating element included in the sub-array 130 is a substantially square flat patch antenna.

The RFIC 110 includes switches 111A to 111D, 113A to 113D, 117, power amplifiers 112AT to 112DT, low-noise amplifiers 112AR to 112DR, attenuators 114A to 114D, signal phase shifters 115A to 115D, a signal combiner/splitter 116, a mixer 118, and an amplifier circuit 119.

When a radio-frequency signal is transmitted, the switches 111A to 111D, 113A to 113D are switched to the power amplifiers 112AT to 112DT, and the switch 117 is connected to a transmission-side amplifier of the amplifier circuit 119. When a radio-frequency signal is received, the switches 111A to 111D, 113A to 113D are switched to the low-noise amplifier 112AR to 112DR, and the switch 117 is connected to a receiving-side amplifier of the amplifier circuit 119.

A signal transmitted from the BBIC 200 is amplified by the amplifier circuit 119 and up-converted by the mixer 118. A transmission signal that is an up-converted radio-frequency signal is split into four by the signal combiner/splitter 116, and the four transmission signals respectively pass through four signal paths and are supplied to the different sub-arrays 130. At this time, the directivity of the antenna apparatus 120 is able to be adjusted by individually adjusting the signal phase shift degree of each of the signal phase shifters 115A to 115D respectively disposed in the signal paths.

Reception signals that are radio-frequency signals respectively received by the radiating elements of each of the sub-arrays 130 respectively pass through four different signal paths and are combined with one another by the signal combiner/splitter 116. The combined reception signal is down-converted by the mixer 118, amplified by the amplifier circuit 119, and transmitted to the BBIC 200.

The RFIC 110 is formed as, for example, a one-chip integrated circuit component that includes the above-described circuit configuration. Alternatively, devices (switch, power amplifier, low-noise amplifier, attenuator, and signal phase shifter) associated with each sub-array 130 in the RFIC 110 may be formed as one-chip integrated circuit component for each associated sub-array 130.

<Configuration of Antenna Module>

Example 1

Figure 2:
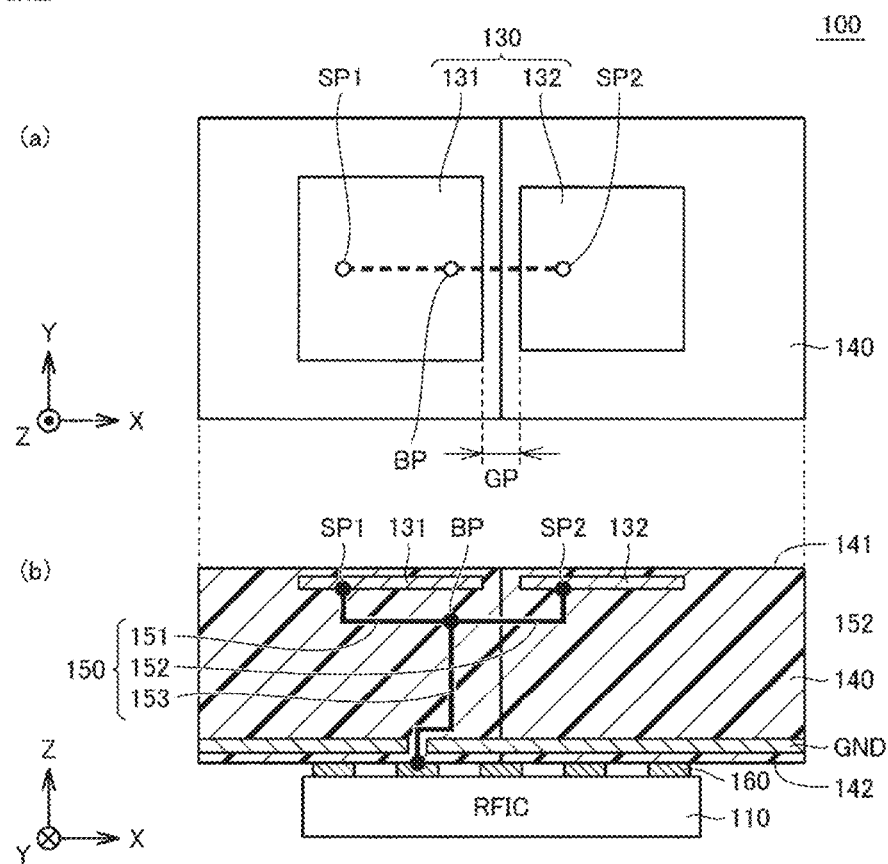
FIG. 2 shows a plan view and side see-through view of an antenna module according to Example 1 of the first embodiment.

Next, the detailed configuration of the antenna module 100 in Example 1 of the first embodiment will be described with reference to FIG. 2. FIG. 2 shows a plan view (FIG. 2(a)) and a side see-through view (FIG. 2(b)) of the antenna module 100.

As shown in FIG. 2, the antenna module 100 includes the RFIC 110, radiating elements 131, 132, a dielectric substrate 140, a feed conductor 150, and a ground electrode GND. In the following description, in each of the drawings, a positive direction of a Z-axis may be referred to as top surface side, and a negative direction may be referred to as bottom surface side.

The dielectric substrate 140 is, for example, low temperature co-fired ceramic (LTCC) multilayer resin substrate, a multilayer resin substrate formed by laminating multiple resin layers made of resin, such as epoxy and polyimide, a multilayer resin substrate formed by laminating multiple resin layers made of liquid crystal polymer (LCP) with a lower dielectric constant, a multilayer resin substrate formed by laminating multiple resin layers made of fluorine-based resin, or a ceramic multilayer substrate other than LTCC. The dielectric substrate 140 does not necessarily have a multilayer structure and may be a single-layer substrate.

The dielectric substrate 140 has a rectangular planar shape. The radiating elements 131, 132 are disposed in an inside layer or on a top surface-side surface 141 of the dielectric substrate 140. In the dielectric substrate 140, a flat ground electrode GND is disposed in a layer on the bottom surface side with respect to the radiating elements 131, 132. The RFIC 110 is disposed via a solder bump 160 on a bottom surface-side back surface 142 of the dielectric substrate 140.

The radiating elements 131, 132 are substantially square flat patch antennas and are disposed adjacent to each other in an X-axis direction. In FIG. 2, an element spacing GP is a distance between the radiating element 131 and the radiating element 132 when the antenna module 100 is viewed in plan. In the antenna module 100 of Example 1, the element size of the radiating element 131 is larger than the element size of the radiating element 132. In other words, the resonant frequency of the radiating element 131 is lower than the resonant frequency of the radiating element 132. In the following description, the element size of a radiating element may be expressed by using the resonant frequency of the radiating element.

The feed conductor 150 includes a wire 151, a wire 152, and a common wire 153. The common wire 153 extends from the solder bump 160 for electrically connecting the RFIC 110 through the ground electrode GND and is upright in the dielectric substrate 140, and is bifurcated at a branch point BP into the wire 151 and the wire 152.

The wire 151 is coupled to a feed point SP1 of the radiating element 131. The wire 152 is coupled to a feed point SP2 of the radiating element 132. In Example 1, the length of the wire 151 and the length of the wire 152 are set to the same length. For coupling of the wire 151 with the radiating element 131 and coupling of the wire 152 with the radiating element 132, a wire may be directly connected to a radiating element as shown in FIG. 2 or may be capacitively coupled to a radiating element in a noncontact manner.

The feed point SP1 of the radiating element 131 is disposed at a location offset in a negative direction of the X-axis from the center of the radiating element 131. The feed point SP2 of the radiating element 132 is also disposed at a location offset in the negative direction of the X-axis from the center of the radiating element 132. By disposing a feed point at such a location, radio waves with the X-axis direction as a polarization direction are radiated from each radiating element.

In FIG. 2, conductors that make up vias and the like that form a radiating element, an electrode, and a feed conductor are made of metal that mainly contains aluminum (Al), copper (Cu), gold (Au), silver (Ag), and alloys of these metals as a main ingredient.

In recent years, communication traffic in wireless communication increases as a result of the widespread use of mobile terminals, such as smartphones, and technological innovation, such as IoT, and there are concerns about a decrease in communication rate and communication quality. As one of measures for solving such an inconvenience, development of a fifth generation mobile communication system (5G) has been proceeding. In 5G, advanced beamforming and spatial multiplexing are performed by using a plurality of radiating elements, and an increase in communication rate and improvement in communication quality are intended to be achieved by using signals in a higher-frequency (several tens of GHz) millimeter wave band in addition to signals with frequencies in a 6 GHz band used as before. When such a high frequency in a millimeter wave band is used, it is desired to implement a wide operating frequency band width in an antenna used for communication.

Generally, in a patch antenna, a return loss is minimum when the frequency (hereinafter, also referred to as "drive frequency") of a radio-frequency signal to be supplied coincides with the resonant frequency of an element, and a return loss tends to increase as the drive frequency deviates from the resonant frequency. In the antenna module of Example 1 of the first embodiment, a common radio-frequency signal is supplied to two radiating elements disposed adjacent to each other and having different element sizes. The two radiating elements have different element sizes, so the resonant frequencies are different from each other. In addition, the two radiating elements are set such that frequency bands in which the radiating elements are respectively operable overlap each other. With such a configuration, in comparison with the case where radiating elements with the same element sizes are used, the frequency band width of the overall antenna module is expanded.

Figure 3:
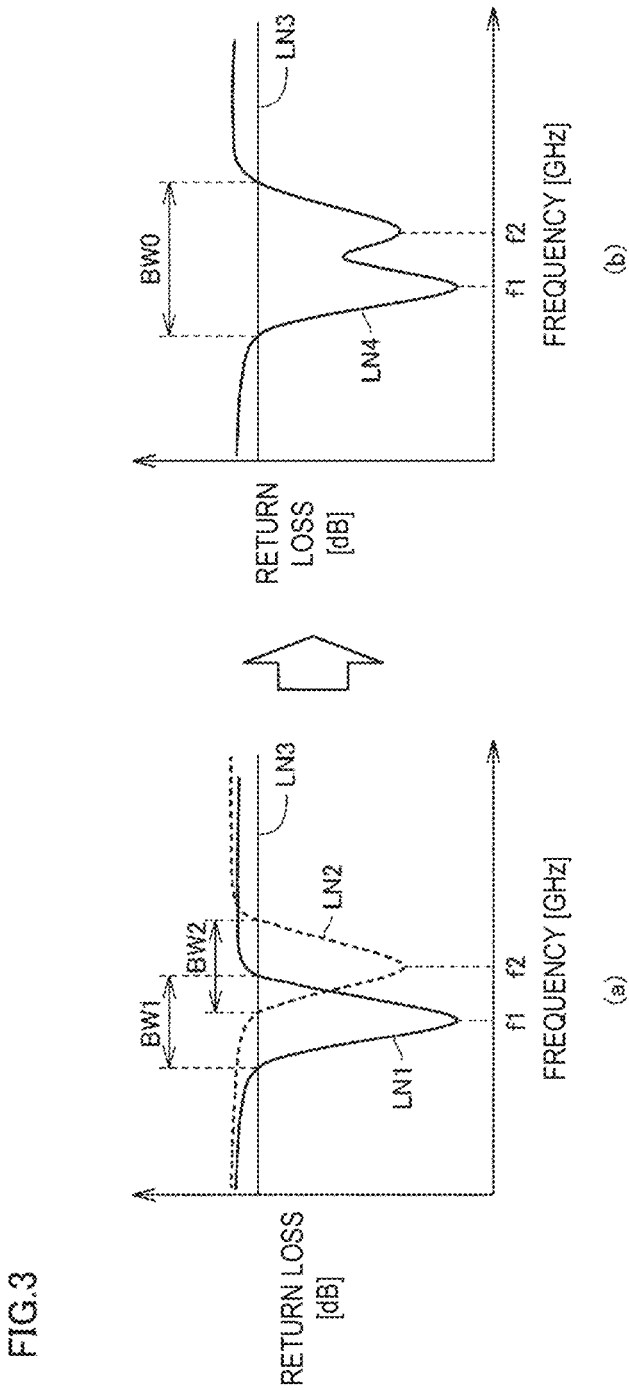
FIG. 3 shows a view for illustrating the principle in which a frequency band width expands in the first embodiment.

Next, the principle in which the frequency band width expands in the first embodiment will be described with reference to FIG. 3. Where the resonant frequency of the radiating element 131 and the resonant frequency of the radiating element 132 are respectively f1 and f2 (f1<f2), the frequency characteristics of the impedances of the radiating elements are different when viewed from the branch point BP, the return loss of the radiating element 131 and the return loss of the radiating element 132 are respectively represented by the line LN1 (continuous line) and the line LN2 (dashed line) as shown in FIG. 3(a). At this time, when a threshold at which the return loss becomes a predetermined value (for example, 6 dB) is determined as in the case of the line LN3 and the region in which the return loss is lower than the threshold is defined as "operable band width", the operable band width of the radiating element 131 is BW1, and the operable band width of the radiating element 132 is BW2.

Here, as shown in FIG. 3(a), when the operable band widths of the two radiating elements 131, 132 are set so as to partially overlap, the return loss of the overall antenna module 100 becomes a state (line LN4) where the return losses of the radiating elements are superposed as shown in FIG. 3(b). Thus, the operable band width BW0 of the overall antenna module 100 ranges from the lower limit of the operable band width of the radiating element 131 to the upper limit of the operable band width of the radiating element 132. In this way, with the configuration in which a common radio-frequency signal is supplied to the two radiating elements of which the operable band widths partially overlap, the frequency band width of the antenna module is able to be expanded as compared to when radiating elements with the same size are used.

Figures 4, 5:
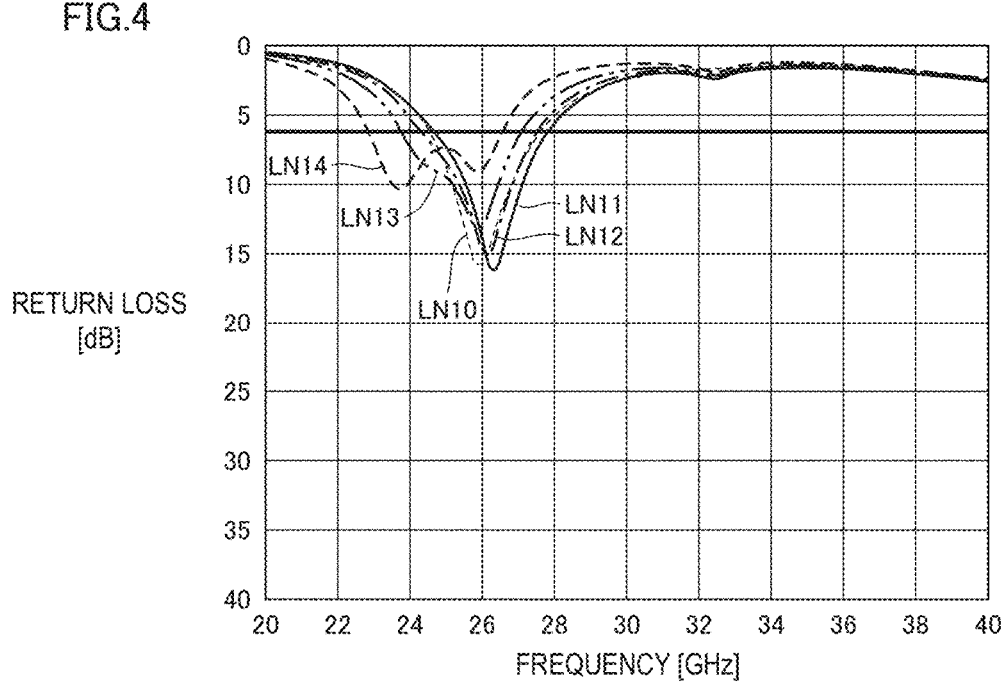
FIG. 4 is a first view for illustrating operable band widths in Example 1 and Comparative Example 1.
FIG. 5 is a second view for illustrating operable band widths in Example 1 and Comparative Example 1.

FIG. 4 and FIG. 5 are views for illustrating simulation results in Example 1 and Comparative Example 1. FIG. 4 is a graph showing the frequency characteristics of return losses. FIG. 5 is a table showing those read from the operable band width BW0 in each of the simulation results of FIG. 4.

In FIG. 4 and FIG. 5, the case where two radiating elements have the same element size (27 GHz/27 GHz) is shown as Comparative Example 1, and simulation results in the case where the element spacing GP of two radiating elements with different element sizes (26 GHz/28 GHz) is varied are shown in Examples 1-1 to 1-4. Specifically, in FIG. 4, the line LN10 (dashed line) represents the case of Comparative Example 1, and the line LN11 (continuous line) represents the case (Example 1-1) where the element sizes are varied with the same element spacing (1.0 mm) as Comparative Example 1. In FIG. 4, the line LN12 (alternate long and short dashed line), the line LN13 (alternate long and two-short dashed line), and the line LN14 (dashed line) respectively represent the cases where the element spacing GP is narrowed in order of 0.75 mm (Example 1-2), 0.50 mm (Example 1-3), and 0.25 mm (Example 1-4). In this Example, the case where the element spacing GP is 0.75 mm corresponds to ¼ of the element size, the case where the element spacing GP is 0.50 mm corresponds to ⅙ of the element size, and the case where the element spacing GP is 0.25 mm corresponds to 1/12 of the element size.

It appears from FIG. 4 and FIG. 5 that, when two radiating elements with different element sizes are used with the same element spacing 1.0 mm, the operable band width BW0 with which the return loss is lower than or equal to 6 dB is expanded from 3.0 GHz to 3.3 GHz. It also appears that, when the element spacing GP is narrowed in the case where the radiating elements with different element sizes are used, the operable band width BW0 is further expanded.

However, as the element spacing GP is narrowed, the strength of coupling between the radiating elements increases, with the result that the return loss at a part between two valleys (an overlapped part of the operable band widths) in a return loss graph gradually increases. Therefore, when the element spacing GP is narrowed too much, the operable band width BW0 contrarily narrows. When radiating elements respectively corresponding to 26 GHz and 28 GHz are used as in the case of Example 1, the element spacing GP is preferably greater than or equal to $\frac{1}{12}$ of the element size of the higher frequency-side radiating element 132. When viewed in plan in a direction normal to the antenna module 100, the center-to-center distance between the radiating element 131 and the radiating element 132 is preferably set to less than or equal to a half of the wave length of radio waves to be radiated from the radiating element 131.

As described above, with a configuration in which a common radio-frequency signal is supplied to two radiating elements that have mutually different element sizes and of which the operable band widths partially overlap, the frequency band width of an antenna module is able to be expanded.

Example 2

In the example of FIG. 4 and FIG. 5 in Example 1, the frequency band width in the case where the element spacing is changed in a state where the element sizes of two radiating elements are fixed has been described. In Example 2, the frequency band width in the case where the element sizes of two radiating elements are changed in a state where the element spacing is fixed will be described.

Figures 6, 7:
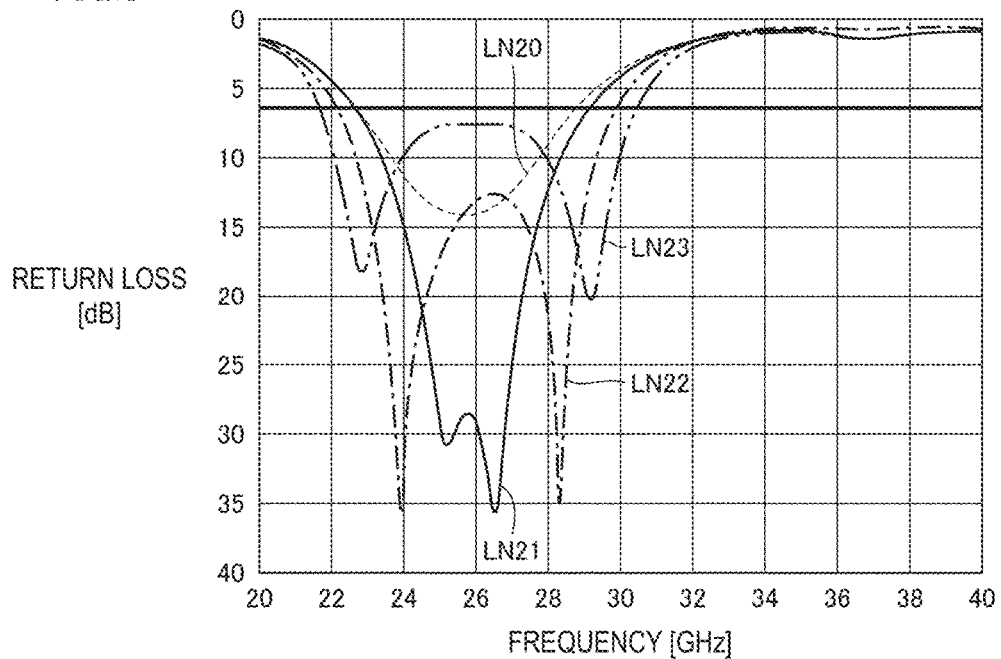
FIG. 6 is a first view for illustrating operable band widths in Example 2 and Comparative Example 2.
FIG. 7 is a second view for illustrating operable band widths in Example 2 and Comparative Example 2.

FIG. 6 and FIG. 7 are views for illustrating simulation results in Example 2 and Comparative Example 2. FIG. 6 is a graph showing the frequency characteristics of return losses. FIG. 7 is a table showing those read from the operable band width BW0 in each of the simulation results of FIG. 6.

In FIG. 6 and FIG. 7, the case where the element spacing GP between two radiating elements is fixed to 0.5 mm and the two radiating elements have the same element size (27 GHz/27 GHz) is shown as Comparative Example 2 (the line LN20 of FIG. 7: dashed line), the case where the element sizes are 26 GHz/28 GHz is shown as Example 2-1 (the line LN21 of FIG. 7: continuous line), the case where the element sizes are 25 GHz/29 GHz is shown as Example 2-(the line LN22 of FIG. 7: alternate long and short dashed line), and the case where the element sizes are 24 GHz/30 GHz is shown as Example 2-3 (the line LN23 of FIG. 7: alternate long and two-short dashed line).

As is apparent from FIG. 6 and FIG. 7, it appears that, as the difference in element size (that is, the difference in resonant frequency) increases, the operable band width BW0 expands. However, as shown in FIG. 6, for the region between two valleys of the return loss, the return loss increases with an increase in the difference in element size. This is because the overlap range of the operable band widths of the two radiating elements is reduced, and, when the operable band widths of the two radiating elements do not overlap any more, there occurs a region in which a desired return loss is not achieved at frequencies between two valleys. In other words, within the range in which the operable band widths of the two radiating elements overlap, the frequency band width is further expanded by increasing the difference in element size.

Example 3

In Example 1 and Example 2, the configuration in which the frequency characteristics of the impedances of two radiating elements are varied by using two radiating elements with different element sizes has been described.

In Example 3, a configuration in which the frequency characteristics of the impedances of radiating elements are varied by varying the lengths of feed conductors respectively connected to two radiating elements will be described.

Figure 8:
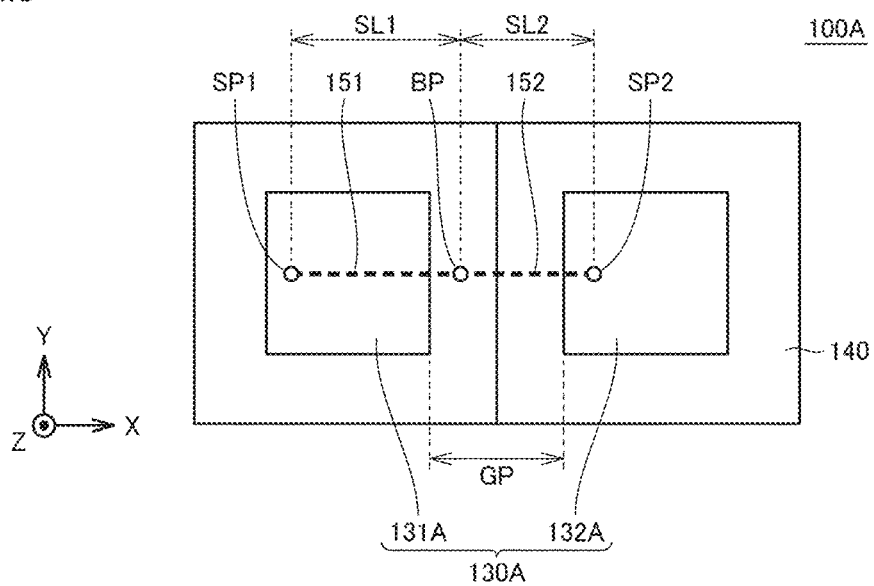
FIG. 8 is a plan view of an antenna module according to Example 3.

FIG. 8 is a plan view of an antenna module 100A according to Example 3. In the antenna module 100A, radiating elements 131A, 132A that make up a sub-array 130A have the same element size. However, in the feed conductor 150, the length from the branch point BP to each feed point, that is, the length SL1 of the wire 151 and the length SL2 of the wire 152 are different. When the wire length from the branch point BP to the feed point SP1 and the length from the branch point BP to the feed point SP2 are varied to vary the inductances of the wires, the frequency characteristics of the impedances of the radiating elements when viewed from the branch point BP are set to different values. Thus, the operable band widths of the radiating elements partially overlap, so the frequency band width of the overall antenna module is expanded as described in FIG. 3.

In FIG. 8, for the sake of easy illustration, the linear distance in the X-axis direction between the branch point BP and the feed point SP1 and the linear distance in the X-axis direction between the branch point BP and the feed point SP2 when viewed in plan in a direction normal to the antenna module 100A are respectively indicated by SL1 and SL2; however, actually, the wire length in the Z-axis direction and the wire length in the Y-axis direction are considered.

Figure 9:
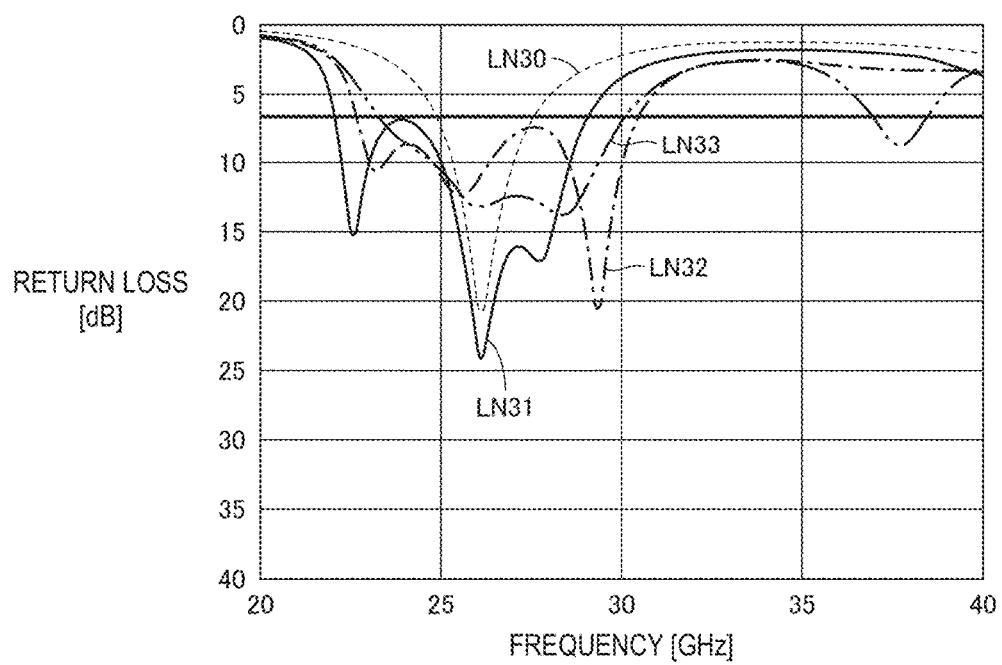
FIG. 9 is a first view for illustrating operable band widths in Example 3 and Comparative Example 3.

FIG. 9 and FIG. 10 are views for illustrating simulation results in Example 3 and Comparative Example 3. FIG. 9 is a graph showing the frequency characteristics of return losses. FIG. 10 is a table showing those read from the operable band width BW0 in each of the simulation results of FIG. 9.

In simulation of FIG. 9 and FIG. 10, the element sizes of two radiating elements each are set to the same 27 GHz. The case where the wire length SL1 from the branch point BP and the wire length SL2 from the branch point BP each are 2.5 mm is shown as Comparative Example 3 (the line LN30 of FIG. 9: dashed line), the case where the wire length SL1 and the wire length SL2 are respectively 4.0 mm and 3.0 mm is shown as Example 3-1 (the line LN31 of FIG. 9: continuous line), the case where the wire length SL1 and the wire length SL2 are respectively 1.5 mm and 3.5 mm is shown as Example 3-2 (the line LN32 of FIG. 9: alternate long and short dashed line), and the case where the wire length SL1 and the wire length SL2 are respectively 2.5 mm and 3.5 mm is shown as Example 3-3 (the line LN33 of FIG. 9: alternate long and two-short dashed line). In Examples, when the element spacing GP is varied in order of 2.2 mm, 1.0 mm, and 0.75 mm, the wire lengths are adjusted such that the operable band width of the overall antenna module is the widest.

As shown in FIG. 9 and FIG. 10, the operable band width BW0 is 2.8 GHz in the case of Comparative Example 3 in which the wire lengths are the same, whereas the operable band widths BW0 in the case of Examples 3-1, 3-2, 3-3 are respectively 7.2 GHz, 7.2 GHz, and 8.0 GHz. In other words, even when two radiating elements with the same element size are used, the operable band width BW0 is expanded by varying the lengths of feed conductors.

FIG. 11 and FIG. 12 are views for illustrating simulation results in the case where the element sizes of two radiating elements are further varied in the case of the same wire length and the same element spacing as Example 3-1 to Example 3-3 shown in FIG. 10.

Example 3-4 is an example in which the element size of the radiating element 131A is 26 GHz and the element size of the radiating element 132A is 28 GHz in the case where the wire lengths (SL1, SL2)=(4.0 mm, 3.0 mm) and the element spacing GP is 2.2 mm as in the case of Example 3-1 (the line LN34 of FIG. 11: continuous line). It appears that the operable band width BW0 in this case is 8.4 GHz and the operable band width BW0 is further expanded as compared to the case of Example 3-1 (7.2 GHz).

Similarly, in the case of Example 3-5 (the line LN35 of FIG. 11: alternate long and short dashed line) as well, the operable band width BW0 is further expanded as compared to the case of Example 3-2. Then, in the case of Example 3-6 (the line LN36 of FIG. 11: alternate long and two-short dashed line) as well, the operable band width BW0 is further expanded as compared to the case of Example 3-3.

In this way, the overall frequency band width of the antenna module is much further expanded by combining the configuration in which the element sizes of two radiating elements described in Example 1 and Example 2 are varied with the configuration in which the wire length from the branch point to each of the radiating elements is varied.

Example 4

In Example 4, a configuration in which the frequency characteristics of the impedances of radiating elements are varied by disposing a stub in each of feed conductors respectively connected to two radiating elements will be described.

Figure 13:
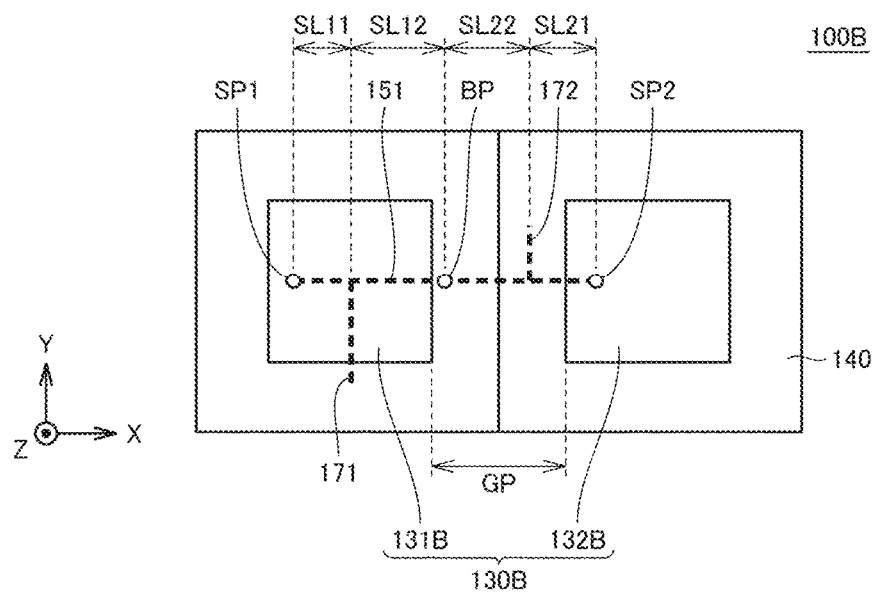
FIG. 13 is a plan view of an antenna module according to Example 4.

FIG. 13 is a plan view of an antenna module 100B according to Example 4. In the antenna module 100B, radiating elements 131B, 132B that make up a sub-array 130B have the same element size. In the feed conductor 150, the length from the branch point BP to each feed point is set to the same length. On the other hand, in the antenna module 100B, a stub 171 is disposed in the wire 151 from the branch point BP to the feed point SP1, and a stub 172 is disposed in the wire 152 from the branch point BP to the feed point SP2.

The stub 171 is disposed at a location at a distance SL12 from the branch point BP (a location at a distance SL11 from the feed point SP1) in the wire 151. The stub 172 is disposed at a location at a distance SL22 from the branch point BP (a location at a distance SL21 from the feed point SP2) in the wire 152.

These stubs 171, 172 are not provided to block the frequency bands of the other-side radiating elements and are provided to adjust impedance matching between the RFIC 110 and each radiating element. In other words, even when radiating elements have the same element sizes and the same wire lengths, the frequency characteristics of the impedances of two radiating elements can be adjusted by varying the length of the stub and/or the location of the stub in the feed conductor. An extremum at which the return loss is minimum is added by disposing a stub, so generation of the extremum also contributes to expanding the frequency band.

Figure 14:
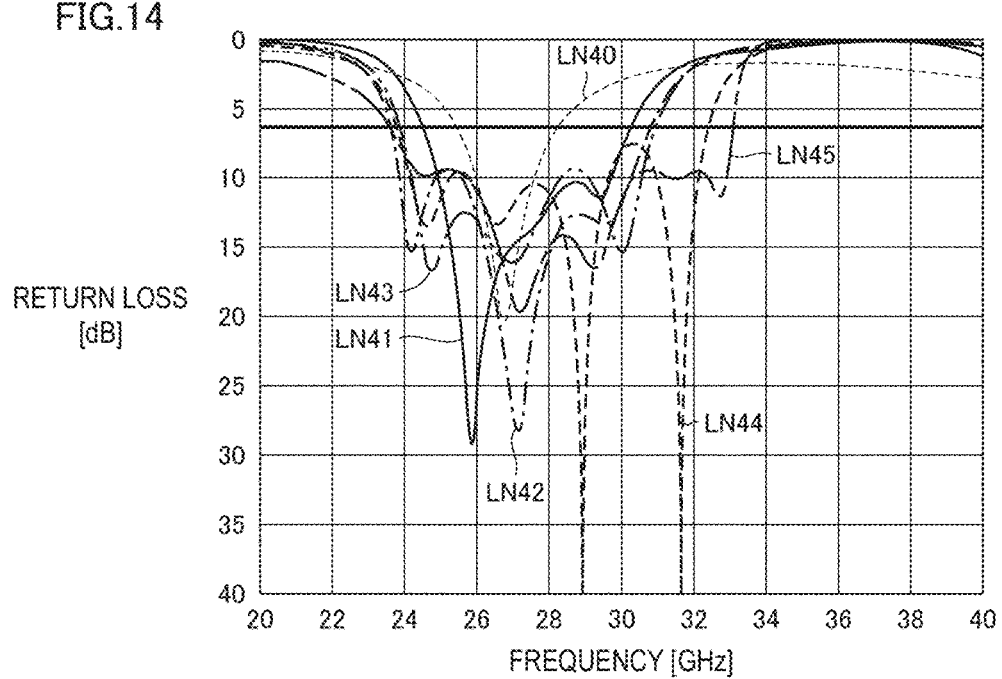
FIG. 14 is a first view for illustrating operable band widths in Example 4 and Comparative Example 4.

FIG. 14 and FIG. 15 are views for illustrating simulation results in Example 4 and Comparative Example 4. FIG. 14 is a graph showing the frequency characteristics of return losses. FIG. 15 is a table showing those read from the operable band width BW0 in each of the simulation results of FIG. 14.

In FIG. 14 and FIG. 15, Comparative Example 4 is an example in which the element size and the wire length both are the same and no stub is disposed (the line LN40 of FIG. 14: dashed line), and Example 4-1 is an example in which stubs with different lengths are respectively disposed at the same locations in the wires (the line LN41 of FIG. 14: continuous line). In Comparative Example 4 and Example 4-1, the radiating elements 131B, 132B are disposed such that the element spacing GP is the same size.

When Comparative Example 4 and Example 4-1 are compared with each other, the operable band width BW0 in which the return loss is lower than 6 dB is 2.9 GHz in the case of Comparative Example 4 and is expanded to 5.8 GHz in the case of Example 4-1. Therefore, when the frequency characteristics of the impedances are changed by disposing mutually different stubs in feed conductors branching off from the branch point BP, the frequency band of the overall antenna module 100B is expanded.

In FIG. 14 and FIG. 15, Example 4-2 to Example 4-4 are examples in the case where, in addition to addition of stubs, radiating elements with different element sizes are further used. Example 4-2 (the line LN42 of FIG. 14: alternate long and short dashed line) is an example in the case where radiating elements with different element sizes with the same element spacing as Example 4-1 are used. In Example 4-2, a stub associated with each radiating element is disposed at the same distance from the branch point BP and is disposed at a location different from that of Example 4-1.

Example 4-3 (the line LN43 of FIG. 14: alternate long and two-short dashed line) is an example in which the element spacing GP is further narrowed as compared to Example 4-2. Example 4-4 (the line LN44 of FIG. 14: dashed line) is an example in which the locations of the stubs are changed and the element spacing GP is further narrowed as compared to Example 4-3. Example 4-5 (the line LN45 of FIG. 14: alternate long and short dashed line) is an example in which the location of the stub on the radiating element 131B side and the location of the stub on the radiating element 132B side are varied with the same element spacing GP as in the case of Example 4-4. In each Example, the length of each stub is adjusted as needed in order to match impedance.

As shown in the simulation results of Example 4-2 to Example 4-4, the operable band width BW0 is expanded by using radiating elements with different element sizes in addition to the arrangement of stubs. The operable band width BW0 is further expanded by narrowing the element spacing GP and/or respectively disposing stubs at different locations in the feed conductors for two radiating elements.

As described above, the frequency band width of the overall antenna module is expanded by disposing a stub in each of feed conductors respectively connected to two radiating elements.

Example 5

In Example 5, a configuration in which the frequency characteristics of the impedances of radiating elements are varied by varying the dielectric constants of dielectrics that make up a dielectric substrate in which radiating elements are disposed will be described.

FIG. 16 is a side see-through view of an antenna module 100C according to Example 5. In the antenna module 100C, radiating elements 131C, 132C that make up a sub-array 130C have the same element size, the length of the feed conductor 150 from the branch point BP to the feed point SP1 and the length of the feed conductor 150 from the branch point BP to the feed point SP2 are the same length. On the other hand, in the antenna module 100C, a dielectric in the region in which the radiating element 131C is formed has a dielectric constant different from a dielectric in the region in which the radiating element 132C is formed. In other words, the dielectric constant ε1 of a dielectric 1401 disposed between the radiating element 131C and the ground electrode GND is different from the dielectric constant ε2 of a dielectric 1402 disposed between the radiating element 132C and the ground electrode GND (ε1≠ε2). Even when the element size of a radiating element and the distance between the radiating element and the ground electrode GND are the same, but when the dielectric constant between the radiating element and the ground electrode GND is different, the effective wave length of a signal that propagates through the dielectric substrate 140 varies, with the result that the resonant frequency of the radiating element varies. Therefore, by varying the dielectric constant of the region in which each radiating element is formed, the operable band width in each radiating element is varied.

FIG. 17 and FIG. 18 are views for illustrating simulation results in Example 5 and Comparative Example 5. FIG. 17 is a graph showing the frequency characteristics of return losses. FIG. 18 is a table showing those read from the operable band width BW0 in each of the simulation results of FIG. 15.

Comparative Example 5 (the line LN50 of FIG. 17: dashed line) is an example in which the dielectric constant ε1 of the region in which the radiating element 131C is formed and the dielectric constant ε2 of the region in which the radiating element 132C is formed each are 2.9. Example 5 (the line LN51 of FIG. 17: continuous line) is an example in which the dielectric constant ε1 of the region in which the radiating element 131C is formed is 2.9 and the dielectric constant ε2 of the region in which the radiating element 132C is formed is 3.5.

As shown in FIG. 17 and FIG. 18, the operable band width BW0 (3.6 GHz) of Example 5 is wider than the operable band width BW0 (2.9 GHz) of Comparative Example 5 that uses the same dielectric constant. In this way, by varying the dielectric constants of the regions of the dielectric substrate, in which the radiating elements are respectively formed, the frequency band width of the overall antenna module is expanded.

In FIG. 16, a dielectric with a predetermined dielectric constant is disposed all over the region between the ground electrode and the radiating elements. Alternatively, the effective dielectric constant of the dielectric substrate may be varied by forming a cavity in part of the dielectric between the ground electrode and the radiating elements or partially disposing a dielectric with a different dielectric constant.

Example 6

In Example 6, a configuration in which the frequency characteristics of the impedances of radiating elements are varied by disposing the location of a feed point that couples a feed conductor with each radiating element at a different location for each radiating element.

Figure 19:
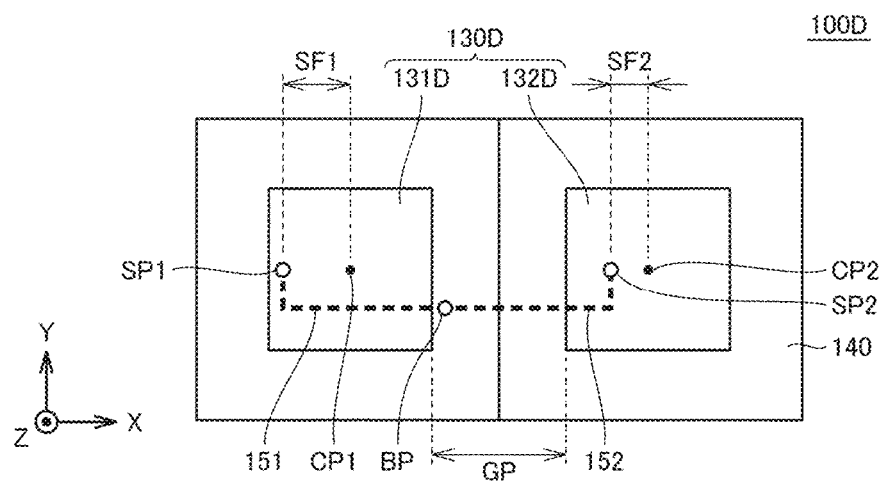
FIG. 19 is a plan view of an antenna module according to Example 6.

FIG. 19 is a plan view of an antenna module 100D according to Example 6. In the antenna module 100D, radiating elements 131D, 132D that make up a sub-array 130D have the same element size, the length of the feed conductor 150 from the branch point BP to the power supply point SP1 and the length of the feed conductor 150 from the branch point BP to the feed point SP2 are the same length. However, in the antenna module 100D, the locations of the feed points in the respective radiating elements 131D, 132D are different from each other. Specifically, an offset amount SF1 of the feed point SP1 from a center CP1 in the radiating element 131D is greater than an offset amount SF2 of the feed point SP2 from a center CP2 in the radiating element 132D.

It is known that, in a patch antenna, the impedance of a radiating element varies as the location of a feed point varies. Generally, the return loss in a service band width is designed to be reduced by disposing a feed point at a location (optimal location) that gives a characteristic impedance (for example, 50Ω). In Example 6, for at least one of two radiating elements, the resonant frequency of the radiating element is varied by shifting the location of the feed point from the optimal location. Thus, the return loss slightly degrades in the radiating element alone of which the feed point is shifted; however, the frequency band width of the overall antenna module is expanded with a shift in operable band width between the two radiating elements.

Figure 20:
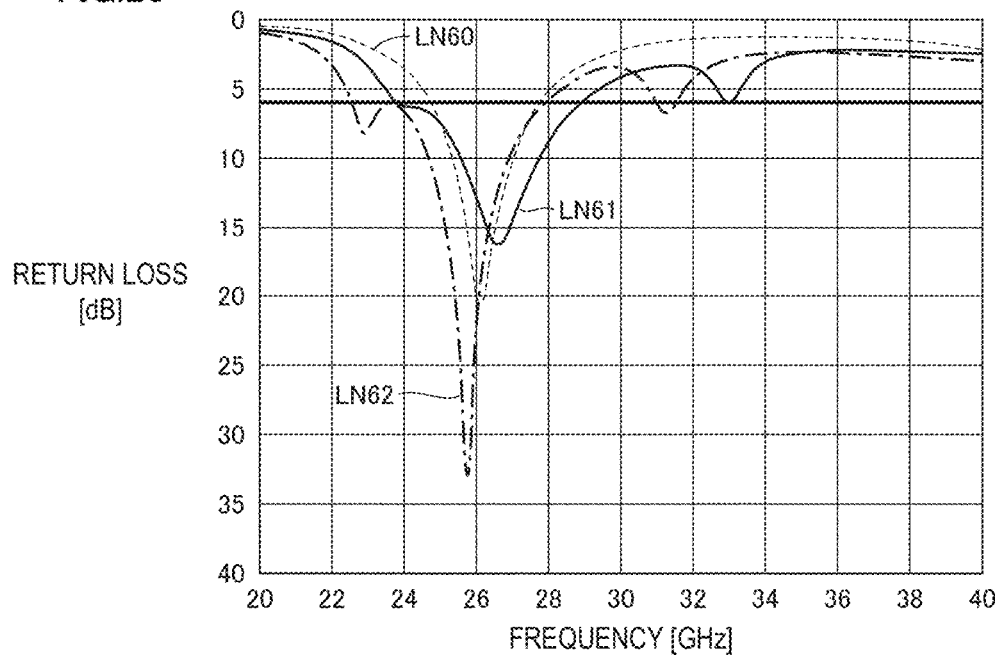
FIG. 20 is a first view for illustrating operable band widths in Example 6 and Comparative Example 6.
Figures 21, 22:
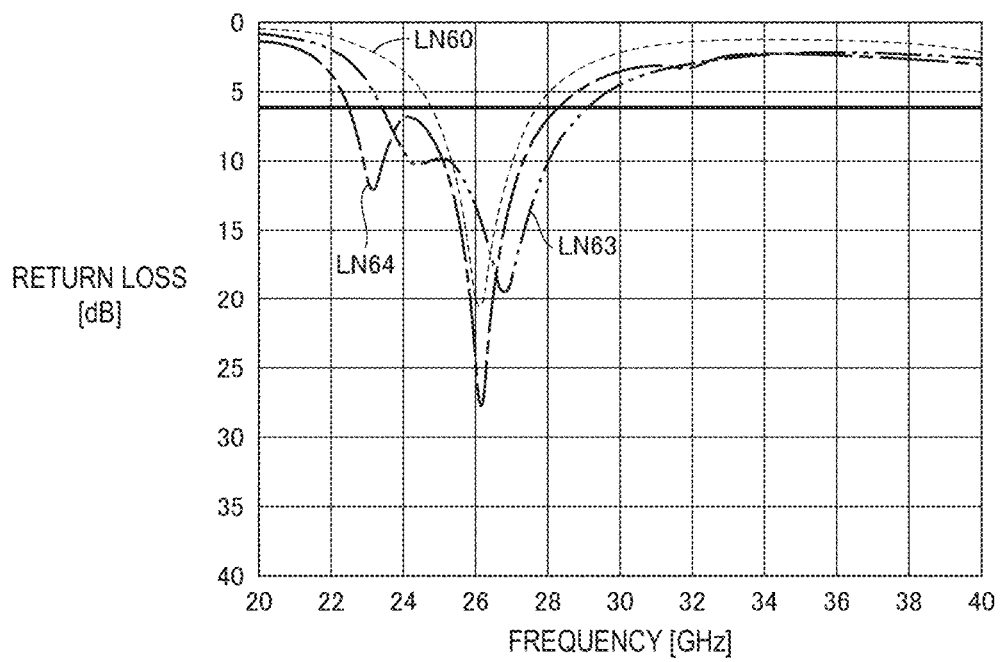
FIG. 21 is a second view for illustrating operable band widths in Example 6 and Comparative Example 6.
FIG. 22 is a third view for illustrating operable band widths in Example 6 and Comparative Example 6.

FIG. 20 to FIG. 22 are views for illustrating simulation results in Example 6 and Comparative Example 6. FIG. 20 is a graph showing the frequency characteristics of return losses in the case where the amount of shift of the feed point SP1 is varied for radiating elements with the same element size. FIG. 21 is a graph showing the frequency characteristics of return losses in the case where, in addition to a shift of the feed point, the element sizes of two radiating elements are varied. FIG. 22 is a table showing those read from the operable band width BW0 in each of the simulation results of FIG. 20 and FIG. 21.

Comparative Example 6 (the line LN60 of FIG. 20 and FIG. 21, dashed line) is an example in which the element sizes of the radiating elements 131D, 132D each are 27 GHz and the offset amount SF1 of the feed point SP1 in the radiating element 131D and the offset amount SF2 of the feed point SP2 in the radiating element 132D each are 0.7 mm. Example 6-1 (the line LN61 of FIG. 20: continuous line) and Example 6-2 (the line LN62 of FIG. 20: alternate long and short dashed line) are examples in which the element sizes of two radiating elements each are 27 GHz and the offset amount SF1 of the feed point in the radiating element 131D is set to 1.3 mm. The element spacing GP in Example 6-1 is set to 2.2 mm as in the case of Comparative Example 6, and the element spacing GP is narrowed to 0.75 mm in Example 6-2.

As shown in FIG. 20 and FIG. 22, even with the same element size, the operable band width BW0 is expanded from 2.9 GHz (Comparative Example 6) to 5.0 GHz (Example 6-1) by changing the shift amount of the feed point SP1. Furthermore, the operable band width BW0 is further expanded to 5.4 GHz by narrowing the element spacing GP.

Example 6-3 (the line LN63 of FIG. 21: alternate long and two-short dashed line) and Example 6-4 (the line LN64 of FIG. 21: alternate long and short dashed line) are examples in which the offset amount SF1 of the feed point in the radiating element 131D is set to 1.3 mm, the element size of the radiating element 131D is set to 26 GHz, and the element size of the radiating element 132D is set to 28 GHz. In Example 6-3, the element spacing GP is set to 2.2 mm as in the case of Comparative Example 6 and Example 6-1, and the element spacing GP of Example 6-4 is set to 0.75 mm as in the case of Example 6-2.

As shown in FIG. 21 and FIG. 22, the operable band width BW0 is expanded to 5.7 GHz (Example 6-3) by changing the element size in addition to a shift of the feed point SP1. Furthermore, the operable band width BW0 is expanded to 5.9 GHz (Example 6-4) by narrowing the element spacing GP.

As described above, the frequency characteristics of the impedances are varied by varying the locations of the feed points of two radiating elements, and, as a result, the operable band widths partially overlap. Thus, the frequency band width of the overall antenna module is expanded.

Example 7

In each of the above-described Examples, the configuration in which radio waves in a single polarization direction are radiated from each radiating element has been described. In Example 7, an example in which the above-described features are applied to a so-called dual polarization-type antenna module, that is, radio waves in two polarization directions are radiated from each radiating element will be described.

Figure 23:
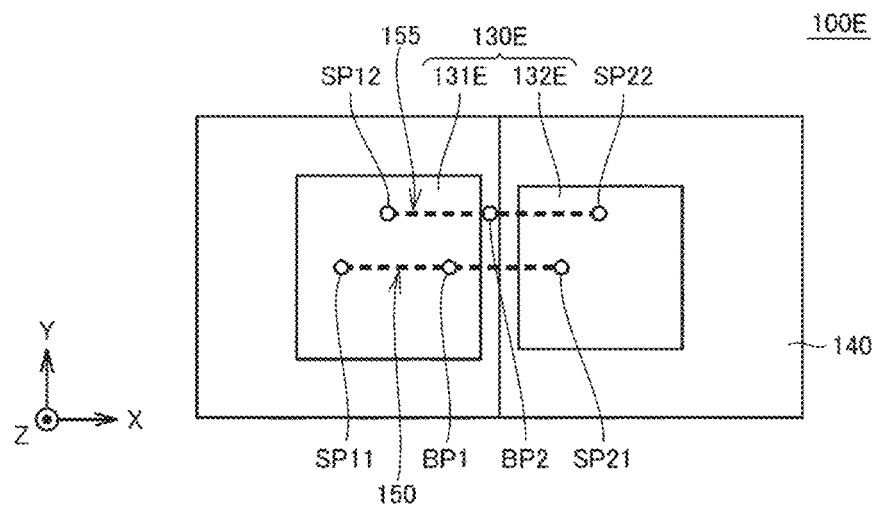
FIG. 23 is a plan view of an antenna module according to Example 7.

FIG. 23 is a plan view of an antenna module 100E according to Example 7. In the antenna module 100E, as in the case of the antenna module 100 shown in FIG. 2, a sub-array 130E is made up of radiating elements 131E, 132E with different element sizes. Then, in each radiating element, a radio-frequency signal is supplied to a feed point offset in the X-axis direction from the center of the radiating element and a feed point offset in a Y-axis direction from the center of the radiating element.

More specifically, in the radiating element 131E, a radio-frequency signal is supplied to a feed point SP11 offset in the negative direction of the X-axis from the center of the radiating element 131E and a feed point SP12 offset in the positive direction of the Y-axis from the center of the radiating element 131E. In the radiating element 132E, a radio-frequency signal is supplied to a feed point SP21 offset in the negative direction of the X-axis from the center of the radiating element 132E and a feed point SP22 offset in the positive direction of the Y-axis from the center of the radiating element 132E.

A common radio-frequency signal is supplied by the feed conductor 150 to the feed point SP11 of the radiating element 131E and the feed point SP21 of the radiating element 132E. In FIG. 23, the wire between the branch point BP1 of the feed conductor 150 and the feed point SP11 and the wire between the branch point BP1 of the feed conductor 150 and the feed point SP21 are set to the same length. By supplying a radio-frequency signal to the radiating elements 131E, 132E through the feed conductor 150, radio waves with the X-axis direction as the polarization direction are radiated from each radiating element.

Similarly, a common radio-frequency signal is supplied by the feed conductor 155 to the feed point SP12 of the radiating element 131E and the feed point SP22 of the radiating element 132E. The wire between the branch point BP2 of the feed conductor 155 and the feed point SP12 and the wire between the branch point BP2 of the feed conductor 155 and the feed point SP22 are set to the same length. By supplying a radio-frequency signal to the radiating elements 131E, 132E through the feed conductor 155, radio waves with the Y-axis direction as the polarization direction are radiated from each radiating element.

In such a dual polarization-type antenna module as well, the element sizes of two radiating elements that make up a sub-array are varied to make the operable band widths of the radiating elements partially overlap, with the result that the frequency band width for radio waves in each polarization direction is expanded.

In FIG. 23 described above, the example in which the frequency characteristics of the impedances of radiating elements are changed by varying the element sizes of two radiating elements has been described. The techniques as described in Example 2 to Example 6 may also be applied solely or in combination to a dual polarization-type antenna module.

Example 8

In Example 8, an example in which the above-described features are applied to a so-called dual band-type antenna module, that is, radio waves with two frequencies are able to be radiated from each radiating element will be described.

Figure 24:
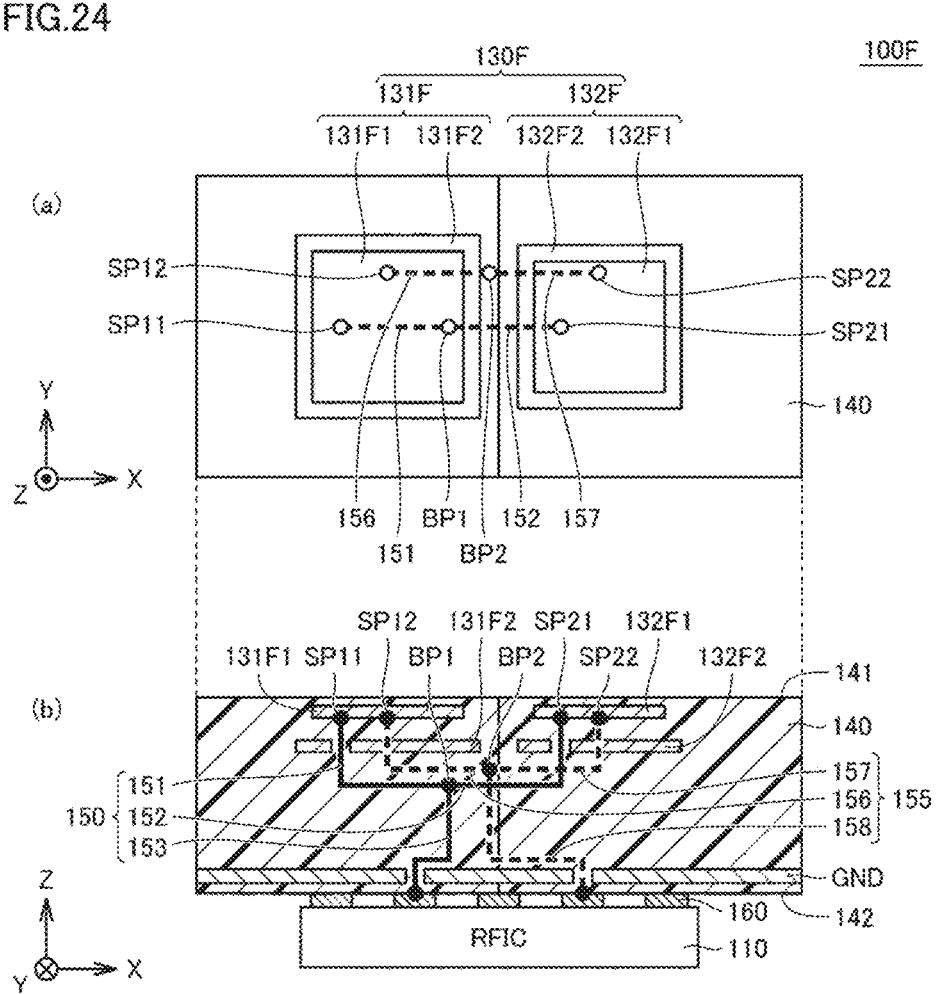
FIG. 24 shows a plan view and a side see-through view of a first example of an antenna module according to Example 8.

FIG. 24 shows a plan view (FIG. 24(a)) and a side see-through view (FIG. 24(b)) of an antenna module 100F according to a first example of Example 8. In the antenna module 100F, radiating elements 131F, 132F that make up a sub-array 130F are disposed adjacent to each other in the X-axis direction. Each of the radiating elements 131F, 132F is made up of a feed element and a parasitic element opposite the feed element. More specifically, the radiating element 131F includes a feed element 131F1 and a parasitic element 131F2, and the radiating element 132F includes a feed element 132F1 and a parasitic element 132F2.

As shown in FIG. 24(b), the feed elements 131F1, 132F1 are disposed opposite the ground electrode GND in an inside layer or on a top surface-side surface 141 of the dielectric substrate 140. The parasitic element 131F2 is disposed opposite the feed element 131F1 between the feed element 131F1 and the ground electrode GND. The parasitic element 132F2 is disposed opposite the feed element 132F1 between the feed element 132F1 and the ground electrode GND.

In each radiating element, the element size of the feed element is smaller than the element size of the parasitic element. In other words, in each radiating element, the resonant frequency of the feed element is higher than the resonant frequency of the parasitic element. For example, the feed elements 131F1, 132F1 have an element size with which 39 GHz-band radio waves are able to be radiated, and the parasitic elements 131F2, 132F2 have an element size with which 27 GHz-band radio waves are able to be radiated.

The element size of the feed element 132F1 is smaller than the element size of the feed element 131F1. For example, the resonant frequency of the feed element 132F1 is set to 41 GHz, and the resonant frequency of the feed element 131F1 is set to 37 GHz. The element size of the parasitic element 132F2 is smaller than the element size of the parasitic element 131F2. For example, the resonant frequency of the parasitic element 132F2 is set to 28 GHz, and the resonant frequency of the parasitic element 131F2 is set to 26 GHz.

A common radio-frequency signal is supplied by the feed conductor 150 to the feed point SP11 of the feed element 131F1 and the feed point SP21 of the feed element 132F1. The wire 151 of the feed conductor 150 from the branch point BP1 to the feed point SP11 extends through the parasitic element 131F2 and is coupled to the feed point SP11. The wire 152 from the branch point BP1 to the feed point SP21 extends through the parasitic element 132F2 and is coupled to the feed point SP21.

The feed points SP11, SP21 each are disposed in the negative direction of the X-axis from the center of an associated one of the feed elements. Therefore, when a 39 GHz radio-frequency signal is supplied by the feed conductor 150 to each feed element, 39 GHz radio waves with the X-axis direction as the polarization direction are radiated from the feed elements 131F1, 132F1. When a 27 GHz radio-frequency signal is supplied by the feed conductor 150 to each feed element, 27 GHz radio waves with the X-axis direction as the polarization direction are radiated from the parasitic elements 131F2, 132F2.

Furthermore, in the antenna module 100F, a common radio-frequency signal is also supplied by the feed conductor 155 to the feed point SP12 of the feed element 131F1 and the feed point SP22 of the feed element 132F1. The feed points SP12, SP22 each are disposed in the positive direction of the Y-axis from the center of an associated one of the feed elements. The wire 156 of the feed conductor 155 from the branch point BP2 to the feed point SP12 extends through the parasitic element 131F2 and is coupled to the feed point SP12. The wire 157 from the branch point BP2 to the feed point SP22 extends through the parasitic element 132F2 and is coupled to the feed point SP22. Therefore, when a 39 GHz radio-frequency signal is supplied by the feed conductor 155 to each feed element, 39 GHz radio waves with the Y-axis direction as the polarization direction are radiated from the feed elements 131F1, 132F1. When a 27 GHz radio-frequency signal is supplied by the feed conductor 150 to each feed element, 27 GHz radio waves with the Y-axis direction as the polarization direction are radiated from the parasitic elements 131F2, 132F2.

In other words, the antenna module 100F is a dual band-type or dual polarization-type antenna module capable of radiating 27 GHz-band radio waves and 39 GHz-band radio waves.

In the antenna module 100F, a combination of the 39 GHz-band feed elements 131F1, 132F1 is a configuration corresponding to Example 1, and a combination of 27 GHz-band parasitic elements 131F2, 132F2 is a configuration corresponding to Example 1. Therefore, the operable band width is expanded in each of the two frequency bands.

Figure 25:
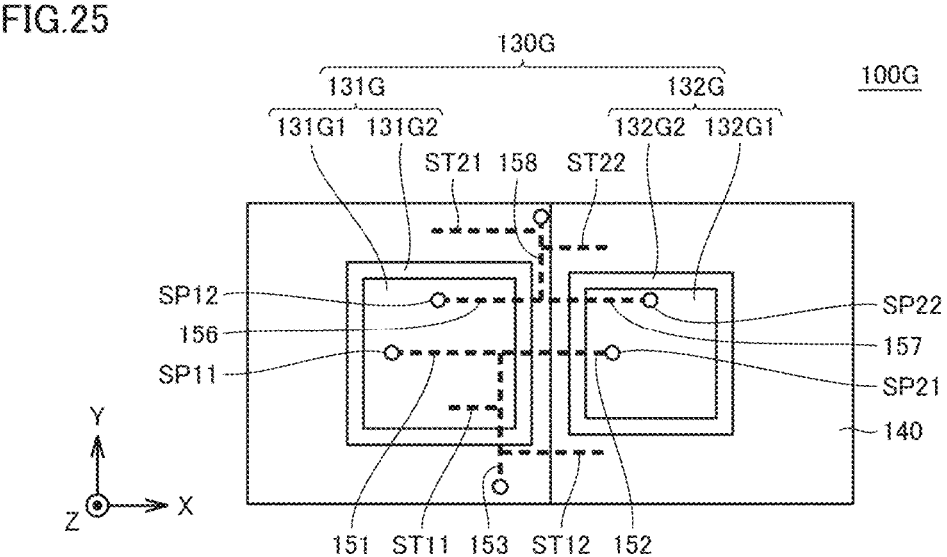
FIG. 25 is a plan view of a second example of the antenna module according to Example 8.

FIG. 25 is a plan view of an antenna module 100G according to a second example of Example 8. In the antenna module 100G, in addition to the configuration of the antenna module 100F of FIG. 24, stubs are disposed in a common wire part of each feed conductor.

In the antenna module 100G, radiating elements 131G, 132G that make up a sub-array 130G are disposed adjacent to each other in the X-axis direction. Each of the radiating elements 131G, 132G is made up of a feed element and a parasitic element opposite the feed element. More specifically, the radiating element 131G includes a feed element 131G1 and a parasitic element 131G2, and the radiating element 132G includes a feed element 132G1 and a parasitic element 132G2. Then, in the antenna module 100G, stubs ST11, ST12 are disposed in the common wire 153 of the feed conductor 150, and stubs ST21, ST22 are disposed in a common wire 158 of the feed conductor 155. These stubs are different from the stubs described in Example 4, and are used to reduce the influence on the other frequency band.

In other words, when 39 GHz-band radio waves are radiated from the feed elements 131G1, 132G1, the impedance is adjusted such that a 27 GHz-band signal is blocked by the stubs. Thus, radiation of spurious waves from the parasitic elements 131G2, 132G2 is prevented. On the other hand, when 27 GHz-band radio waves are radiated from the parasitic elements 131G2, 132G2, the impedance is adjusted such that a 39 GHz-band signal is blocked by the stubs. Thus, the frequency band width of the antenna module is further improved.

Figure 26:
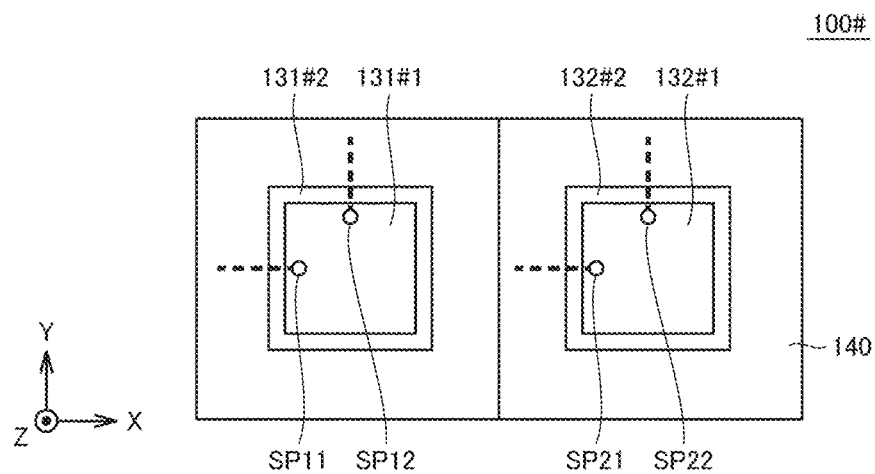
FIG. 26 is a plan view of an antenna module of Comparative Example 8.
Figure 27:
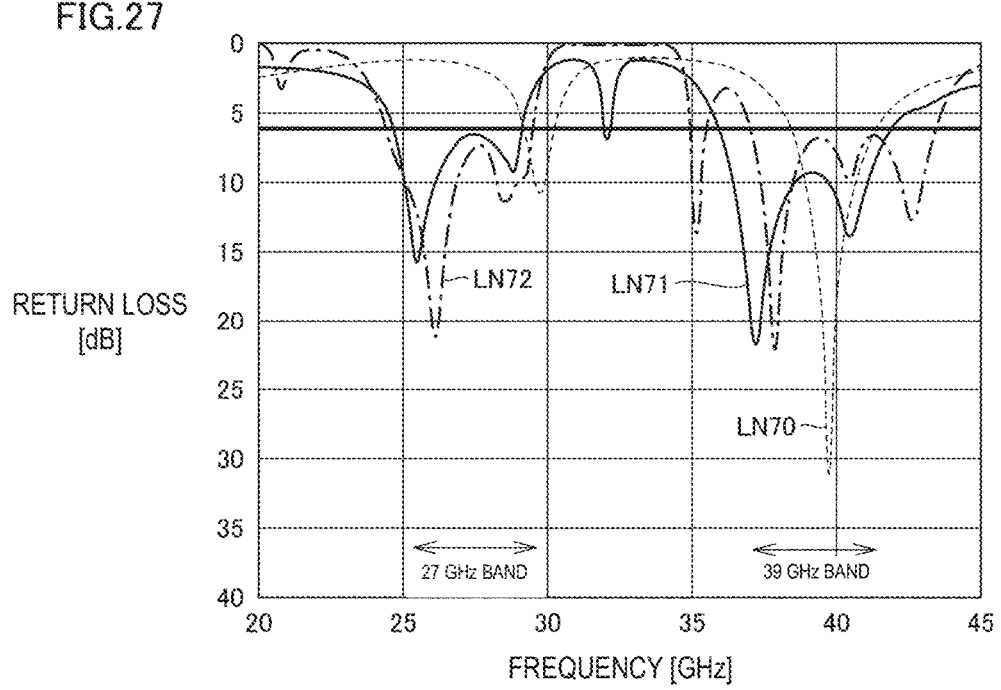
FIG. 27 is a view for illustrating operable band widths in Example 8 and Comparative Example 8.

The frequency characteristics of return losses in the case where the antenna modules 100F, 100G are compared with an antenna module 100# of Comparative Example 8 of FIG. 26 are shown in FIG. 27. In the antenna module 100# of Comparative Example 8, for two radiating elements, feed elements 131 #1, 132 #1 are set to the same element size (39 GHz), and parasitic elements 131 #2, 132 #2 are set to the same element size (27 GHz). Then, a radio-frequency signal is individually supplied to the feed point of each radiating element.

By referring to FIG. 27, the line LN70 (dashed line) represents the case of Comparative Example 8 of FIG. 26. The line LN71 (continuous line) represents the case of a first example of Example 8 of FIG. 25, and the line LN72 (alternate long and short dashed line) represents the case of a second example of Example 8 of FIG. 26. As shown in FIG. 27, in any one of the first example and the second example of Example 8 as well, the operable band width in each frequency band (27 GHz or 39 GHz) is expanded as compared to the case of Comparative Example 8. Therefore, in a dual band-type antenna module as well, for two radiating elements disposed adjacent to each other and intended for the same frequency band, the frequency band width of each frequency band is able to be expanded by making the operating frequency band widths partially overlap.

In Example 8 described above, the example in which the frequency characteristics of the impedances of radiating elements are changed by varying the element sizes of intended two radiating elements has been described. The techniques as described in Example 2 to Example 6 may also be applied solely or in combination to a dual band-type antenna module. The parasitic elements in Example 8 may be changed to feed elements.

Example 9

In the above-described Example 1 to Example 8, the antenna module made up of a sole sub-array has been described. In Example 9, the case of an array antenna using a plurality of sub-arrays will be described.

Figure 28:
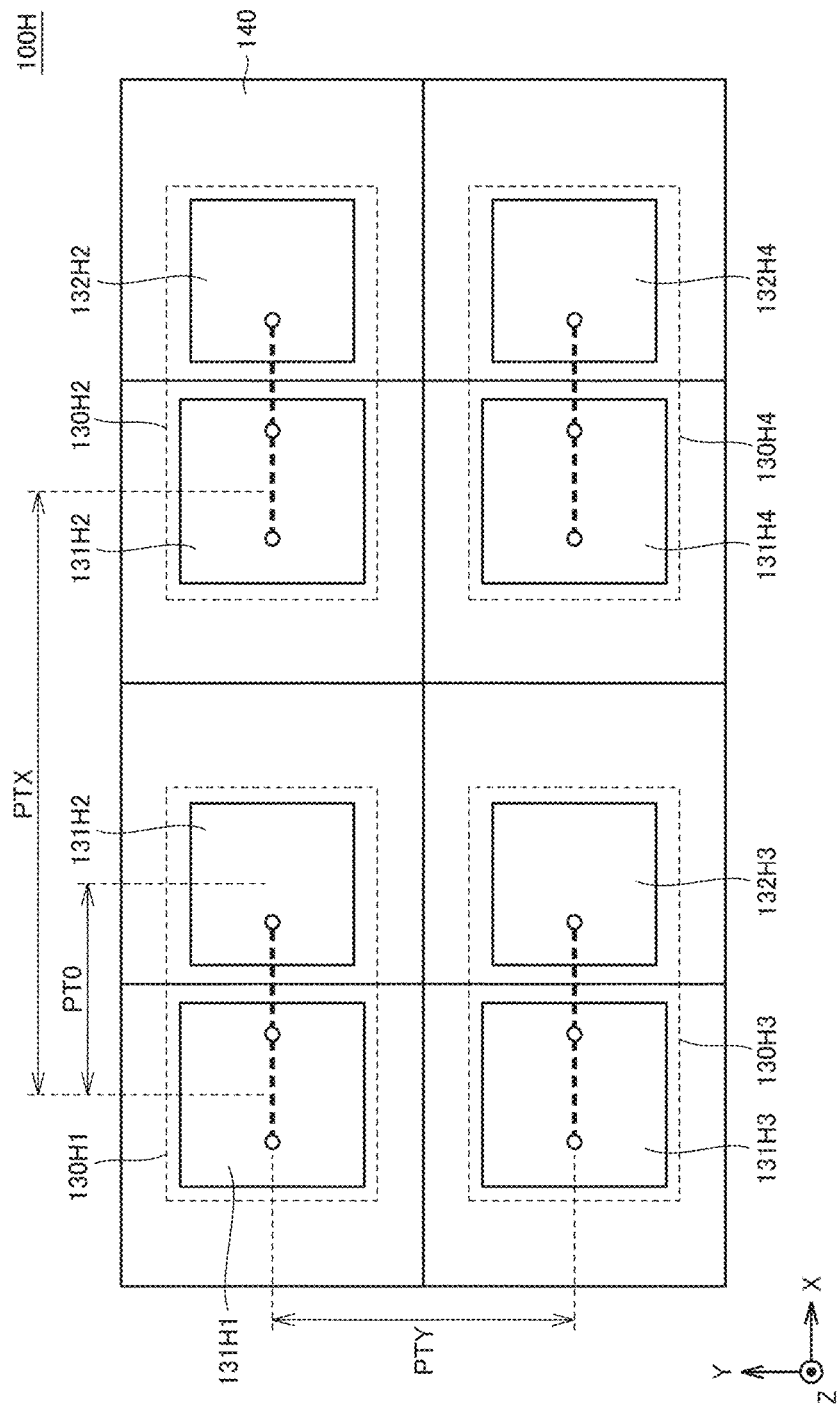
FIG. 28 is a plan view of an antenna module according to Example 9.

FIG. 28 is a plan view of an antenna module 100H according to Example 9. The antenna module 100H has a configuration in which the sub-array of Example 1 shown in FIG. 2 is arranged in a 2×2 two-dimensional array. More specifically, the antenna module 100H includes four sub-arrays 130H1 to 130H4 (hereinafter, also collectively referred to as "sub-arrays 130H"), and the sub-array 130H1 and the sub-array 130H2 are disposed adjacent to each other in the X-axis direction. The sub-arrays 130H3, 130H4 are respectively disposed adjacent to the sub-arrays 130H1, 130H2 in the negative direction of the Y-axis.

Each sub-array includes two radiating elements with different element sizes, and the two radiating elements are disposed adjacent to each other in the X-axis direction. In the antenna module 100H of FIG. 28, radiating elements with a large element size are defined as radiating elements 131H1 to 131H4 (hereinafter, also collectively referred to as "radiating elements 131H"), and radiating elements with a small element size are defined as radiating elements 132H1 to 132H4 (hereinafter, collectively referred to as "radiating elements 132H").

In each sub-array 130H, where the distance between the center of the radiating element 131H and the center of the radiating element 132H is defined as element-to-element pitch PT0, the distance between sub-arrays in the X-axis direction (for example, the distance between the radiating element 131H1 and the radiating element 131H2) is defined as X-direction pitch PTX, and the distance between sub-arrays in the Y-axis direction (for example, the distance between the radiating element 131H1 and the radiating element 131H3) is defined as Y-direction pitch PTY, the radiating elements are disposed such that the X-direction pitch PTX and the Y-direction pitch PTY each are greater than the element-to-element pitch PT0 (PTX>PT0, PTY>PT0).

In each sub-array 130H, a common radio-frequency signal is supplied by bifurcated feed conductors to the feed points of two radiating elements (131H/132H). In the example of FIG. 28, in each radiating element, the feed point is offset in the negative direction of the X-axis from the center of the radiating element, and radio waves with the X-axis direction as the polarization direction are radiated from each radiating element.

With such a configuration, as described in Example 1, the frequency band width is expanded in each sub-array 130H, so the frequency band width is expanded also in the overall antenna module 100H. In addition, the configuration also contributes to improvement in antenna gain and directivity.

In the antenna module 100H of FIG. 28, sub-arrays are linearly arranged in the X-axis direction and the Y-axis direction. Alternatively, an array in the X-axis direction or the Y-axis direction may be an array in a zigzag manner.

Three or more sub-arrays may be arranged in the X-axis direction and/or the Y-axis direction. In this case, to symmetrize the directivity of radio waves to be radiated, sub-arrays are preferably disposed such that an adjacent sub-array spacing becomes a constant pitch.

An antenna module may have a one-dimensional array in which a plurality of sub-arrays is arranged only in any one of the X-axis direction and the Y-axis direction.

In FIG. 28 described above, the example in which the frequency characteristics of the impedances of radiating elements are changed by varying the element sizes of two radiating elements of each sub-array has been described. The techniques as described in Example 2 to Example 6 may also be applied solely or in combination to an antenna module of an array antenna to change the frequency characteristics of the impedances. Furthermore, an array antenna may be formed with a dual polarization-type and/or dual band-type sub-array as in the case of Example 7 and Example 8.

Modification Examples

In the above-described Example 9, the configuration of an array antenna in which two substantially square radiating elements that make up each sub-array are disposed such that respective sides are opposite each other has been described. In Modification Examples described below, examples of array antennas in which two radiating elements that make up each sub-array are disposed in different manners will be described.

Figure 29:
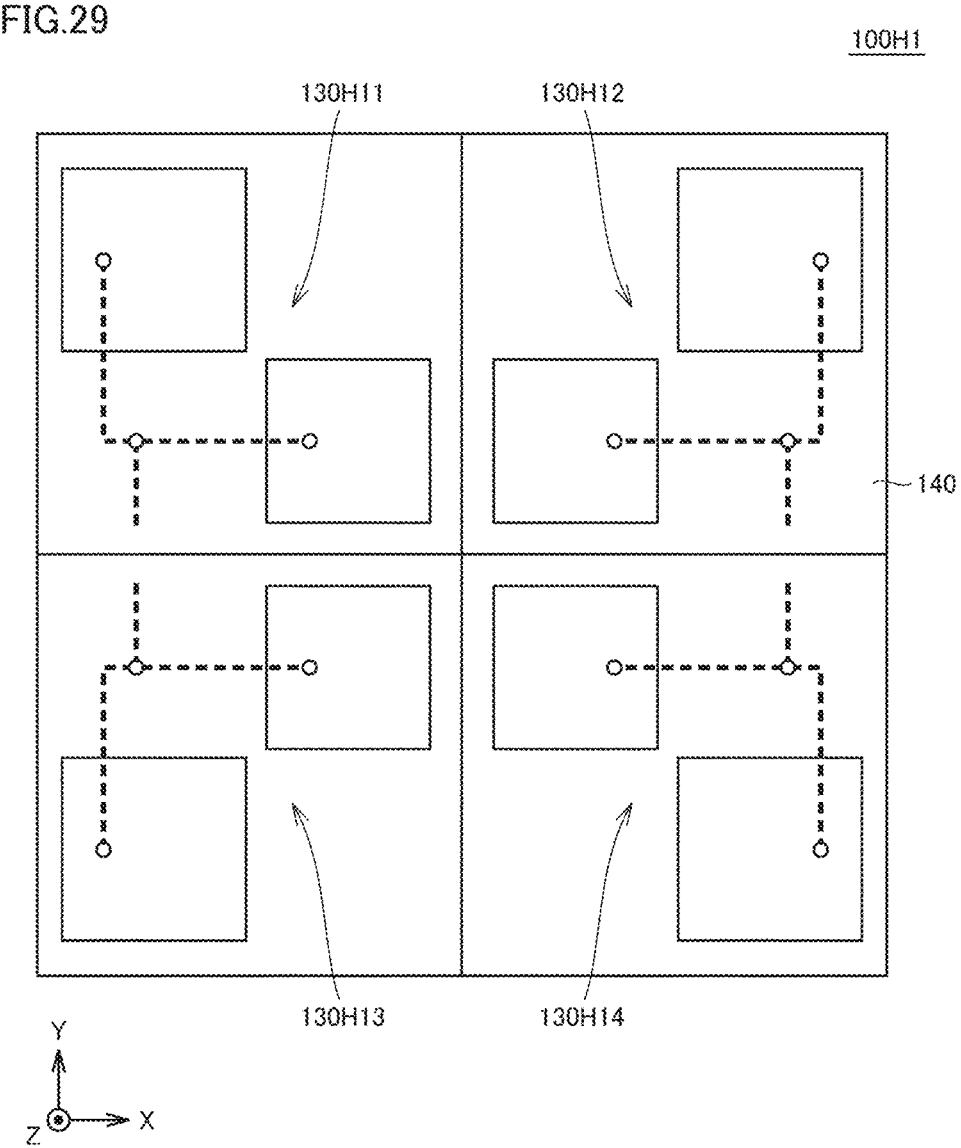
FIG. 29 is a plan view of an antenna module according to Modification Example 1.

FIG. 29 is a plan view of an antenna module 100H1 according to Modification Example 1. In the antenna module 100H1, two radiating elements included in each of sub-arrays 130H11 to 130H14 and are disposed in a diagonal direction of the radiating elements. Then, in each sub-array, a radio-frequency signal is split and supplied from a common feed conductor to two radiating elements. In the example of FIG. 29, radio waves with the X-axis direction as the polarization direction are radiated from each radiating element.

Figure 30:
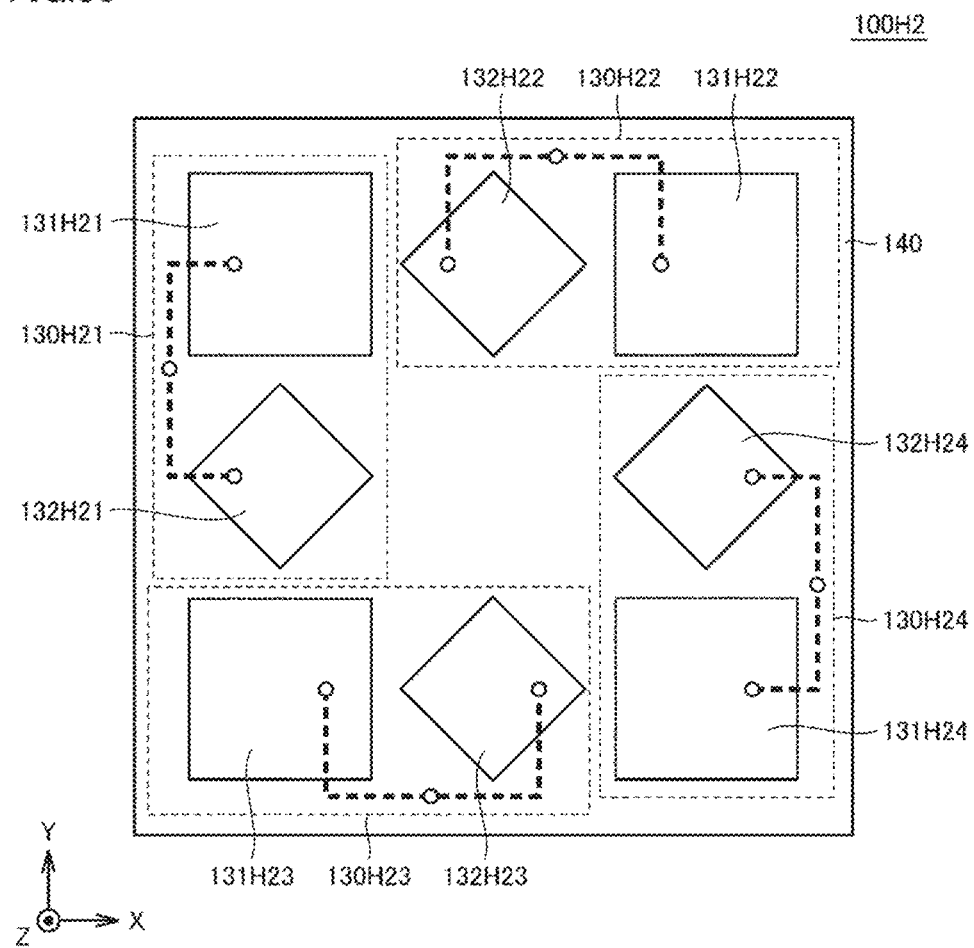
FIG. 30 is a plan view of an antenna module according to Modification Example 2.

FIG. 30 is a plan view of an antenna module 100H2 according to Modification Example 2. In the antenna module 100H2, of two substantially square radiating elements included in each of sub-arrays 130H21 to 130H24, one of the radiating elements, that is, each of radiating elements 131H21 to 131H24, is disposed such that each of the sides is parallel to the X-axis or the Y-axis, and the other one of the radiating elements, that is, each of radiating elements 132H21 to 132H24, is disposed such that each of the sides is inclined at an angle of 45° with respect to the X-axis or the Y-axis. For the sub-arrays 130H21, 130H24, two radiating elements are disposed adjacent to each other in the Y-axis direction, and, for the sub-arrays 130H22, 130H23, two radiating elements are disposed adjacent to each other in the X-axis direction. Then, in each sub-array, a radio-frequency signal is split and supplied from a common feed conductor to two radiating elements.

In the antenna modules 100H1, 100H2 of Modification Examples as well, for two radiating elements that make up each sub-array, the overall frequency band width of the antenna module may be expanded by changing the frequency characteristics of the impedances with the application of techniques as described in Examples 1 to 6 to make the operable band widths of two radiating elements partially overlap. In the antenna module 100H1 as well, an array antenna may be formed with a dual polarization-type and/or dual band-type sub-array as in the case of Example 7 and Example 8.

Second Embodiment

As described above, antenna modules are used in mobile terminals, such as smartphones. In such mobile terminals, needs for size reduction and slimming are still high, and, accordingly, further size reduction of antenna modules for radiating radio waves is also desired. The frequency of radio waves to be radiated basically depends on the size of a radiating element, so the size of a radiating element is limited to some extent depending on the frequency of radio waves to be radiated. Therefore, to reduce the size of an antenna module, the size of a dielectric substrate on or in which a radiating element is formed needs to be reduced. However, the frequency band width of radio waves able to be radiated is influenced by a distance from an end portion of a radiating element to an end portion of a dielectric substrate in a polarization direction of radio waves, so, when the size of the dielectric substrate is reduced, there is a possibility that the desired frequency band width of an antenna module is not achieved.

In a second embodiment, a configuration for, in an array antenna using sub-arrays as described in the first embodiment, achieving the size reduction of an antenna module while suppressing a reduction in frequency band will be described.

Example 21

Figure 31:
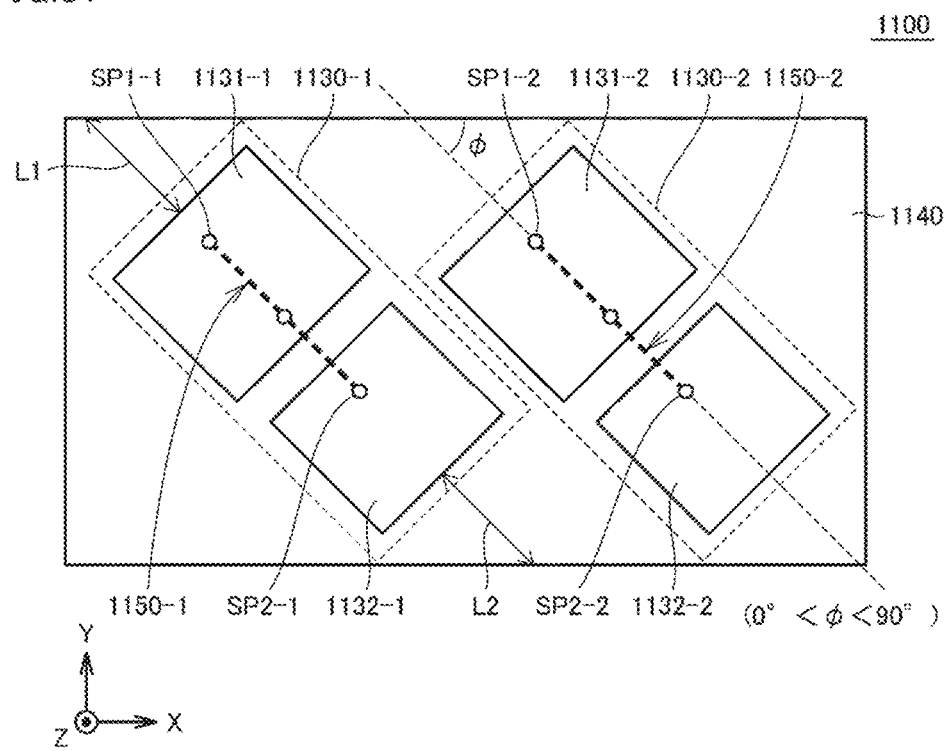
FIG. 31 is a plan view of an antenna module according to Example 21 of a second embodiment.

FIG. 31 is a plan view of an antenna module 1100 according to Example 21 of the second embodiment. The antenna module 1100 is an array antenna that includes sub-arrays 1130-1, 1130-2. The sub-array 1130-1 includes radiating elements 1131-1, 1132-1. The sub-array 1130-2 includes radiating elements 1131-2, 1132-2. The radiating element 1131-1 and the radiating element 1131-2 have the same element size (for example, 26 GHz). The radiating element 1132-1 and the radiating element 1132-2 are smaller than the radiating element 1131-1 and the radiating element 1131-2 and have the same element size (for example, 28 GHz).

In the antenna module 1100, the sub-arrays 1130-1, 1130-2 are disposed adjacent to each other in the X-axis direction (first direction) of FIG. 31 in a rectangular dielectric substrate 1140. In each sub-array, two radiating elements are disposed adjacent to each other in a direction (second direction) inclined at an angle of $\phi$ ($0°<\phi<90°$) with respect to the X-axis direction along one side of the dielectric substrate 1140. The second direction is a direction when the radiating element 1132-1 is viewed from the radiating element 1131-1 in the sub-array 1130-1. Also, the second direction is a direction when the radiating element 1132-2 is viewed from the radiating element 1131-2 in the sub-array 1130-2.

In the sub-array 1130-1, a common radio-frequency signal is supplied from a feed conductor 1150-1 to the radiating elements 1131-1, 1132-1. In the sub-array 1130-2, a common radio-frequency signal is supplied from a feed conductor 1150-2 to the radiating elements 1131-2, 1132-2. A feed point SP1-1 of the radiating element 1131-1, a feed point SP2-1 of the radiating element 1132-1, a feed point SP1-2 of the radiating element 1131-2, and a feed point SP2-2 of the radiating element 1132-2 each are disposed at a location offset along the second direction from the center of an associated one of the radiating elements. Therefore, radio waves in a direction along the second direction as the polarization direction are radiated from each radiating element.

With such a configuration, as described in the first embodiment, in each sub-array, the operable band widths of two radiating elements are caused to partially overlap. As a result, the operable band width of each sub-array is expanded, with the result that the frequency band width of the overall antenna module is expanded.

Figure 32:
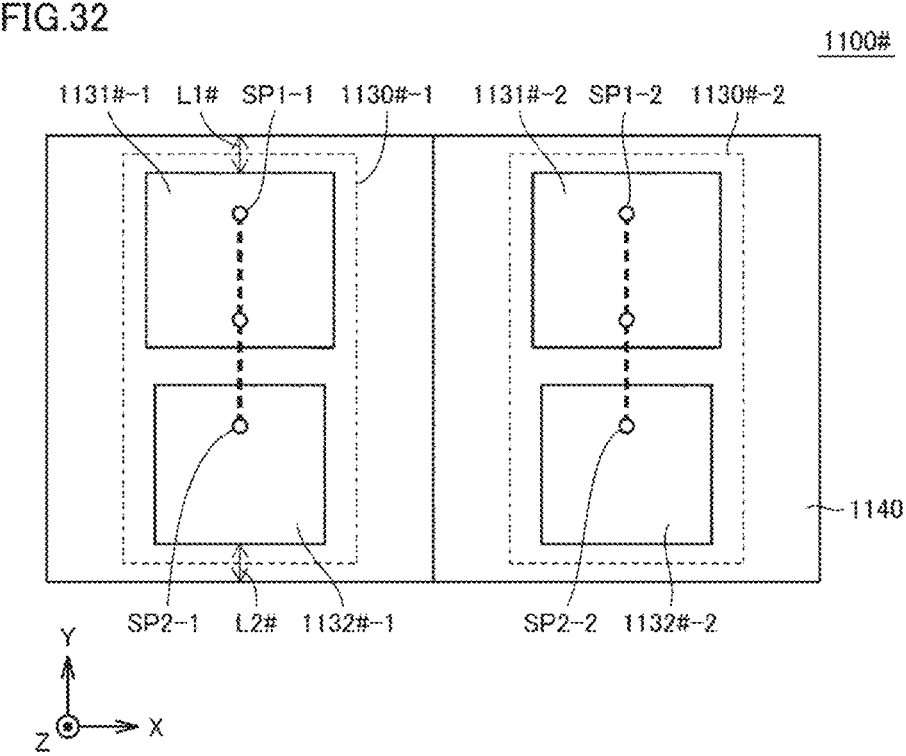
FIG. 32 is a plan view of an antenna module of Comparative Example.

FIG. 32 is a plan view of an antenna module 1100# of Comparative Example. In the antenna module 1100#, two radiating elements in each of sub-arrays 1130#-1, 1130#-2 are disposed adjacent to each other along the Y-axis. In other words, this is the case where the angle $\phi$ is 90° in FIG. 31.

In the arrangement of the sub-arrays as shown in FIG. 32, when the dielectric substrate 1140 is reduced in size to reduce the size of the antenna module, a distance L1# from an end portion of a radiating element 1131#-1 or a radiating element 1131#-2 to an end portion of the dielectric substrate 1140 in the polarization direction (the Y-axis direction in FIG. 32) and a distance L2# from an end portion of a radiating element 1132#-1 or a radiating element 1132#-2 to an end portion of the dielectric substrate 1140 gradually narrow. When the region of a dielectric in the polarization direction narrows, it is known that electromagnetic coupling between a ground electrode and each radiating element weakens and the frequency band width of an antenna module narrows. As a result, in the case of the arrangement of sub-arrays as in the case of Comparative Example, the frequency band width narrows with a reduction in the size of the antenna module, and there is a possibility that antenna characteristics decrease.

On the other hand, when sub-arrays are disposed so as to be inclined with respect to the rectangular dielectric substrate 1140 as in the case of the antenna module 1100 shown in FIG. 31, the distance L1 from the end portion of the radiating element to the end portion of the dielectric substrate in the polarization direction and the distance L2 from the end portion of the radiating element to the end portion of the dielectric substrate in the polarization direction are widened as compared to the case of Comparative Example. Therefore, it is possible to reduce the size of an antenna module while suppressing a reduction in frequency band width.

In the antenna module 1100 as well, for two radiating elements that make up each sub-array, the overall frequency band width of the antenna module may be expanded by changing the frequency characteristics of the impedances with the application of techniques as described in Examples 1 to 6 of the first embodiment to make the operable band widths of two radiating elements partially overlap. In the antenna module 1100 as well, an array antenna may be formed with a dual polarization-type and/or dual band-type sub-array as in the case of Example 7 and Example 8 of the first embodiment.

In each Example of the second embodiment, the configuration that the frequency characteristics of the impedances of two radiating elements that make up a sub-array are different is not indispensable, and the frequency characteristics of the impedances of the two radiating elements may be the same.

In adjacent sub-arrays, the relationship in element size may be inverted. In other words, in the sub-array 1130-1, the element size of the radiating element 1131-1 may be larger than the element size of the radiating element 1132-1, while, in the sub-array 1130-2, the element size of the radiating element 1132-2 may be larger than the element size of the radiating element 1131-2.

Example 22

In the antenna module 1100 of Example 21, the case where adjacent sub-arrays have the same configuration has been described. In Example 22, the case where the configurations of adjacent sub-arrays are different will be described.

Figure 33:
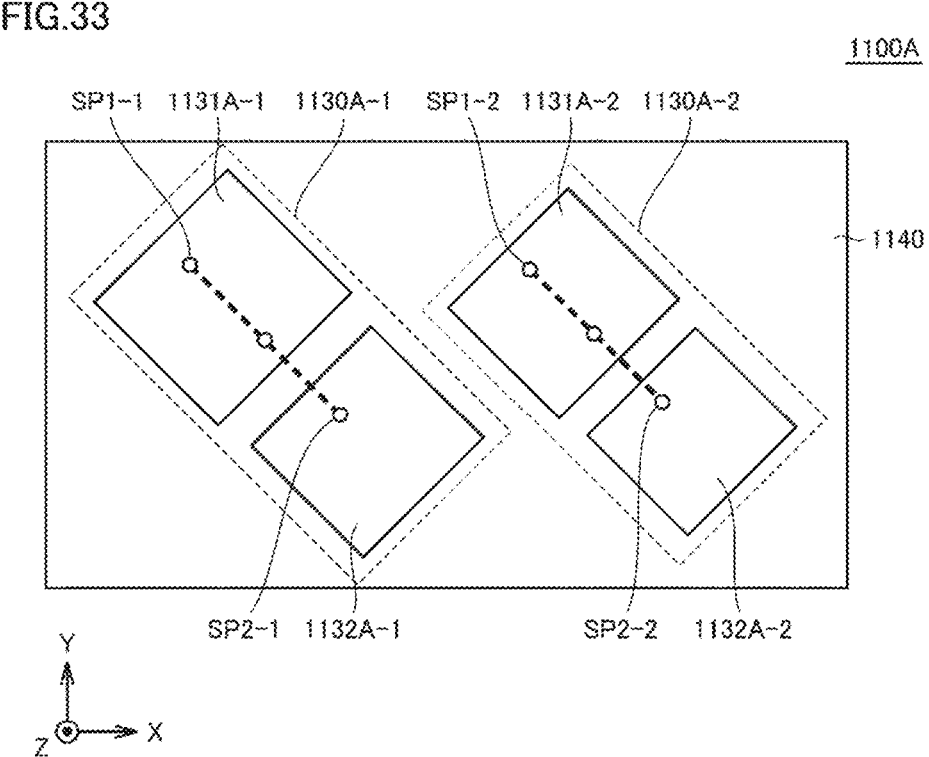
FIG. 33 is a plan view of an antenna module according to Example 22.

FIG. 33 is a plan view of an antenna module 1100A according to Example 22. In the antenna module 1100A, as in the case of the above-described Example 21, a sub-array 1130A-1 and a sub-array 1130A-2 are disposed adjacent to each other in the X-axis direction in the rectangular dielectric substrate 1140. Two radiating elements are included in each sub-array, and the two radiating elements are disposed adjacent to each other along a direction inclined from the X-axis direction.

The sub-array 1130A-1 includes a radiating element 1131A-1 and a radiating element 1132A-1. The element size of the radiating element 1131A-1 is larger than the element size of the radiating element 1132A-1. For example, the element size of the radiating element 1131A-1 is 26 GHz, and the element size of the radiating element 1132A-1 is 28 GHz. A radio-frequency signal is supplied from a common feed conductor to the radiating element 1131A-1 and the radiating element 1132A-1.

The sub-array 1130A-2 includes a radiating element 1131A-2 and a radiating element 1132A-2. The element size of the radiating element 1131A-2 is larger than the element size of the radiating element 1132A-2. For example, the element size of the radiating element 1131A-12 is 25 GHz, and the element size of the radiating element 1132A-1 is 27 GHz. A radio-frequency signal is supplied from a common feed conductor to the radiating element 1131A-2 and the radiating element 1132A-2.

In other words, the configuration of the sub-array 1130A-1 is different from the configuration of the sub-array 1130A-2. Then, when the radiating element 1131A-1 with a larger element size in the sub-array 1130A-1 is compared with the radiating element 1131A-2 with a larger size in the sub-array 1130A-2, the element size of the radiating element 1131A-2 is larger. Similarly, when the radiating element 1132A-1 with a smaller element size in the sub-array 1130A-1 is compared with the radiating element 1132A-2 with a smaller element size in the sub-array 1130A-2, the element size of the radiating element 1132A-1 is larger.

With such a configuration, the operable band widths of two radiating elements partially overlap in each sub-array, so the operable band width of each sub-array is expanded. Furthermore, the operable band widths of adjacent sub-arrays also partially overlap, so the operable band width of the overall array antenna is expanded. Therefore, the frequency band width of the antenna module 1100A is expanded.

In the antenna module 1100A as well, the techniques described in Examples 1 to 6 of the first embodiment may be applied as techniques for changing the frequency characteristics of the impedances. An array antenna may be formed with a dual polarization-type and/or dual band-type sub-array as in the case of Example 7 and Example 8 of the first embodiment.

Example 23

In Example 23, an example of an array antenna with a one-dimensional array in which three or more sub-arrays included in an antenna module are arranged in one direction will be described.

Figure 34:
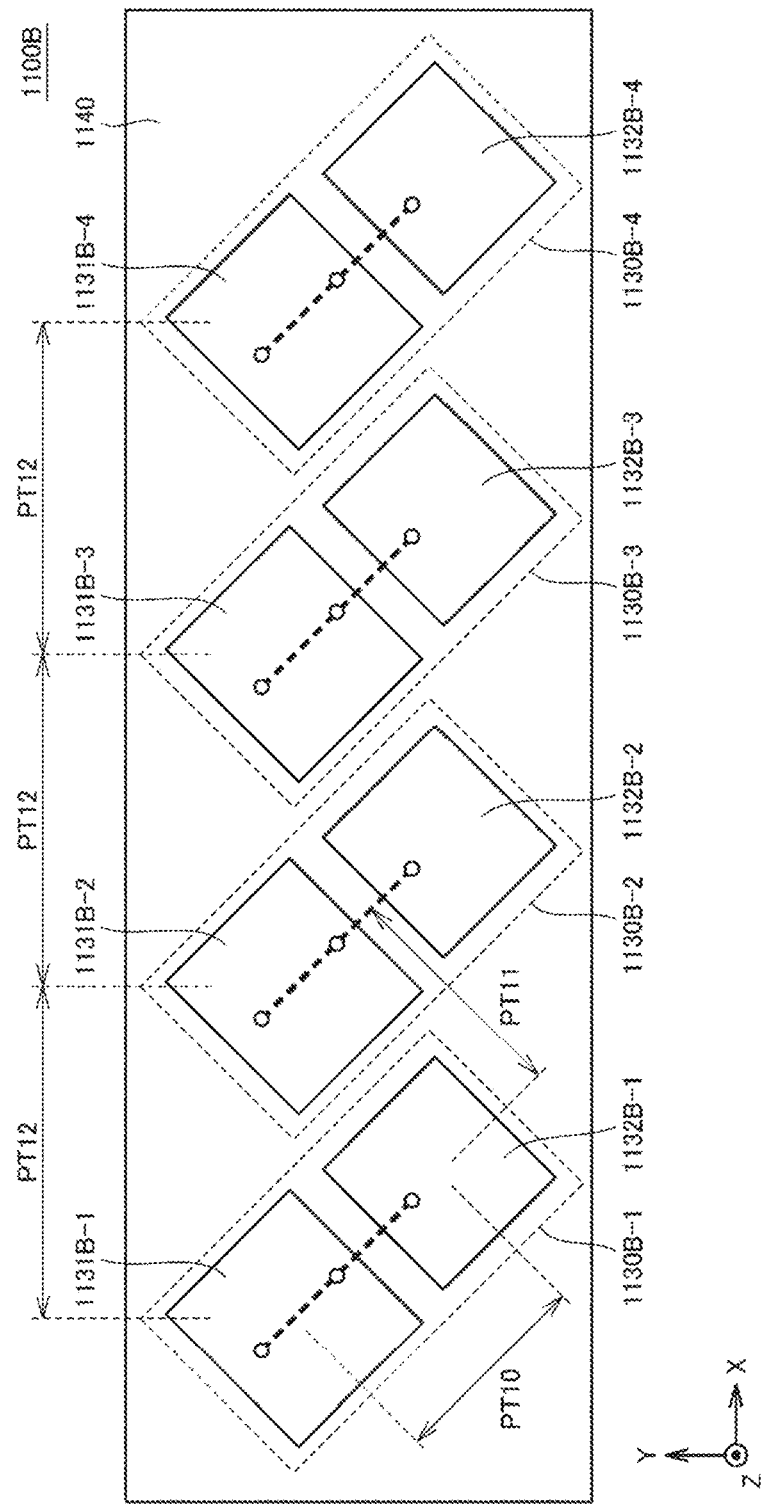
FIG. 34 is a plan view of an antenna module according to Example 23.

FIG. 34 is a plan view of an antenna module 1100B according to Example 23. In the antenna module 1100B, four sub-arrays 1130B-1 to 1130B-4 are arranged in the rectangular dielectric substrate 1140 in a line in the X-axis direction. Each sub-array includes two radiating elements, and, as in the case of Examples 21 and 22, the two radiating elements are disposed such that the arrangement direction is inclined with respect to one side (X-axis) of the dielectric substrate 1140.

Each radiating element is made up of two radiating elements with different element sizes. For example, the element size of radiating elements 1131B-1, 1131B-2, 1131B-3, 1131B-4 with a large element size is 26 GHz, and the element size of radiating elements 1132B-1, 1132B-2, 1132B-3, 1132B-4 with a small element size is 28 GHz.

In the antenna module 1100B, each sub-array is formed with the same configuration, and four sub-arrays are disposed at a constant pitch in the X-axis direction. In other words, four sub-arrays are disposed such that the distance between the radiating element 1131B-1 and the radiating element 1131B-2, the distance between the radiating element 1131B-2 and the radiating element 1131B-3, and the distance between the radiating element 1131B-3 and the radiating element 1131B-4 each are PT12.

As shown in FIG. 34, when the distance between the centers of two radiating elements in each sub-array is set to PT10 and the distance between imaginary lines respectively passing through the centers of two radiating elements in each of the two adjacent sub-arrays is set to PT11, the distance PT11 is set so as to be longer than the element distance PT10. The pitch PT12 of sub-arrays is also set so as to be longer than the element distance PT10.

By disposing sub-arrays in such a positional relationship, coupling between adjacent sub-arrays is weakened as compared to coupling between two radiating elements in each sub-array, so isolation between sub-arrays is ensured, and the effect of expanding the frequency band width of each sub-array is able to be exerted.

In FIG. 34, an example of an array antenna with a one-dimensional array made up of four sub-arrays has been described. Alternatively, the number of sub-arrays may be three or five or more.

Example 24

In Example 24, the case of an array antenna in which four sub-arrays included in an antenna module are arranged in a two-dimensional array will be described.

Figure 35:
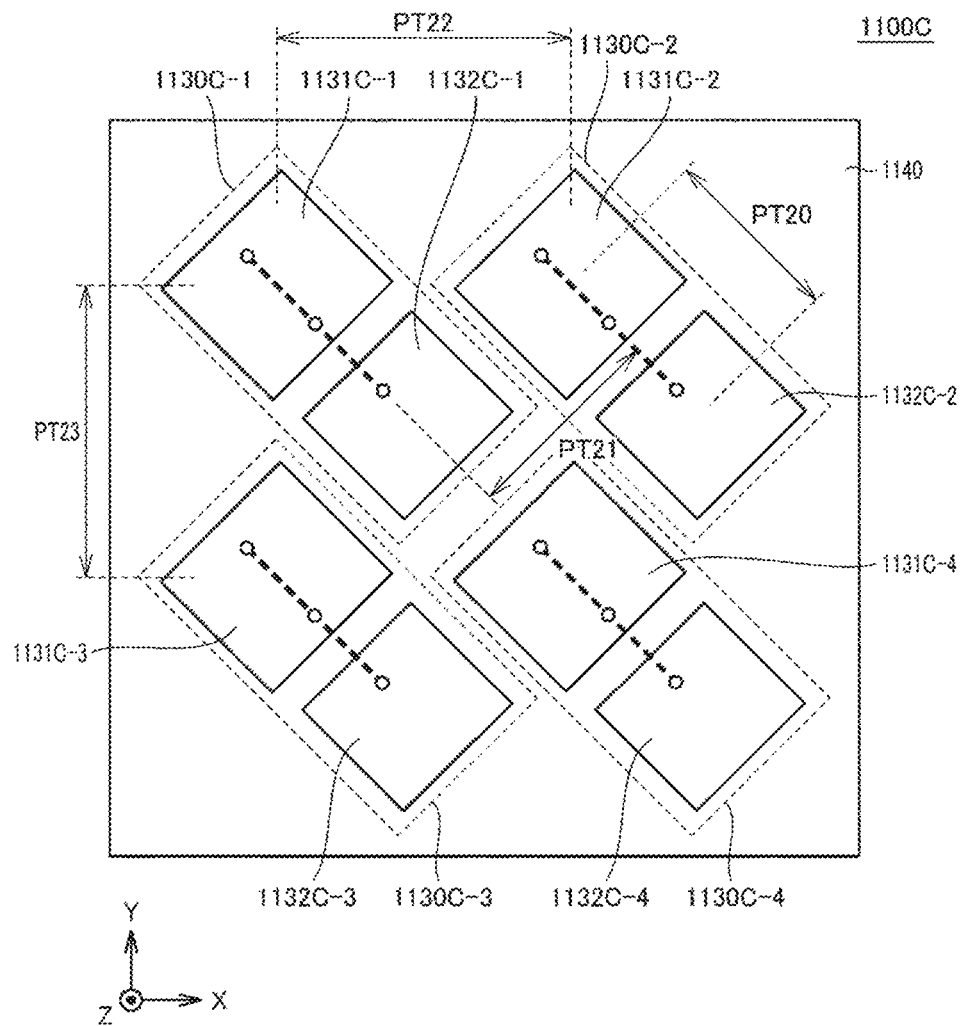
FIG. 35 is a plan view of an antenna module according to Example 24.

FIG. 35 is a plan view of an antenna module 1100C according to Example 24. The antenna module 1100C includes four sub-arrays 1130C-1 to 1130C-4. Each sub-array is made up of two radiating elements, and the two radiating elements are disposed such that the arrangement direction is inclined with respect to the X-axis of the dielectric substrate 1140.

Each radiating element is made up of two radiating elements with different element sizes. For example, the element size of the radiating elements 1131C-1, 1131C-2, 1131C-3, 1131C-4 with a large element size is 26 GHz, and the element size of radiating elements 1132C-1, 1132C-2, 1132C-3, 1132C-4 with a small element size is 28 GHz.

The sub-array 1130C-2 is disposed adjacent to the sub-array 1130C-1 in the positive direction of the X-axis. The sub-array 1130C-4 is disposed adjacent to the sub-array 1130C-3 in the positive direction of the X-axis. The sub-array 1130C-3 is disposed adjacent to the sub-array 1130C-1 in the negative direction (third direction) of the Y-axis orthogonal to the X-axis. The sub-array 1130C-4 is disposed adjacent to the sub-array 1130C-2 in the negative direction of the Y-axis.

When the distance between the centers of two radiating elements in each sub-array is set to PT20 and the distance between imaginary lines respectively passing through the centers of two radiating elements in each of the two adjacent sub-arrays is set to PT21, the distance PT21 is set so as to be longer than the element distance PT20. By disposing sub-arrays in such a positional relationship, coupling between adjacent sub-arrays is weakened as compared to coupling between two radiating elements in each sub-array, so isolation between sub-arrays is ensured, and the effect of expanding the frequency band width of each sub-array is able to be exerted.

When the spacing between two sub-arrays adjacent to each other in the X-axis direction (that is, the distance between the center of the radiating element 1131C-1 and the center of the radiating element 131C-2) is set to PT22 and the spacing between two sub-arrays adjacent to each other in the Y-axis direction (that is, the distance between the center of the radiating element 1131C-1 and the center of the radiating element 131C-3) is set to PT23, the sub-array spacings PT22, PT23 are set so as to be longer than the element distance PT20. By disposing sub-arrays in such a positional relationship, coupling between adjacent sub-arrays is weakened as compared to coupling between two radiating elements in each sub-array, so isolation between sub-arrays is ensured, and the effect of expanding the frequency band width of each sub-array is able to be exerted.

A sub-array spacing may be defined as a spacing between branch points of feed conductors each of which supplies a radio-frequency signal to an associated one of sub-arrays. To symmetrize the beam shape of radio waves to be radiated from the overall antenna module 1100C, it is desirable to equally set the sub-array spacing PT22 in the X-axis direction and the sub-array spacing PT23 in the Y-axis direction.

In FIG. 35, an example of an array antenna in which four radiating elements are arranged in a 2×2 two dimensional array has been described; however, an n×m (n, m each are a natural number greater than or equal to two) two-dimensional array may be formed by using a further larger number of radiating elements.

Example 25

In Example 24, the example in which adjacent sub-arrays have the same configuration in a two-dimensional array antenna has been described. In Example 25, a configuration in which, in a two-dimensional array antenna, sub-arrays are disposed such that the relationship between the element sizes of radiating elements of adjacent sub-arrays is inverted will be described.

Figure 36:
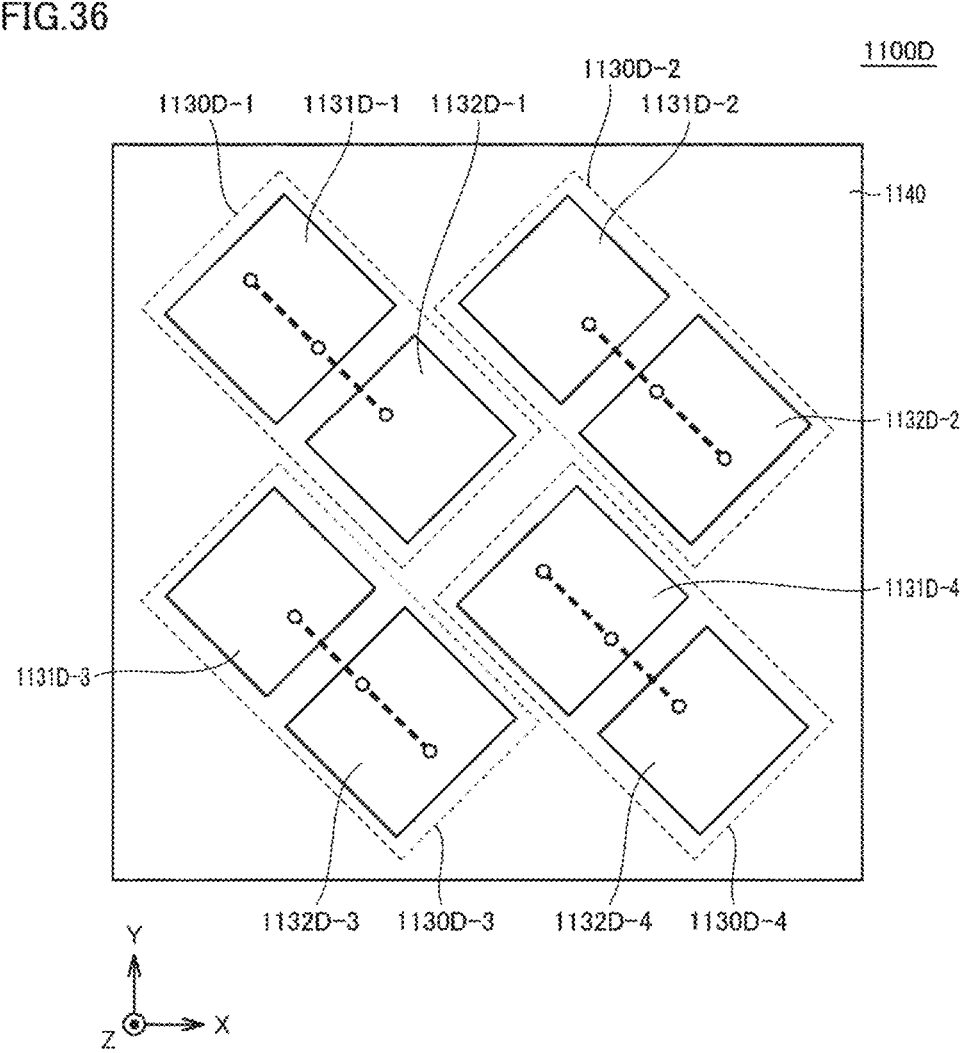
FIG. 36 is a plan view of an antenna module according to Example 25.

FIG. 36 is a plan view of an antenna module 1100D according to Example 25. The antenna module 1100D includes four sub-arrays 1130D-1 to 1130D-4. Each sub-array is made up of two radiating elements, and the two radiating elements are disposed such that the arrangement direction is inclined with respect to the X-axis of the dielectric substrate 1140.

Each radiating element is made up of two radiating elements with different element sizes. For the sub-arrays 1130D-1, 1130D-4, the element size (for example, 26 GHz) of the radiating elements 1131D-1, 1131D-4 is set so as to be larger than the element size (for example, 28 GHz) of the radiating elements 1132D-1, 1132D-4. On the other hand, for the sub-arrays 1130D-2, 1130D-3, the element size (for example, 28 GHz) of the radiating elements 1131D-2, 1131D-3 is set so as to be smaller than the element size (for example, 26 GHz) of the radiating elements 1132D-2, 1132D-3.

By disposing sub-arrays such that the relationship in size between radiating elements in adjacent sub-arrays is inverted in this way, the directivity of radio waves to be radiated is able to be adjusted.

Third Embodiment

In the first and second embodiments, the configuration in which the overall frequency band width is expanded by making the operable band widths of radiating elements that make up a sub-array partially overlap has been described.

In the third embodiment, the configuration of expanding the frequency band width in an array antenna in which a single radiating element is arranged in an array will be described.

Example 31

Figure 37:
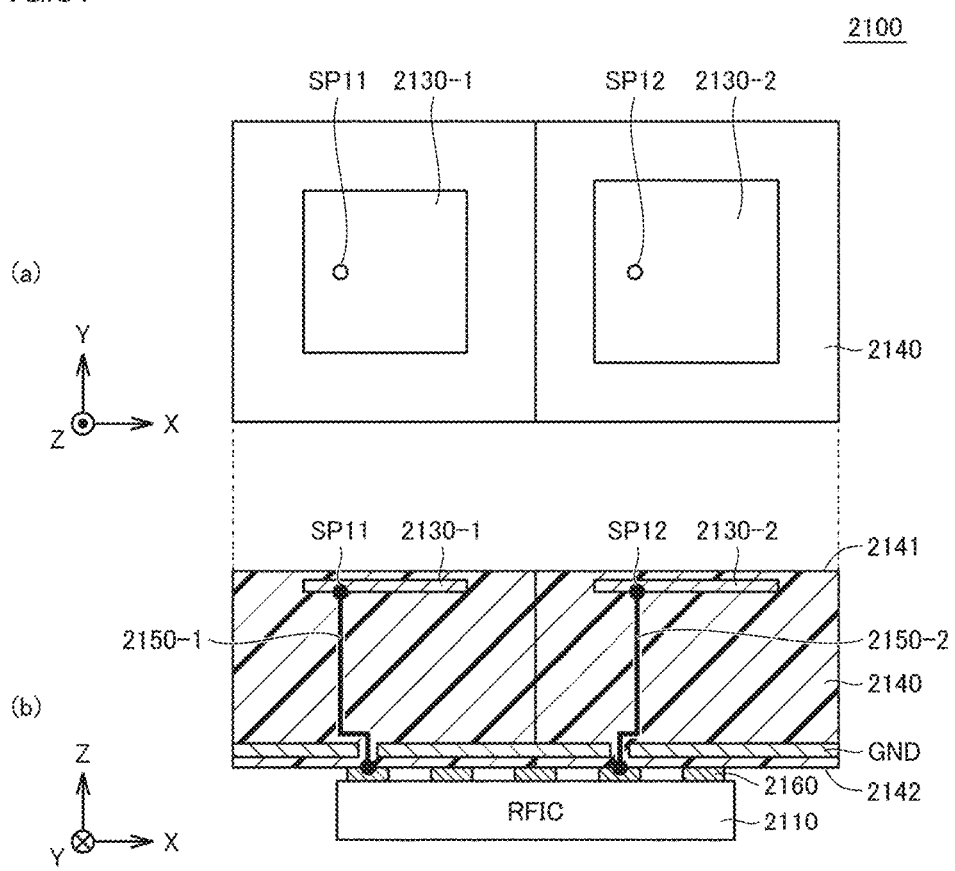
FIG. 37 shows a plan view and a side see-through view of an antenna module according to Example 31 of a third embodiment.

FIG. 37 shows a plan view and a side see-through view of an antenna module 2100 according to Example 31 of the third embodiment. As shown in FIG. 37, the antenna module 2100 includes a dielectric substrate 2140, radiating elements 2130-1, 2130-2, an RFIC 2110, and a ground electrode GND.

The radiating elements 2130-1, 2130-2 are disposed adjacent to each other in the X-axis direction in an inside layer or on a top surface-side surface 2141 of the dielectric substrate 2140. In the dielectric substrate 2140, the flat ground electrode GND is disposed opposite the radiating elements 2130-1, 2130-2 in a bottom surface-side layer with respect to the radiating elements 2130-1, 2130-2. The RFIC 2110 is disposed on a back surface 2142 of the dielectric substrate 2140 via a solder bump 2160.

A common radio-frequency signal is supplied by an individual feed conductor to each of the radiating elements 2130-1, 2130-2. Specifically, a radio-frequency signal is supplied from the RFIC 2110 by a feed conductor 2150-1 to the radiating element 2130-1. The feed conductor 2150-1 extends from the RFIC 2110 through the ground electrode GND and is coupled to the feed point SP11 of the radiating element 2130-1. A radio-frequency signal is supplied from the RFIC 2110 by a feed conductor 2150-2 to the radiating element 2130-2. The feed conductor 2150-2 extends from the RFIC 2110 through the ground electrode GND and is coupled to the feed point SP12 of the radiating element 2130-2.

The feed point SP11 of the radiating element 2130-1 and the feed point SP12 of the radiating element 2130-2 each are disposed at a location offset in the negative direction of the X-axis from the center of an associated one of the radiating elements. Thus, radio waves with the X-axis direction as the polarization direction are radiated from each of the radiating element 2130-1, 2130-2.

Here, in the antenna module 2100, the element size of the radiating element 2130-1 is set so as to be smaller than the element size of the radiating element 2130-2. When for example, a 27 GHz-band radio-frequency signal is radiated from the antenna module 2100, the element size of the radiating element 2130-1 is set to a size corresponding to 28 GHz, and the element size of the radiating element 2130-2 is set to a size corresponding to 26 GHz. In other words, the frequency characteristics of the impedance of the radiating element 2130-1, when viewed from the RFIC 2110, are different from the frequency characteristics of the impedance of the radiating element 2130-2.

Figure 38:
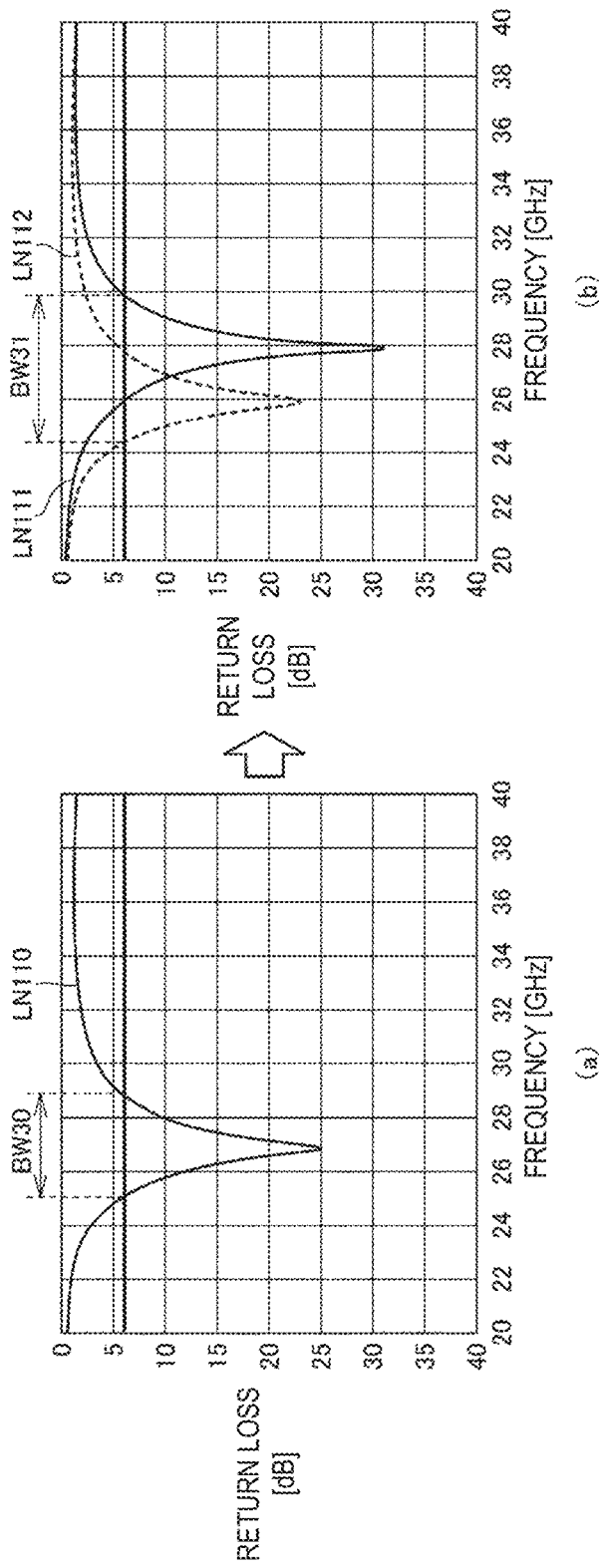
FIG. 38 is a view for illustrating the frequency characteristics of each radiating element in Example 31.

FIG. 38 is a graph showing the frequency characteristics of return losses of radiating elements in the case of Comparative Example in which two radiating elements have the same element size (27 GHz) and the case of Example 31 of FIG. 37. In the case of Comparative Example with the same element size (FIG. 38(*a*)), the return loss of both radiating elements is as represented by the line LN110. In this case, the operable band width of which the return loss is lower than or equal to 6 dB is BW30.

On the other hand, in the case of Example 31 (FIG. 38(*b*)), the return loss of the radiating element 2130-1 is represented by the line LN111 (continuous line), and the return loss of the radiating element 2130-2 is represented by the line LN112 (dashed line). In other words, the mutual operable band widths partially overlap. Thus, the operable band width of the overall antenna module 2100 is BW31, so the frequency band width of the antenna module 2100 is expanded as compared to Comparative Example.

When the frequency characteristics of the gain of radio waves to be radiated from the antenna module are observed, the characteristics of two radiating elements are the same in the case of Comparative Example, so single-peak gain characteristics in which a peak gain is high and steeply attenuates (that is, the frequency band width is narrow) are obtained. On the other hand, in the case of Example 31, a combination of two different gain characteristics is obtained, so both-side gain characteristics are obtained. For this reason, a total peak gain is low as compared to Comparative Example; however, gain characteristics in which a gain gently attenuates as a whole are obtained. Therefore, for example, the region in which a gain reduced by 3 dB from a peak gain can be achieved (that is, the region in which the power of radio waves is higher than or equal to 50% of the peak) is wider in Example 31 than in Comparative Example. In other words, a wider band width of gain is achieved.

In FIG. 37, the case of the patch antenna in which the radiating elements 2130-1, 2130-2 are insulated from the ground electrode GND has been described. Alternatively, as in the case of an antenna module 2100A of Modification Examples 3 of FIG. 39, an inverted-F patch antenna in which each of the end portions of the radiating elements 2130A-1, 2130A-2 is connected to the ground electrode GND by an associated one of vias V1, V2 may be used.

In Example 31, the "radiating element 2130-1" and the "radiating element 2130-2" respectively correspond to the "first radiating element" and the "second radiating element" in the present disclosure. The "feed conductor 2150-1" and the "feed conductor 2150-2" in Example 31 respectively correspond to the "first feed conductor" and the "second feed conductor" in the present disclosure.

Figure 39:
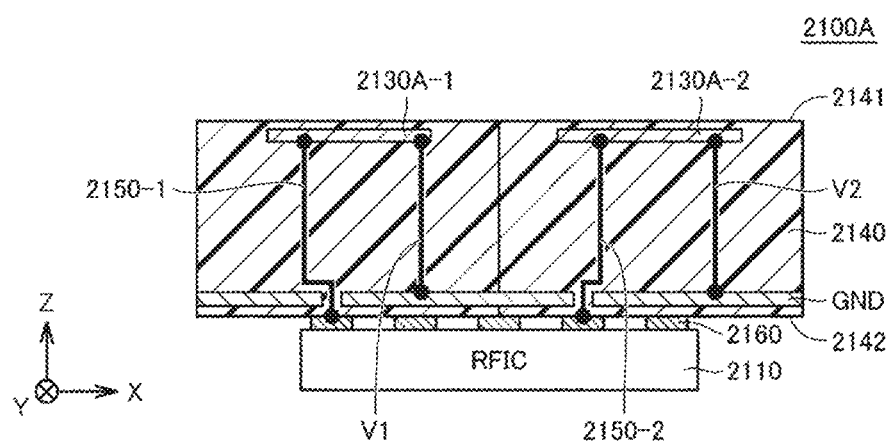
FIG. 39 is a side see-through view of an antenna module according to Modification Example 3.

In Modification Example 3 of FIG. 39, the "radiating element 2130A-1" and the "radiating element 2130A-2" respectively correspond to the "first radiating element" and the "second radiating element" in the present disclosure.

Comparative Example 32

In Example 31, the array antenna in which two radiating elements with different sizes are arranged has been described. However, in this case, the antenna module is not symmetric as a whole, so there is a case where symmetry is not achieved in antenna characteristics (gain, loss). In Example 32, a configuration that symmetrize the antenna characteristics by using two sets of the configuration described in Example 31 will be described.

Figure 40:
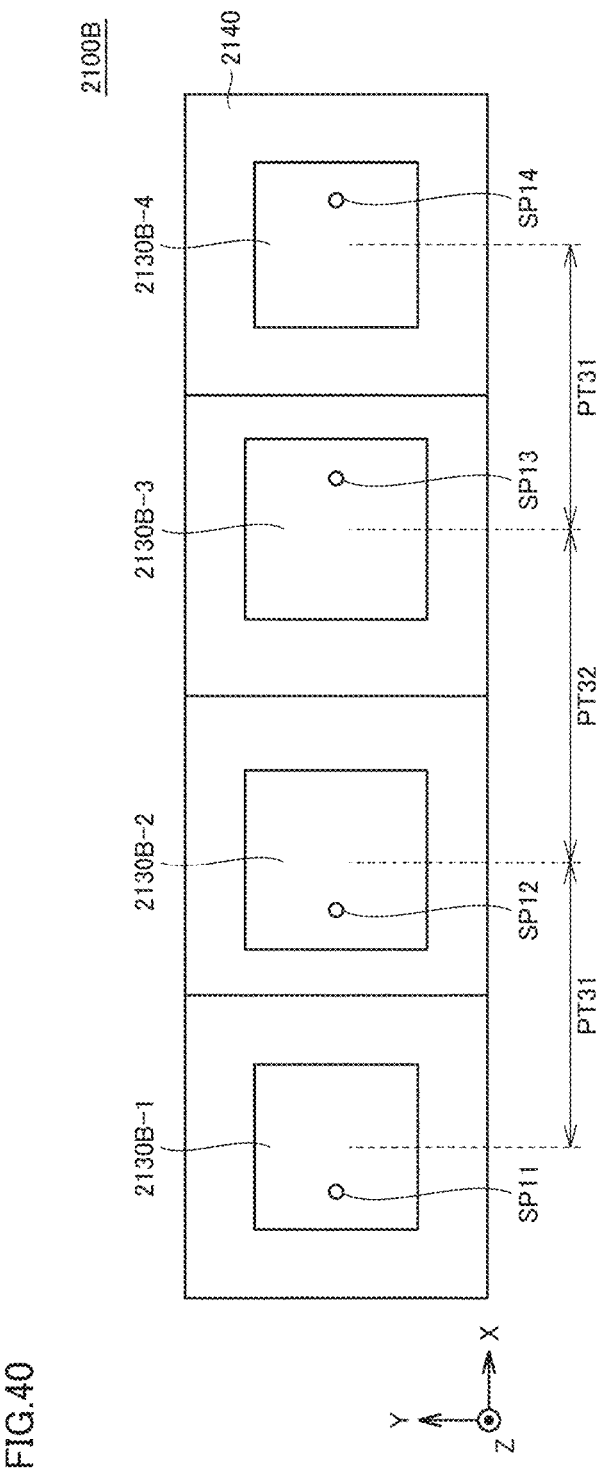
FIG. 40 is a plan view of an antenna module according to Example 32.

FIG. 40 is a plan view of an antenna module 2100B according to Example 32. The antenna module 2100B is a one-dimensional array antenna that includes four radiating elements 2130B-1 to 2130B-4. The radiating elements 2130B-1 to 2130B-4 are arranged in a line in order of the radiating elements 2130B-1, 2130B-2, 2130B-3, 2130B-4 in the X-axis direction.

In the antenna module 2100B, the radiating element 2130B-1 and the radiating element 2130B-4 have the same configuration, and the radiating element 2130B-2 and the radiating element 2130B-3 have the same configuration. In other words, the element size of the radiating element 2130B-1 and the element size of the radiating element 2130B-4 are the same and have, for example, an element size of 28 GHz. The element size of the radiating element 2130B-2 and the element size of the radiating element 2130B-3 are the same and have, for example, an element size of 26 GHz. Therefore, the frequency characteristics of the impedance of the radiating element 2130-3, when viewed from the RFIC 2110, are different from the frequency characteristics of the impedance of the radiating element 2130-4. Although not shown in FIG. 40, in Example 32, as in the case of Example 31, a common radio-frequency signal is supplied by an individual feed conductor to each radiating element.

In Example 32, the distance between the radiating element 2130B-1 and the radiating element 2130B-2 and the distance between the radiating element 2130B-3 and the radiating element 2130B-4 each are set to PT31. On the other hand, the distance between the radiating element 2130B-2 and the radiating element 2130B-3 is set to PT32 (>PT31). The inner-side radiating elements 2130B-2, 2130B-3 are larger in element size than the outer-side radiating elements 2130B-1, 2130B-4, so the inner-side radiating elements 2130B-2, 2130B-3 need a wider ground electrode GND than the outer-side radiating elements 2130B-1, 2130B-4. When radiating elements have mutually large element sizes, coupling between the elements can also increase. Therefore, when the distance PT32 between the radiating element 2130B-2 and the radiating element 2130B-3 is set so as to be greater than the distance PT31 between the radiating element 2130B-1 and the radiating element 2130B-2 (or between the radiating element 2130B-3 and the radiating element 2130B-4), antenna characteristics are able to be brought close to the original characteristics of the radiating elements 2130B-2, 2130B-3 with relatively large element sizes.

The feed point SP11 of the radiating element 2130B-1 and the feed point SP12 of the radiating element 2130B-2 each are disposed at a location offset in the negative direction of the X-axis from the center of an associated one of the radiating elements. The feed point SP13 of the radiating element 2130B-3 and the feed point SP14 of the radiating element 2130B-4 each are disposed at a location offset in the positive direction of the X-axis from the center of an associated one of the radiating elements. Then, a radio-frequency signal in phase inverted with respect to a radio-frequency signal supplied to the radiating element 2130B-1 and the radiating element 2130B-2 is supplied to the radiating element 2130B-3 and the radiating element 2130B-4. Thus, radio waves with the X-axis direction as the polarization direction are radiated from each of the radiating elements.

Figure 41:
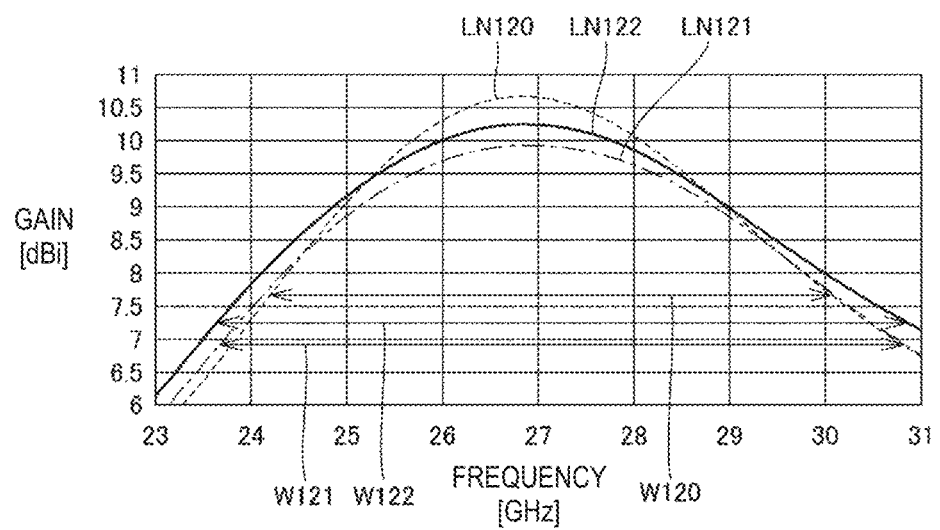
FIG. 41 is a view for illustrating the frequency characteristics of the gain of the antenna module according to Example 32.

FIG. 41 is a graph showing the frequency characteristics of the gain of the antenna module 2100B according to Example 32. In FIG. 41, the case of Comparative Example in which four radiating elements all have the same element size is represented by the line LN120 (dashed line), the case where the pitch of radiating elements is the same (PT31=PT32) is represented by the line LN121 (alternate long and short dashed line), and the case where the pitch of radiating elements is different (PT31<PT32) is represented by the line LN122 (continuous line).

Referring to FIG. 41, in the case of Comparative Example (the line LN120), the peak gain is about 10.7 dBi, and the frequency band width for a peak gain of −3 dB (W120) is 6.0 GHz. In the case of the same element-to-element pitch with different element sizes (the line LN121), the peak gain is about 9.9 dBi, and the frequency band width for a peak gain of −3 dB (W121) is 7.1 GHz. When the element-to-element pitch is different with the different element sizes (the line LN122), the peak gain is about 10.2 dBi, and the frequency band width for a peak gain of −3 dB (W122) is 7.3 GHz.

In this way, in the antenna module 2100B, as in the case of Example 31, by changing the sizes of adjacent radiating elements to make the operable band widths partially overlap, the frequency band width of antenna characteristics (return loss, gain) is expanded, and furthermore, the symmetry of the antenna characteristics is improved by symmetrically disposing radiating elements. By adjusting the pitch of radiating elements, a wider band of gain is achieved while a decrease in peak gain is suppressed.

In Example 32, a one-dimensional array antenna that includes four radiating elements has been described. Alternatively, the number of radiating elements may be five or more.

In Example 32, the "radiating element 2130B-1", the "radiating element 2130B-2", the "radiating element 2130B-3", and the "radiating element 2130B-4" respectively correspond to the "first radiating element", the "second radiating element", the "third radiating element", and the "fourth radiating element" in the present disclosure.

Example 33

In Examples 31 and 32, the configuration in which the frequency characteristics of the impedances of radiating elements are varied by varying the element sizes of adjacent radiating elements has been described.

In Example 33, as in the case of Example 3 of the first embodiment, a configuration in which the frequency characteristics of the impedances of radiating elements are varied by varying the length of feed conductors respectively connected to adjacent radiating elements will be described.

Figure 42:
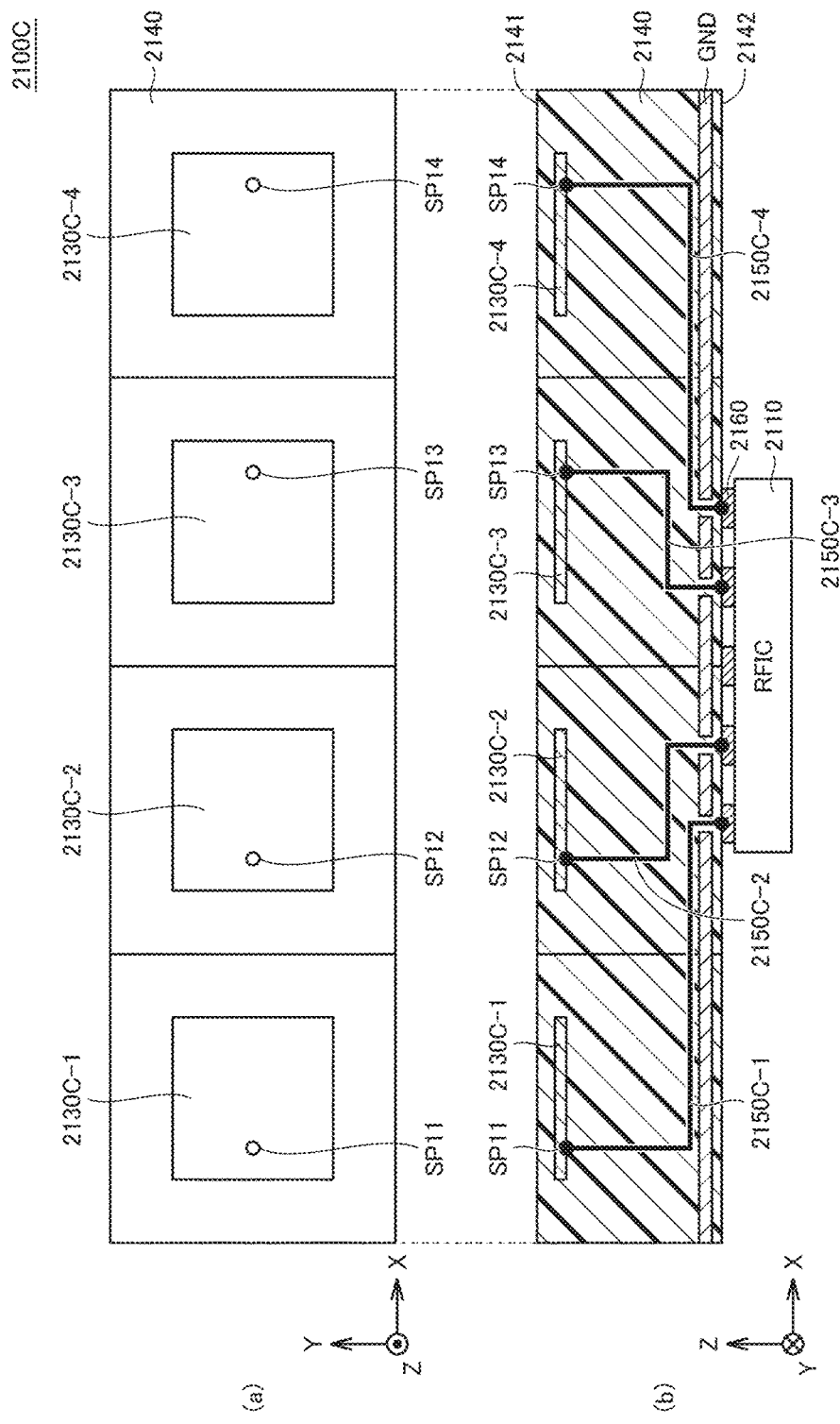
FIG. 42 shows a plan view and a side see-through view of an antenna module according to Example 33.

FIG. 42 is a plan view (FIG. 42(a)) and a side see-through view (FIG. 42(b)) of an antenna module 2100C according to Example 33. The antenna module 2100C, as in the case of the antenna module 2100B of Example 32, is a one-dimensional array antenna in which four radiating elements 2130C-1 to 2130C-4 are arranged in a line. In the antenna module 2100C, radiating elements all have the same element sizes.

A common radio-frequency signal is supplied to each of the radiating elements 2130C-1 to 2130C-4 by an associated one of feed conductors 2150C-1 to 2150C-4. The length of the feed conductors 2150C-1, 2150C-4 respectively used for the outer-side radiating elements 2130C-1, 2130C-4 is longer than the length of the feed conductors 2150C-2, 2150C-3 respectively used for the inner-side radiating elements 2130C-2, 2130C-3. In this way, by varying the length of the feed conductor from the RFIC 2110 to each feed point, the frequency characteristics of the impedances when viewed from the RFIC 2110 are set to different values. Thus, the operable band widths of adjacent radiating elements partially overlap, so the frequency band width of antenna characteristics (return loss, gain) is expanded.

Figure 43:
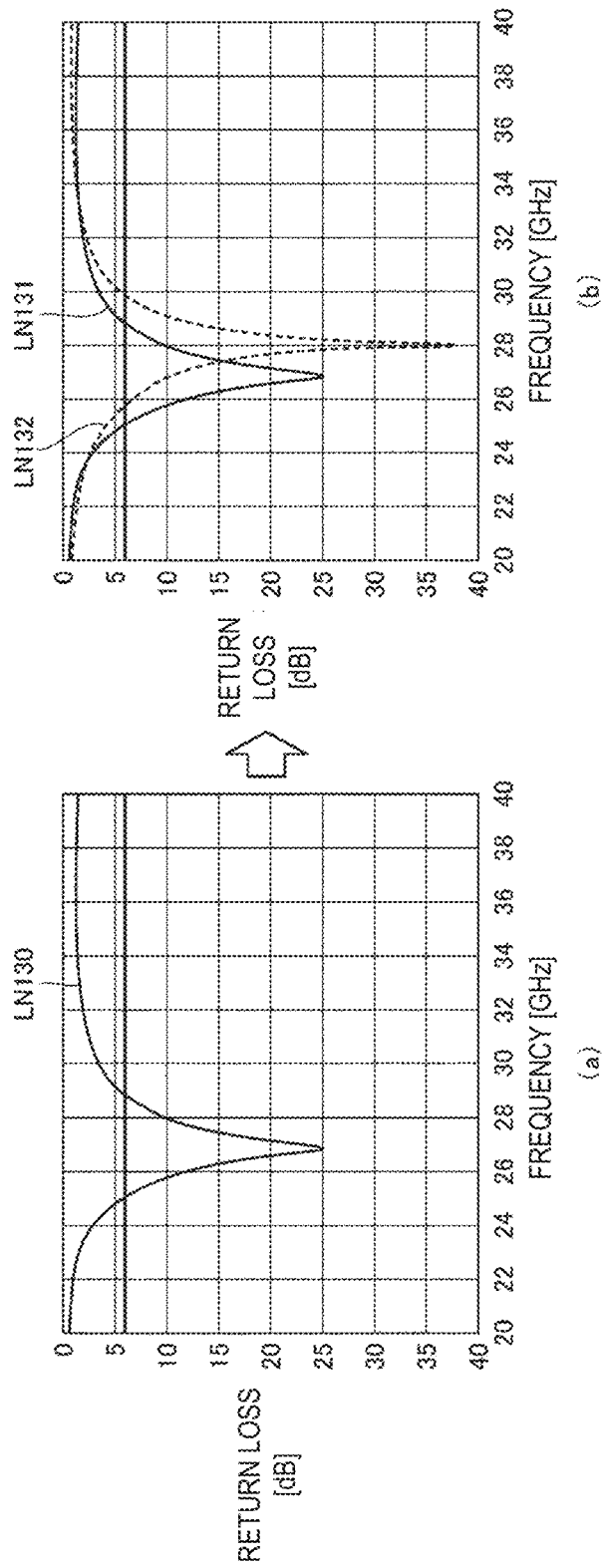
FIG. 43 is a view for illustrating the frequency characteristics of each radiating element in Example 33.

FIG. 43 is a view for illustrating the frequency characteristics of the return loss of each radiating element in Example 33. FIG. 43(a) shows the frequency characteristics (the line LN130) in the case of Comparative Example in which the feed conductor from the RFIC 2110 to each radiating element has the same length. FIG. 43(b) shows the frequency characteristics in the case of Example 33. In FIG. 43(b), the frequency characteristics of the radiating elements 2130C-1, 2130C-4 with a long feed conductor are represented by the line LN131 (continuous line), and the frequency characteristics of the radiating elements 2130C-2, 2130C-3 with a short feed conductor are represented by the line LN132 (dashed line). As shown in FIG. 43, the operable band widths partially overlap in Example 33, so the operable band width of the overall antenna module is expanded in Example 33 as compared to Comparative Example.

Figure 44:
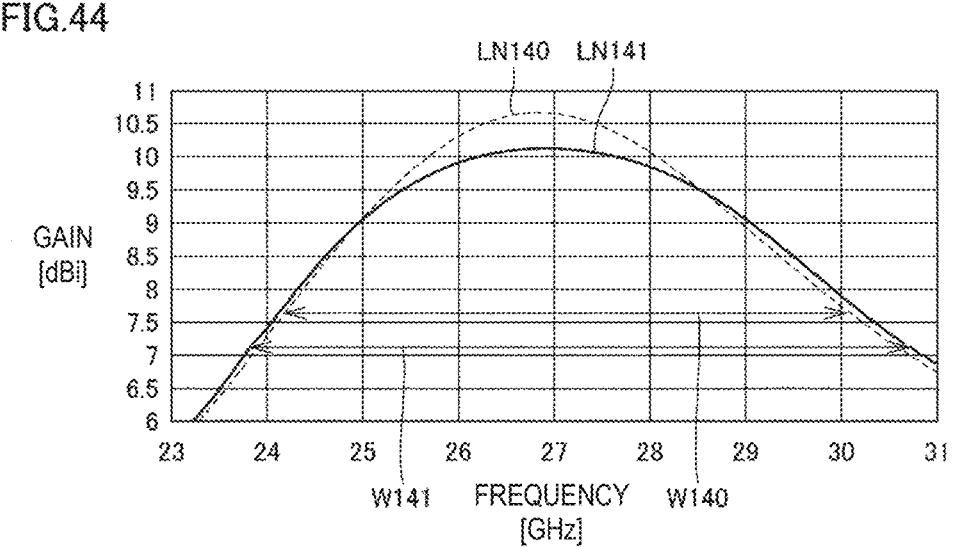
FIG. 44 is a view for illustrating the frequency characteristics of the gain of the antenna module according to Example 33.

FIG. 44 is a graph showing the frequency characteristics of the gain of the antenna module 2100C according to Example 33. In FIG. 44, the case of Comparative Example in which the length of the feed conductor to each radiating element is the same is represented by the line LN140 (dashed line), and the case of Example 33 in which the length of the feed conductor is varied is represented by the line LN141 (continuous line). In the case of Comparative Example, the peak gain is about 10.7 dBi, and the frequency band width for a peak gain of −3 dB (W140) is 6.0 GHz. On the other hand, in the case of Example 33, the peak gain is about 10.1 dBi, and the frequency band width for a peak gain of −3 dB (W141) is 6.9 GHz.

In this way, in the antenna module 2100C, by changing the feed conductor to supply a radio-frequency signal for adjacent radiating elements in a one-dimensional array antenna to make the operable band widths partially overlap, the frequency band width of antenna characteristics (return loss, gain) is expanded.

In Example 33, the "radiating element 2130C-1", the "radiating element 2130C-2", the "radiating element 2130C-3", and the "radiating element 2130C-4" respectively correspond to the "first radiating element", the "second radiating element", the "third radiating element", and the "fourth radiating element" in the present disclosure. The "feed conductor 2150C-1" and the "feed conductor 2150C-2" in Example 33 respectively correspond to the "first feed conductor" and the "second feed conductor" in the present disclosure.

Example 34

In Example 34, as in the case of Example 4 of the first embodiment, a configuration in which the frequency characteristics of the impedances of radiating elements are varied by disposing stubs in the feed conductors respectively connected to adjacent radiating elements will be described.

Figure 45:
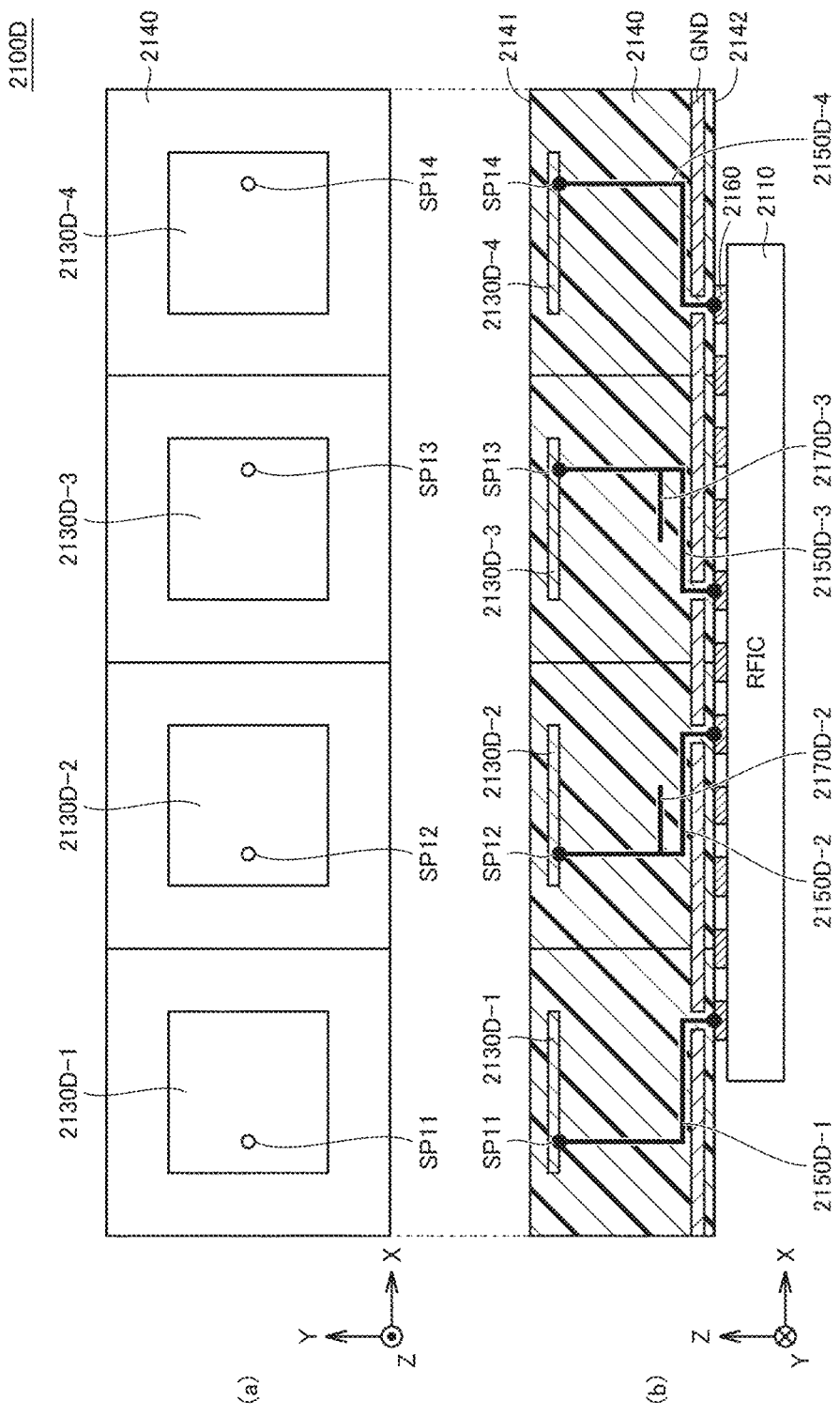
FIG. 45 shows a plan view and a side see-through view of an antenna module according to Example 34.

FIG. 45 is a plan view (FIG. 45(a)) and a side see-through view (FIG. 45(b)) of an antenna module 2100D according to Example 34. The antenna module 2100D is a one-dimensional array antenna in which, as in the case of the antenna module 2100C of Example 33, four radiating elements 2130D-1 to 2130D-4 with the same element sizes are arranged in a line, and the length of each of feed conductors 2150D-1 to 2150D-4 from the RFIC 2110 to an associated one of radiating elements is the same length. However, in the antenna module 2100D, for the inner-side radiating elements 2130D-2, 2130D-3, stubs are respectively disposed in associated feed conductors. Specifically, a stub 2170D-2 is disposed in the feed conductor 2150D-2, and a stub 2170D-3 is disposed in the feed conductor 2150D-3. These stubs 2170D-2, 2170D-3 are not provided to block the frequency band of the other one of the radiating elements and is provided to adjust impedance matching between the RFIC 2110 and each radiating element.

Figure 46:
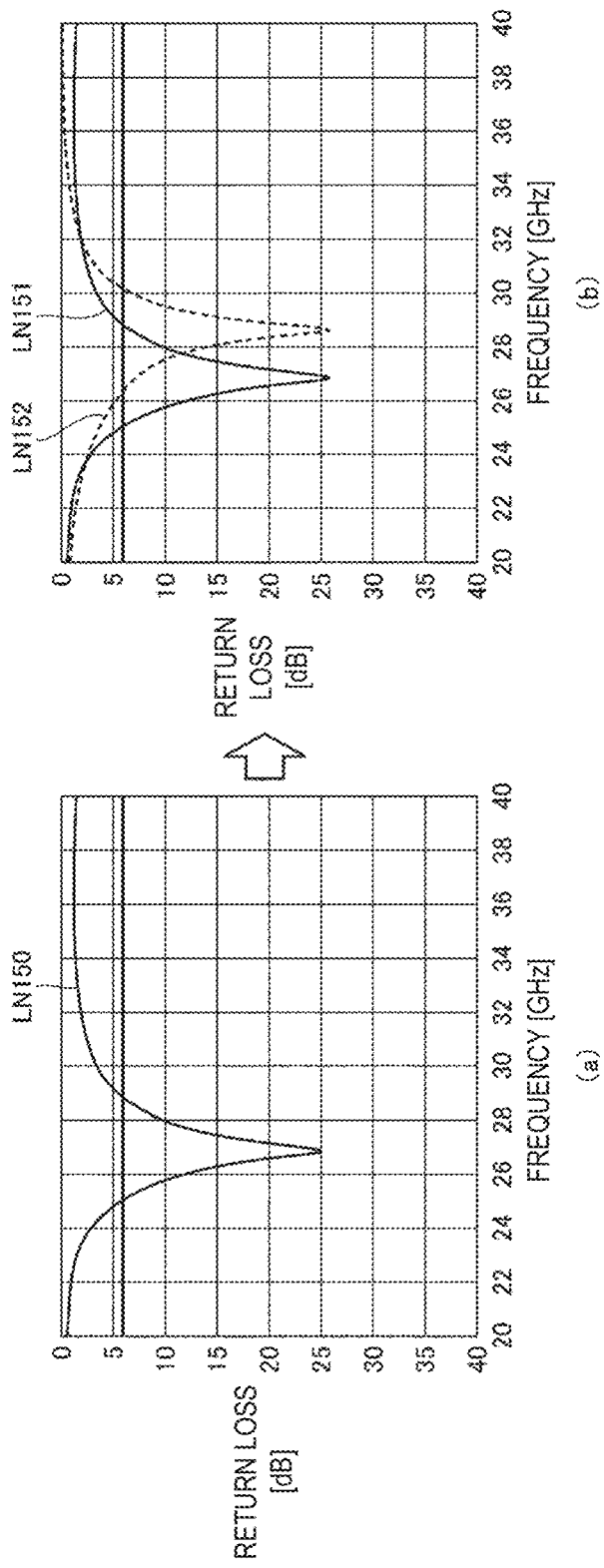
FIG. 46 is a view for illustrating the frequency characteristics of each radiating element in Example 34.

FIG. 46 is a view for illustrating the frequency characteristics of the return loss of each radiating element in Example 34. FIG. 46(a) shows the frequency characteristics (the line LN150) of the case of Comparative Example in which the feed conductor from the RFIC 2110 to each radiating element has the same length and no stub is provided in each feed conductor. In this case, the radiating elements have the same frequency characteristics.

On the other hand, as shown in FIG. 46(b), in the case of the radiating elements 2130D-2, 2130D-3 for which a stub is disposed in the feed conductor (LN152 of FIG. 46(b): dashed line), the resonant frequency shifts toward a higher frequency side as a result of a change in impedance as compared to the case of the radiating elements 2130D-1, 2130D-4 for which no stub is disposed in the feed conductor (LN151 of FIG. 46(b): continuous line). Thus, the operable band width in each of the radiating elements 2130D-1, 2130D-4 and the operable band width in each of the radiating elements 2130D-2, 2130D-3 partially overlap. Thus, the frequency band width of antenna characteristics in the antenna module 2100D is expanded.

Figure 47:
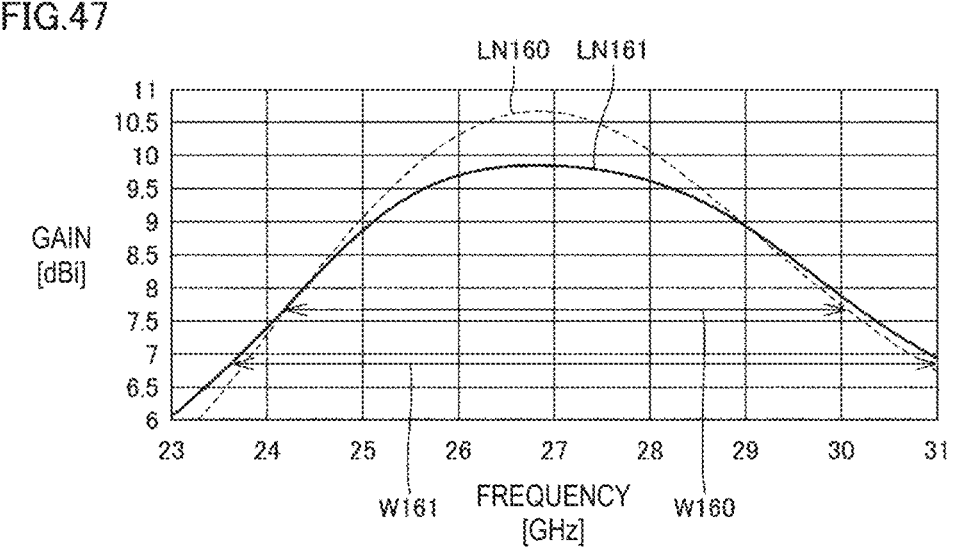
FIG. 47 is a view for illustrating the frequency characteristics of the gain of the antenna module according to Example 34.

FIG. 47 is a graph showing the frequency characteristics of the gain of the antenna module 2100D according to Example 34. In FIG. 47, the case of Comparative Example is represented by the line LN160 (dashed line), and the case of Example 33 in which a stub is disposed in each of the feed conductors of the inner-side radiating elements 2130D-2, 2130D-3 is represented by the line LN161 (continuous line). In the case of Comparative Example, the peak gain is about 10.7 dBi, and the frequency band width for a peak gain of −3 dB (W160) is 6.0 GHz. On the other hand, in the case of Example 34, the peak gain is about 9.8 dBi, and the frequency band width for a peak gain of −3 dB (W161) is 7.8 GHz.

In this way, in the antenna module 2100D, by disposing a stub in one of the feed conductors to supply a radio-frequency signal to adjacent radiating elements in a one-dimensional array antenna to make the operable band widths partially overlap, the frequency band width of antenna characteristics (return loss, gain) is expanded.

In the example of FIG. 47, a stub is disposed in each of the feed conductors of the inner-side radiating elements 2130D-2, 2130D-3 and no stub is disposed in each of the feed conductors of the outer-side radiating elements 2130D-1, 2130D-4. Alternatively, the frequency characteristics of the impedances of radiating elements may be varied by disposing stubs in the feed conductors with different lengths between the inner-side radiating elements and the outer-side radiating elements.

In Example 34, the "radiating element 2130D-1", the "radiating element 2130D-2", the "radiating element 2130D-3", and the "radiating element 2130D-4" respectively correspond to the "first radiating element", the "second radiating element", the "third radiating element", and the "fourth radiating element" in the present disclosure. The "feed conductor 2150D-1" and the "feed conductor 2150D-2" in Example 34 respectively correspond to the "first feed conductor" and the "second feed conductor" in the present disclosure. The "stub 2170D-2" in Example 34 corresponds to the "first stub" of the present disclosure.

Example 35

In Example 35, as in the case of Example 5 of the first embodiment, the configuration in which the frequency characteristics of the impedances of radiating elements are varied by varying the dielectric constants of dielectrics in which adjacent radiating elements are respectively disposed will be described.

Figure 48:
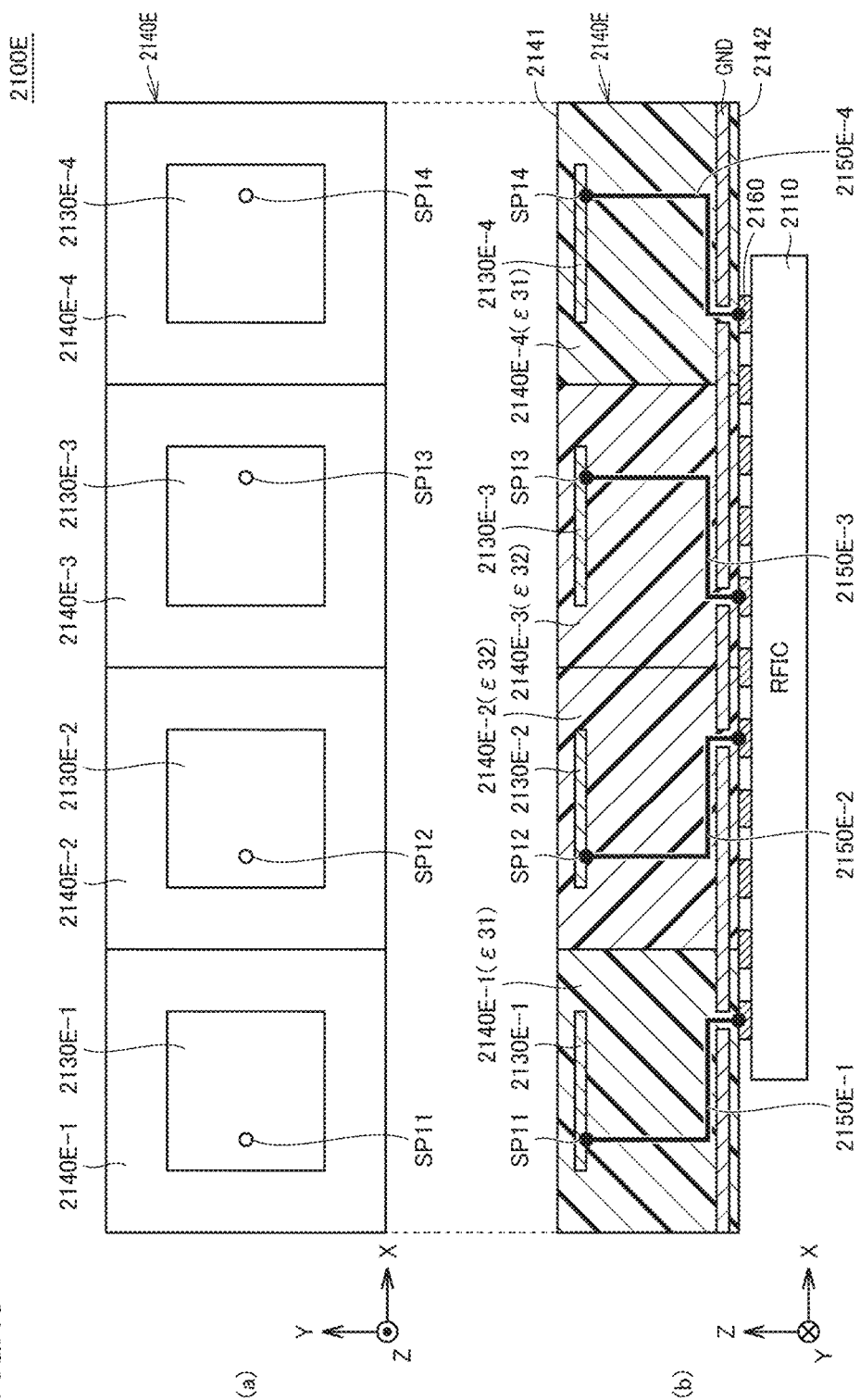
FIG. 48 shows a plan view and a side see-through view of an antenna module according to Example 35.

FIG. 48 is a plan view (FIG. 48(a)) and a side see-through view (FIG. 48(b)) of an antenna module 2100E according to Example 35. The antenna module 2100E is a one-dimensional array antenna in which, as in the case of the antenna module 2100C of Example 33, four radiating elements 2130E-1 to 2130E-4 with the same element size are arranged in a line, and the length of each of feed conductors 2150E-1 to 2150E-4 from the RFIC 2110 to an associated one of radiating elements is the same length. However, in the antenna module 2100E, the dielectric constant $\varepsilon32$ of dielectrics in which the inner-side radiating elements 2130E-2, 2130E-3 are disposed is higher than the dielectric constant $\varepsilon31$ of dielectrics in which the outer-side radiating elements 2130E-1, 2130E-4 are disposed. In other words, the dielectric constant $\varepsilon31$ of a dielectric disposed between the ground electrode GND and each of the radiating elements 2130E-1, 2130E-4 is different from the dielectric constant $\varepsilon32$ of a dielectric disposed between the ground electrode GND and each of the radiating elements 2130E-2, 2130E-3 ($\varepsilon31 \neq \varepsilon32$). Even when the element size of a radiating element and the distance between the radiating element and the ground electrode GND are the same, but when the dielectric constant between the radiating element and the ground electrode GND is different, the effective wave length of a signal that propagates through the dielectric substrate 2140 varies, with the result that the resonant frequency of the radiating element varies. Therefore, by varying the dielectric constant of the region in which each radiating element is formed, the operable band width in each radiating element is varied.

Figure 49:
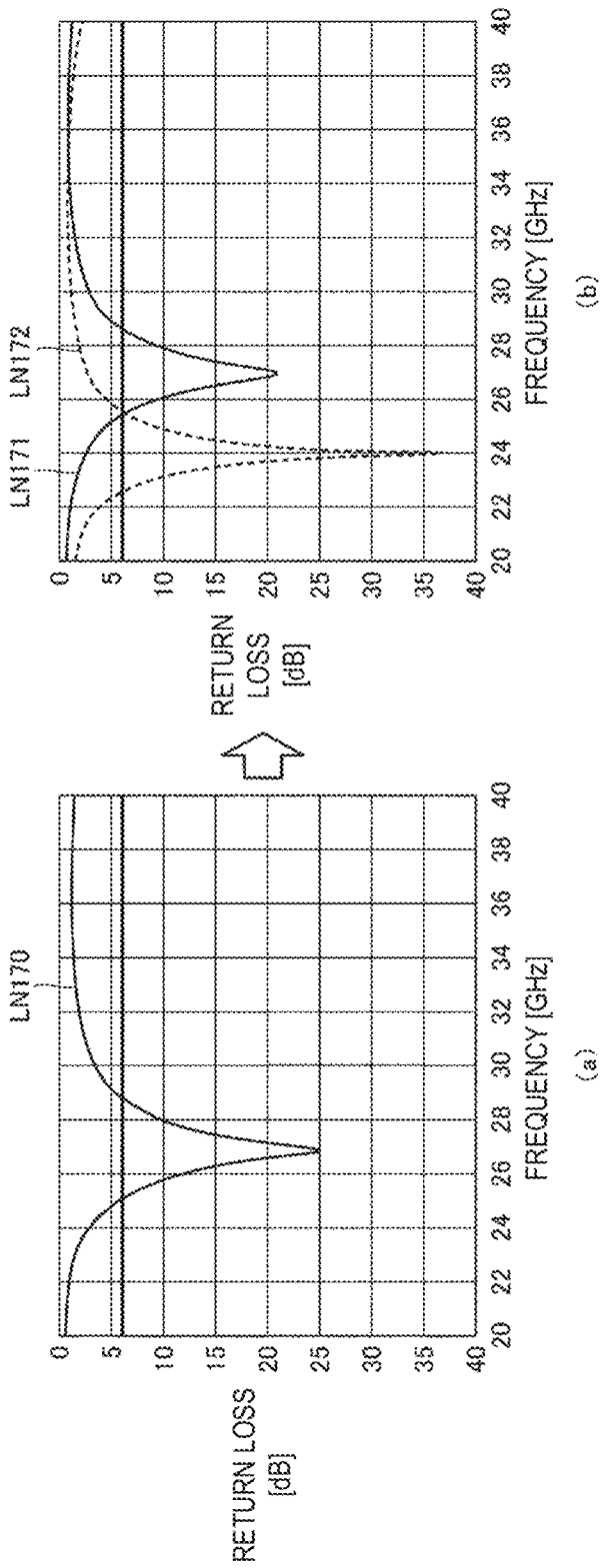
FIG. 49 is a view for illustrating the frequency characteristics of each radiating element in Example 35.

FIG. 49 is a view for illustrating the frequency characteristics of the return loss of each radiating element in Example 35. FIG. 49(a) shows the frequency characteristics (the line LN170) of the case of Comparative Example in which the feed conductor from the RFIC 2110 to each radiating element has the same length and the dielectric constants of dielectrics in which the radiating elements are disposed all are set to the same value as $\varepsilon31=2.9$. In this case, the resonant frequency of each of the radiating elements is 27 GHz, and the radiating elements have the same frequency characteristics.

FIG. 49(b) shows the frequency characteristics in the case where the dielectric constants of the dielectrics in which the outer-side radiating elements 2130E-1, 2130E-4 are respectively disposed is set to $\varepsilon31=2.9$ and the dielectric constants of the dielectrics in which the inner-side radiating elements 2130E-2, 2130E-3 are respectively disposed is set to $\varepsilon32=3.5$. As shown in FIG. 49(b), for the radiating elements 2130E-1, 2130E-4 disposed in the dielectrics having a low dielectric constant ($\varepsilon31=2.9$), the resonant frequency is 27 GHz as in the case of FIG. 49(a) (LN171 of FIG. 49(b): continuous line). On the other hand, the resonant frequency of each of the radiating elements 2130E-2, 2130E-3 disposed in the dielectrics having a high dielectric constant ($\varepsilon32=3.5$) is shifted to 24 GHz (LN172 of FIG. 49(b): dashed line). Thus, the operable band width in each of the radiating elements 2130E-1, 2130E-4 and the operable band width in each of the radiating elements 2130E-2, 2130E-3 partially overlap. Thus, the frequency band width of antenna characteristics in the antenna module 2100E is expanded.

Figure 50:
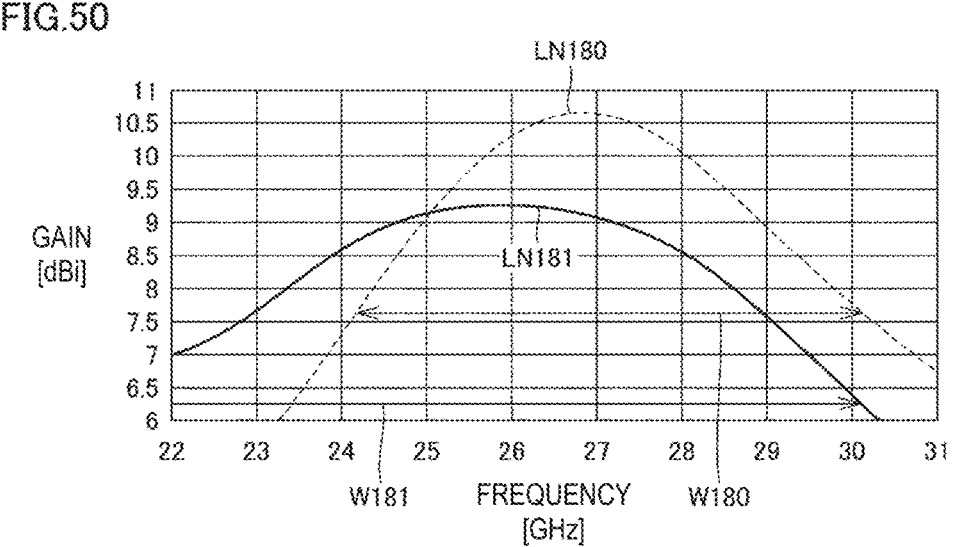
FIG. 50 is a view for illustrating the frequency characteristics of the gain of the antenna module according to Example 35.

FIG. 50 is a graph showing the frequency characteristics of the gain of the antenna module 2100E according to Example 35. In FIG. 50, the case of Comparative Example described above is represented by the line LN180 (dashed line), and the case of Example 35 in which the dielectric constants of the dielectrics in which the inner-side radiating elements 2130D-2, 2130D-3 are respectively disposed are changed is represented by the line LN171 (continuous line). In the case of Comparative Example, the peak gain is about 10.7 dBi, and the frequency band width for a peak gain of −3 dB (W180) is 6.0 GHz. On the other hand, in the case of Example 35, the peak gain is about 9.3 dBi, and the frequency band width for a peak gain of −3 dB (W181) is higher than or equal to 8.0 GHz.

In this way, in the antenna module 2100E, for adjacent radiating elements in a one-dimensional array antenna, by varying the dielectric constants of the dielectrics in which the radiating elements are respectively disposed to make the operable band widths partially overlap, the frequency band width of antenna characteristics (return loss, gain) is expanded.

In Example 35 as well, as in the case of Example 5 of the first embodiment, instead of the configuration in which a dielectric with a predetermined dielectric constant is disposed all over the region between the ground electrode and the radiating elements, the effective dielectric constant of the dielectric substrate may be varied by forming a cavity in part of the dielectric between the ground electrode and the radiating elements or partially disposing a dielectric with a different dielectric constant.

In Example 35, the "radiating element 2130E-1", the "radiating element 2130E-2", the "radiating element 2130E-3", and the "radiating element 2130E-4" respectively correspond to the "first radiating element", the "second radiating element", the "third radiating element", and the "fourth radiating element" in the present disclosure. The "feed conductor 2150E-1" and the "feed conductor 2150E-2" in Example 35 respectively correspond to the "first feed conductor" and the "second feed conductor" in the present disclosure.

Example 36

In Example 36, a configuration in which the frequency characteristics of the impedances of radiating elements are varied by disposing the location of a feed point that couples a feed conductor with an associated one of the radiating elements at a different location for each radiating element.

Figure 51:
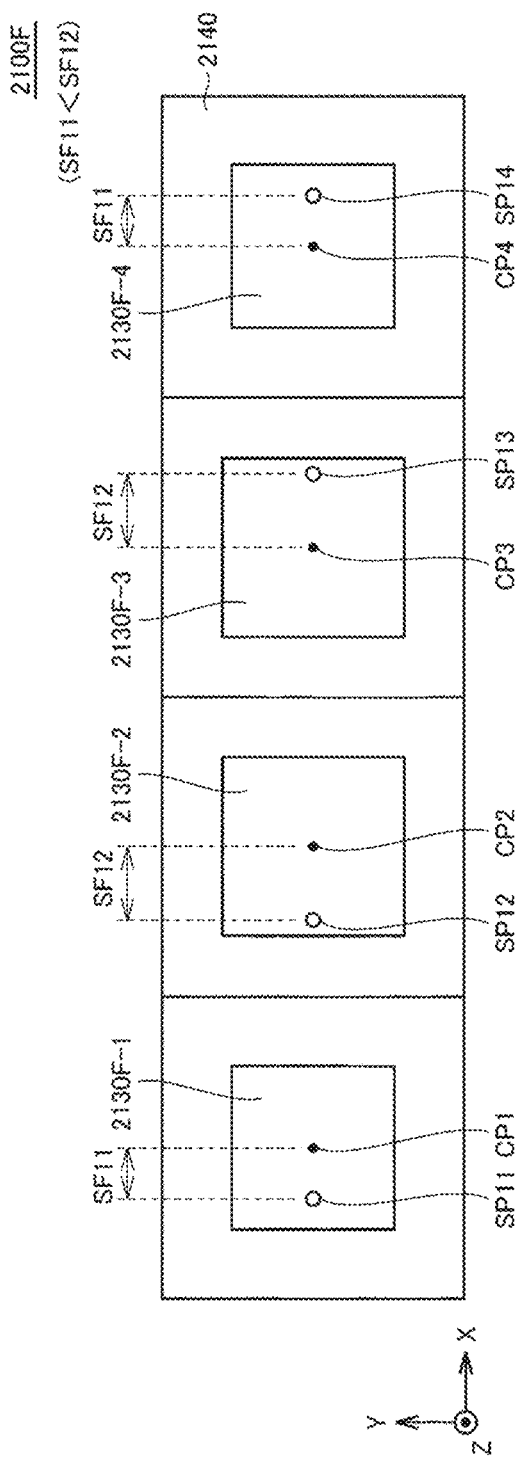
FIG. 51 is a plan view of an antenna module according to Example 36.

FIG. 51 is a plan view of an antenna module 2100F according to Example 36. The antenna module 2100F, as in the case of the antenna module 2100B of Example 33 shown in FIG. 40, is a one-dimensional array antenna formed by using four radiating elements with different element sizes. More specifically, the element size of each of the outer-side radiating elements 2130E-1, 2130E-4 is set so as to be smaller than the element size of each of the inner-side radiating elements 2130E-2, 2130E-3.

A radio-frequency signal is individually supplied from the RFIC 2110 by the feed conductor with the same length to the feed point of each radiating element. In the antenna module 2100F, the locations of the feed points of the outer-side radiating elements 2130E-1, 2130E-4 are different from the locations of the feed points of the inner-side radiating elements 2130E-2, 2130E-3. More specifically, for the radiating elements 2130E-1, 2130E-4, each of the distance from the center CP1 of the radiating element to the feed point SP11 and the distance from the center CP4 of the radiating element to the feed point SP14 is set to SF11. On the other hand, for the radiating elements 2130E-2, 2130E-3, each of the distance from the center CP2 of the radiating element to the feed point SP12 and the distance from the center CP3 of the radiating element to the feed point SP13 is set to SF12 (SF11>SF12).

It is known that, in a patch antenna, the impedance of a radiating element varies as the location of a feed point varies. When the element sizes are different, the locations of the feed points at which the characteristic impedance (for example, 50Ω) is obtained are also different. Therefore, in the case of the array antenna formed by using radiating elements with different element sizes as shown in FIG. 51, it is possible to optimize the gain in each radiating element by appropriately disposing the location of the feed point in accordance with the element size.

In the antenna module 2100F, the frequency band width of the overall antenna module is expanded by varying the element sizes of the adjacent radiating elements. Then, the gain of the antenna module is further improved by varying the location of the feed point in each radiating element in accordance with the element size to bring the impedance to match the characteristic impedance.

Figure 52:
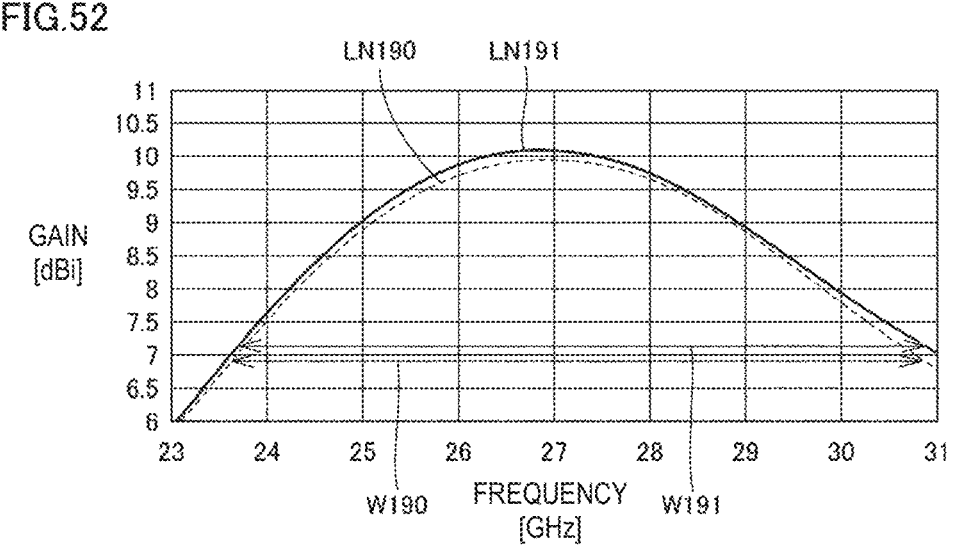
FIG. 52 is a view for illustrating the frequency characteristics of the gain of the antenna module according to Example 36.

FIG. 52 is a graph showing the frequency characteristics of the gain of the antenna module 2100F according to Example 36. FIG. 52 shows the frequency characteristics (the line LN190: dashed line) of the case of Comparative Example in which the distance from the center to the feed point in each radiating element is set to the same distance (SF11=SF12) and the frequency characteristics (the line LN191: continuous line) of the case of Example 36 in which the location of the feed point in each radiating element is disposed at an optimal location in the antenna module 2100F of FIG. 51.

As shown in FIG. 52, in Comparative Example and Example 36, the frequency band width for a peak gain of −3 dB is about the same; however, for a peak gain, Example 36 is slightly higher. In other words, a high gain is achieved while the frequency band width is maintained by optimizing the locations of the feed points.

In the above example, the configuration in which, for radiating elements with different element sizes, the location of the feed point is varied in accordance with the element size such that the characteristic impedance is obtained has been described. Alternatively, as in the case of Example 6 of the first embodiment, the frequency band width of the antenna module may be expanded by varying the locations of the feed points to make the operable band widths partially overlap for radiating elements with the same element size, disposed adjacent to each other.

In Examples of the above-described third embodiment, a so-called single polarization-type and single band-type antenna module has been described. Alternatively, the features may be applied to a dual polarization-type and/or dual band-type antenna module.

In Examples, a one-dimensional array antenna has been described. Alternatively, the features may be applied to a two-dimensional array antenna. In the case of a two-dimensional array antenna, a plurality of the above-described one-dimensional array antennas arranged in the X-axis direction may be arranged in the Y-axis direction or radiating elements arranged in the Y-axis direction may also have different frequency characteristics of the impedances as in the case of the above-described Examples.

In Example 36, the "radiating element 2130E-1", the "radiating element 2130E-2", the "radiating element 2130E-3", and the "radiating element 2130E-4" respectively correspond to the "first radiating element", the "second radiating element", the "third radiating element", and the "fourth radiating element" in the present disclosure. The "feed conductor 2150E-1" and the "feed conductor 2150E-2" in Example 36 respectively correspond to the "first feed conductor" and the "second feed conductor" in the present disclosure. The "feed point SP11" and the "feed point SP12" in Example 36 respectively correspond to the "first feed point" and the "second feed point" in the present disclosure.

Fourth Embodiment

In a fourth embodiment, Examples in which the aspects of the first to third embodiments are combined will be described.

Example 41

Figure 53:
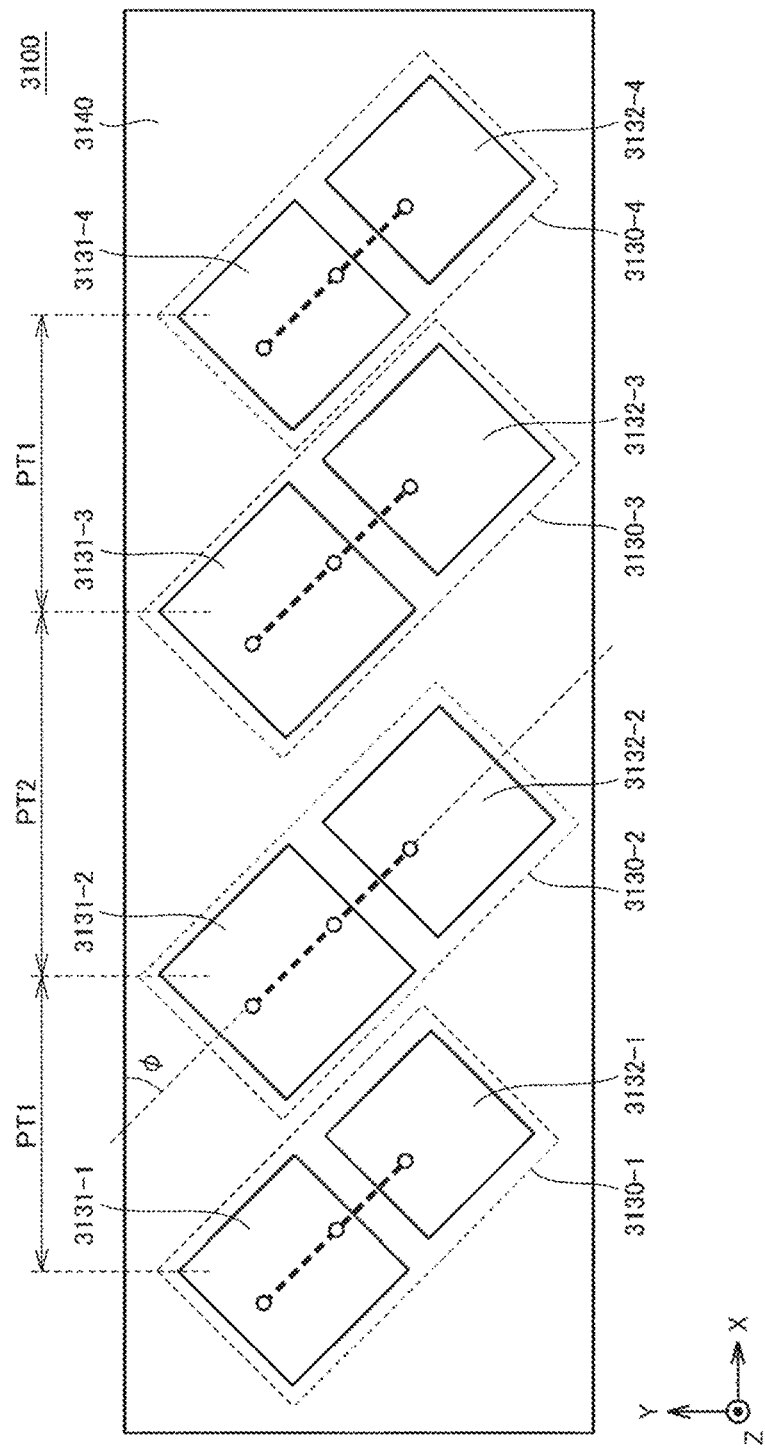
FIG. 53 is a plan view of an antenna module according to Example 41 of a fourth embodiment.

FIG. 53 is a plan view of an antenna module 3100 according to Example 41 of the fourth embodiment. In the antenna module 3100, four sub-arrays 3130-1 to 3130-4 are arranged in a rectangular dielectric substrate 3140 in a line in the X-axis direction (first direction). Each sub-array includes two radiating elements, and the two radiating elements are disposed in a direction (second direction) inclined at an angle of $\phi$ ($0°<\phi<90°$) with respect to the X-axis of the dielectric substrate 3140.

The spacing between the sub-array 3130-1 and the sub-array 3130-2 and the spacing between the sub-array 3130-3 and the sub-array 3130-4 both are set to PT1. On the other hand, the spacing between the sub-array 3130-2 and the sub-array 3130-3 is set to PT2 (PT1<PT2).

Each radiating element is made up of two radiating elements with different element sizes. Specifically, the sub-array 3130-1 includes a radiating element 3131-1 with a large element size and a radiating element 3132-1 with a small element size. The sub-array 3130-2 includes a radiating element 3131-2 with a large element size and a radiating element 3132-2 with a small element size. The sub-array 3130-3 includes a radiating element 3131-3 with a large element size and a radiating element 3132-3 with a small element size. The sub-array 3130-4 includes a radiating element 3131-4 with a large element size and a radiating element 3132-4 with a small element size.

In each sub-array, a radio-frequency signal is split and supplied from a common feed conductor to two radiating elements. In each sub-array, the distance from the branch point of the feed conductor to the feed point of each radiating element is set to the same length.

The sub-array 3130-1 and the sub-array 3130-4, disposed on the outer side, both have the same configuration. For example, the large-size radiating elements 3131-1, 3131-4 have the element size corresponding to 26 GHz, and the small-size radiating elements 3132-1, 3132-4 have the element size corresponding to 28 GHz.

The sub-array 3130-2 and the sub-array 3130-3, disposed on the inner side, both have the same configuration. For example, the large-size radiating elements 3131-2, 3131-3 have the element size corresponding to 25 GHz, and the small-size radiating elements 3132-2, 3132-3 have the element size corresponding to 27 GHz.

In the antenna module 3100, the operable band widths of two radiating elements partially overlap in each sub-array, so the operable band width of each sub-array is expanded. Furthermore, the operable band widths of adjacent sub-arrays also partially overlap, so the operable band width of the overall antenna module 3100 is expanded.

Furthermore, by disposing the sub-arrays so as to be inclined with respect to the side of the rectangular dielectric substrate 3140, the distance from the end portion orthogonal to the polarization direction of the radiating elements that make up each sub-array to the end portion of the dielectric substrate 3140 is ensured. Therefore, with these configurations, the frequency band width of the antenna module 3100 is expanded, and a wide-band antenna gain is obtained.

Figure 54:
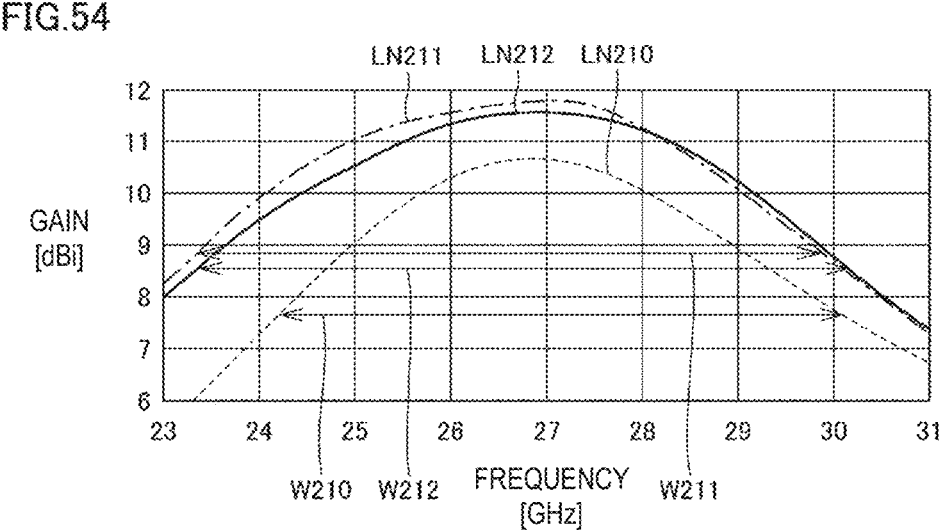
FIG. 54 is a view for illustrating the frequency characteristics of the gain of the antenna module according to Example 41.

FIG. 54 is a view for illustrating the frequency characteristics of the gain of the antenna module according to Example 41. FIG. 54 shows the frequency characteristics of the gain in the case of Comparative Example 41 (the line LN210: dashed line) in which all the element sizes of two radiating elements included in each sub-array are the same (27 GHz), in the case of Comparative Example 42 (the line LN211: alternate long and short dashed line) in which the element sizes of two radiating elements included in each sub-array are 26 GHz/28 GHz, and in the case of the antenna module 3100 of FIG. 53 (the line LN212: continuous line).

In the case of Comparative Example 41 (the line LN210), the peak gain is about 10.7 dBi, and the frequency band width for a peak gain of −3 dB (W210) is 6.0 GHz. In the case of Comparative Example 42 (the line LN211), the peak gain is about 11.7 dBi, and the frequency band width for a peak gain of −3 dB (W211) is 6.75 GHz. In the case of Example 41 (the line LN212), the peak gain is about 11.5 dBi, and the frequency band width for a peak gain of −3 dB (W212) is 7.0 GHz.

As shown in FIG. 54, in comparison with the case of Comparative Example 41 in which all the element sizes of radiating elements are the same, the peak gain is high and the frequency band width of the gain is expanded in Comparative Example 42 and Example 41 in which the element sizes of radiating elements in each sub-array are varied.

As in the case of Example 41, by varying the element sizes of the inner-side sub-arrays 3130-2, 3130-3 from the element sizes of the outer-side sub-arrays 3130-1, 3130-4, the peak gain is slightly lower than Comparative Example 42; however, the frequency band width of the gain is expanded.

Techniques as described in the first to third embodiments may be applied as techniques for varying the frequency characteristics of the impedances of two radiating elements in each sub-array and techniques for varying the frequency characteristics of the impedances of radiating elements between sub-arrays.

In Example 41, the "sub-array 3130-1", the "sub-array 3130-2", the "sub-array 3130-3", and the "sub-array 3130-4" respectively correspond to the "first radiating element", the "second radiating element", the "third radiating element", and the "fourth radiating element" in the present disclosure. In Example 41, each of the "radiating element 3131-1" and the "radiating element 3131-4" corresponds to the "fifth element" in the present disclosure. In Example 41, each of the "radiating element 3132-1" and the "radiating element 3132-4" corresponds to the "sixth element" in the present disclosure.

Example 42

Figure 55:
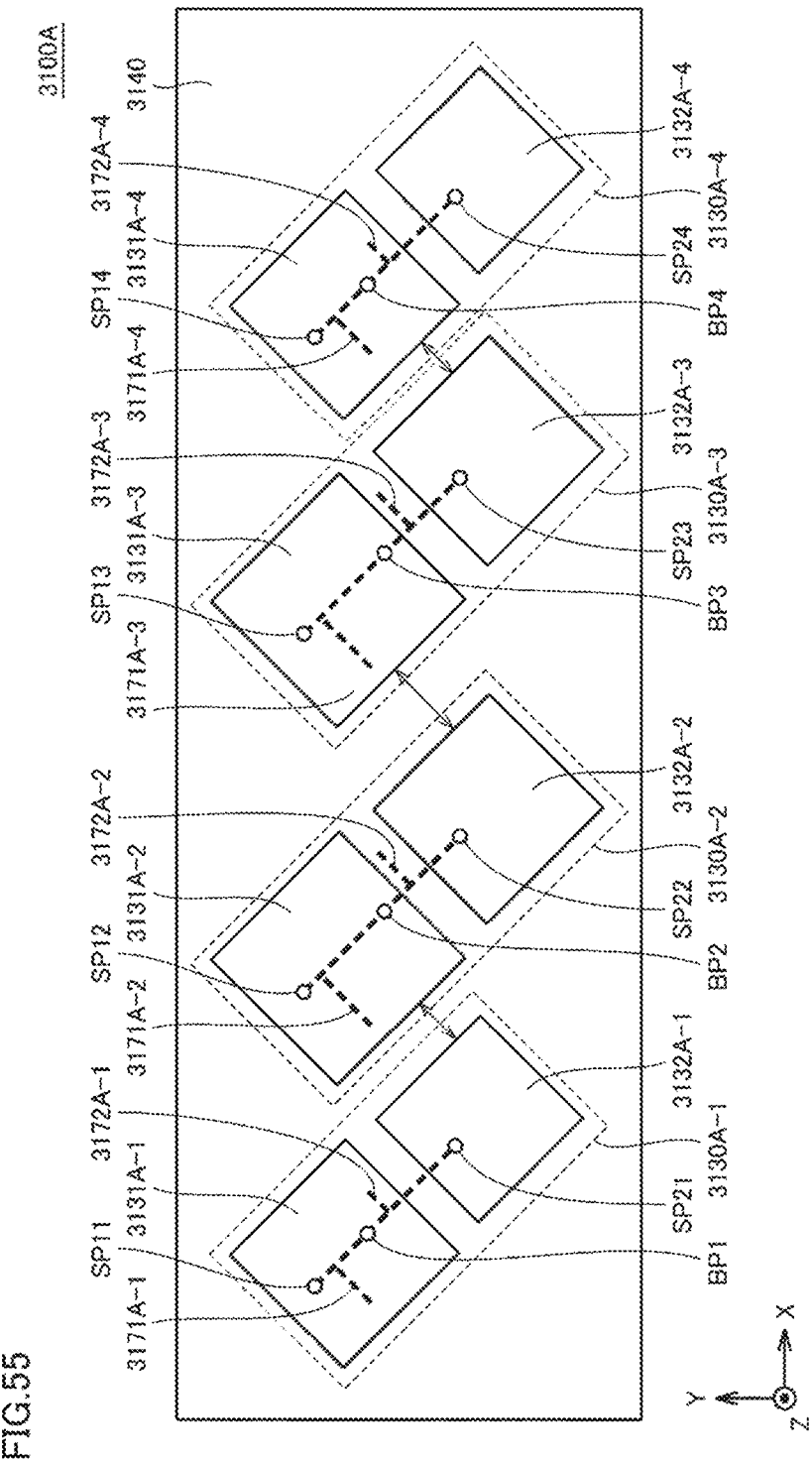
FIG. 55 is a plan view of an antenna module according to Example 42.

FIG. 55 is a plan view of an antenna module 3100A according to Example 42 to which these various techniques are collectively applied. In the antenna module 3100A, for two radiating elements in each sub-array, the distance from the branch point of a feed conductor to a feed point and the distance from the branch point of a feed conductor to a feed point may be set to mutually different lengths. Stubs with different lengths may be respectively disposed in wires from the branch point to the respective feed points, and, furthermore, the stubs may be respectively disposed at different locations. For the locations of the feed points of the respective radiating elements, the distance from the center of each radiating element may be different among the radiating elements. The spacing between radiating elements in each sub-array and/or the spacing between radiating elements of respective sub-arrays may be varied. In addition, the dielectric constant of a dielectric disposed between the ground electrode GND and each radiating element may be varied.

Various techniques described above may be applied solely or in combination. When the frequency characteristics of the impedances are adjusted by applying any one of the above-described techniques, two radiating elements in each sub-array may have the same element size.

Example 43

Figure 56:
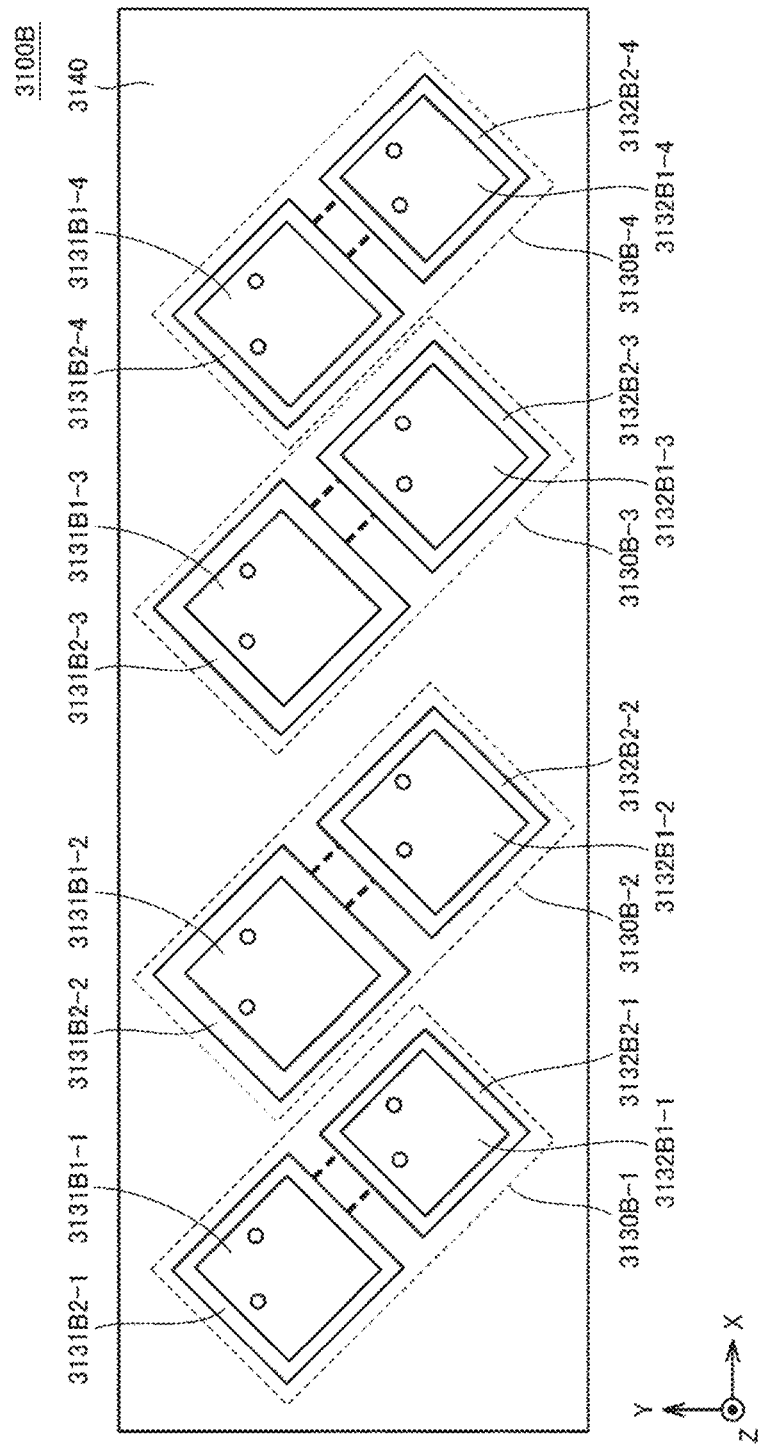
FIG. 56 is a plan view of an antenna module according to Example 43.

FIG. 56 is a plan view of an antenna module 3100B of Example 43, which is of a dual polarization type and a dual band type. Two radiating elements are included in each sub-array in the antenna module 3100B, and, in addition, each radiating element is made up of mutually opposite feed element and parasitic element.

Two feed points are disposed in each feed element such that orthogonal two polarized waves are radiated. Then, in two feed elements in each sub-array, a radio-frequency signal split from a common feed conductor is supplied to each feed point for radiating radio waves in the same polarization direction. The feed conductor extends through a passive wire and is coupled to the feed element.

With such a configuration of the antenna module 3100B as well, by applying the techniques as described in FIG. 53 and FIG. 55 to the relationship between the radiating elements (the feed element and the parasitic element) in each sub-array and the relationship between the radiating elements of the respective sub-arrays, the frequency band width of the antenna characteristics of the overall antenna module is expanded.

Figure 57:
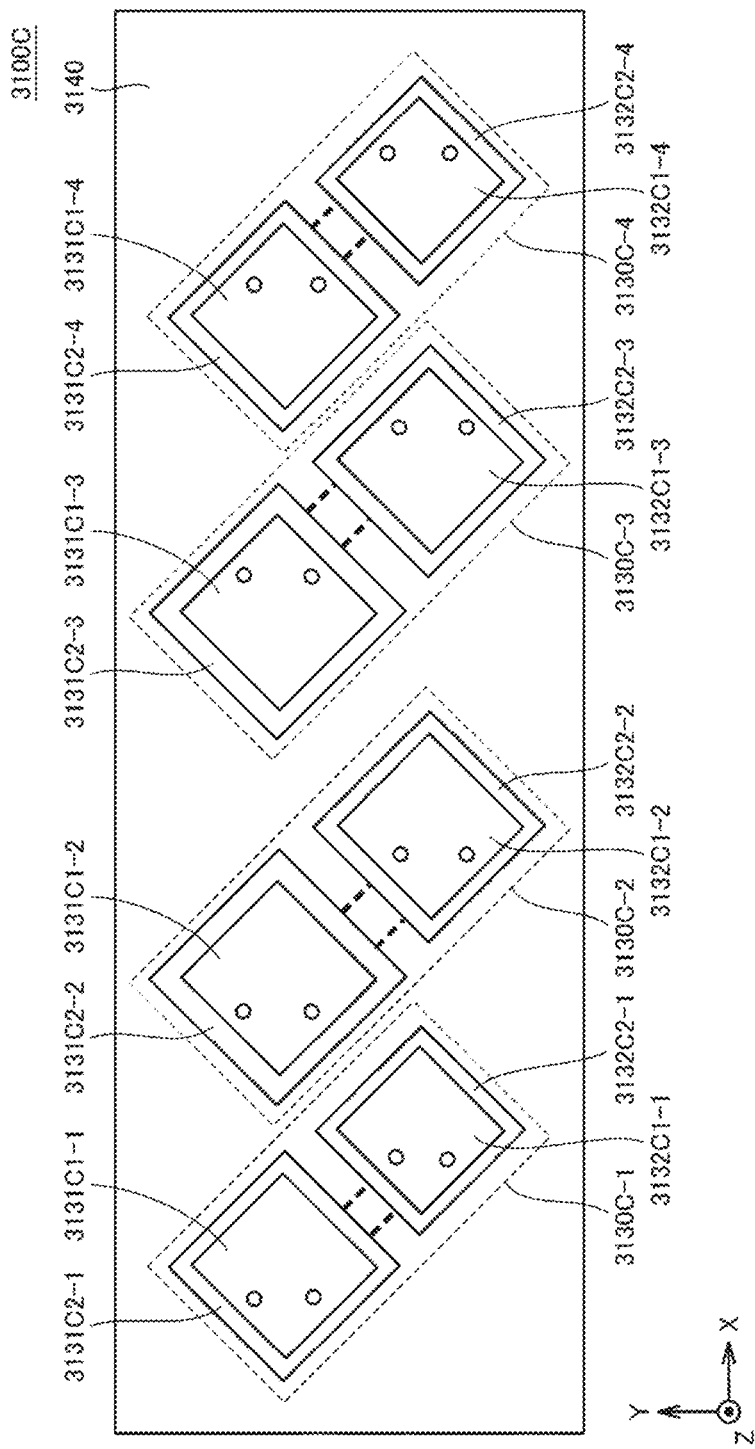
FIG. 57 is a plan view of an antenna module according to a first modification of Example 43.
Figure 58:
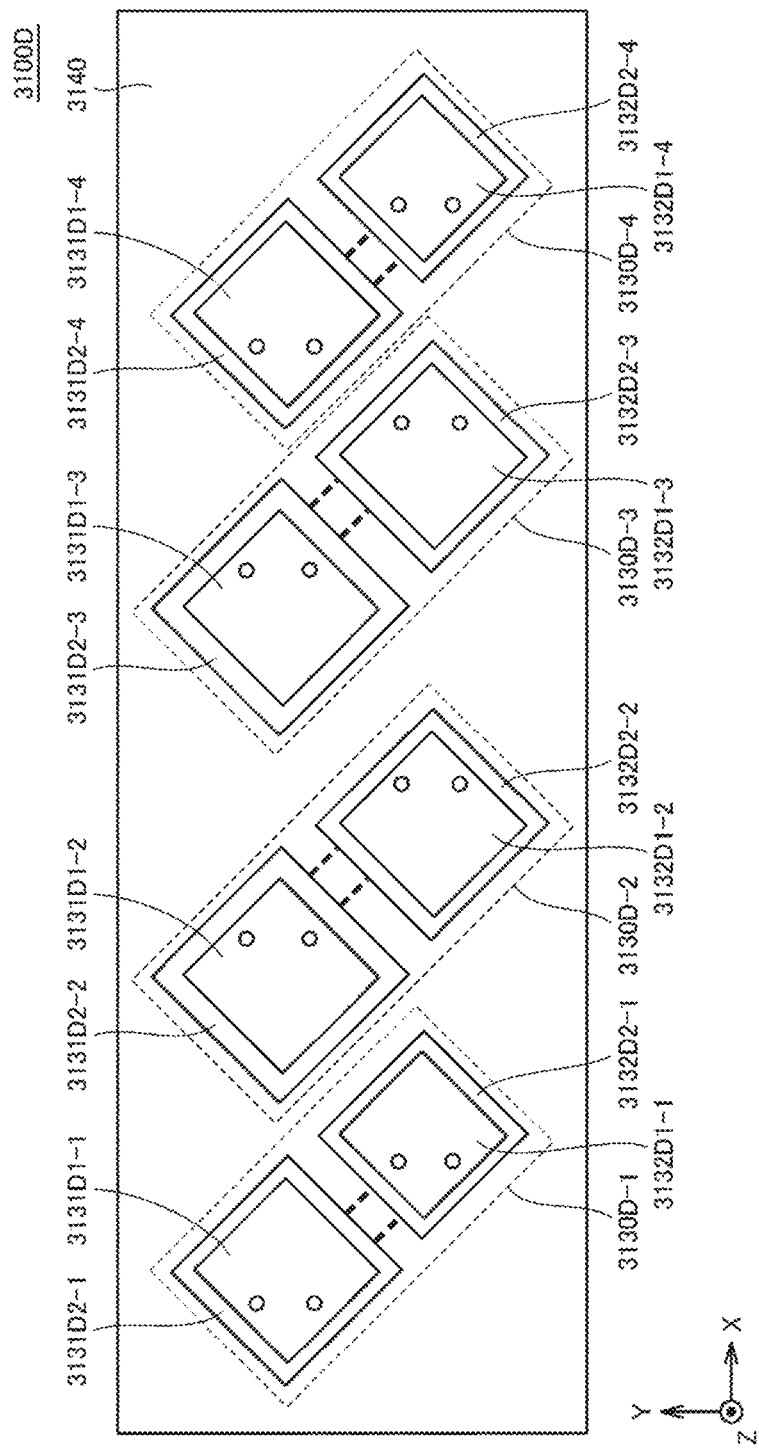
FIG. 58 is a plan view of an antenna module according to a second modification of Example 43.

FIG. 57 and FIG. 58 are views showing modifications of a dual polarization-type and dual band-type antenna module. In an antenna module 3100C of FIG. 57, two feed points of a sub-array 3130C-4 are disposed at locations opposite to the corresponding feed points in the sub-array 3130C-1. Two feed points of a sub-array 3130C-3 are disposed at locations opposite to the corresponding feed points in a sub-array 3130C-2.

With such a configuration of the antenna module 3100C, radio waves to be radiated from the sub-array 3130C-1 and radio waves to be radiated from the sub-array 3130C-4 are symmetric, and radio waves to be radiated from the sub-array 3130C-2 and radio waves to be radiated from the sub-array 3130C-3 are symmetric. Thus, the symmetry of the directivity of radiation from the overall antenna module 3100C is improved.

In an antenna module 3100D of FIG. 58, two feed points of a sub-array 3130D-2 are disposed at locations opposite to the corresponding feed points in the sub-array 3130D-1. Two feed points of a sub-array 3130C-4 are disposed at locations opposite to the corresponding feed points in a sub-array 3130C-3. The sub-array 3130D-1 and the sub-array 3130D-2 have different element sizes but radiate radio waves in the close frequency band widths that overlap each other. Therefore, by disposing the feed points on the opposite sides between the sub-array 3130D-1 and the sub-array 3130D-2, the directivity of radio waves to be radiated is improved for the sub-array 3130D-1 and the sub-array 3130D-2 as one unit. Then, by providing the sub-array 3130D-3 and the sub-array 3130D-4 with similar configurations, the symmetry of the directivity of radiation from the overall antenna module 3100D is improved.

Each of the radiating elements in each of the above-described embodiments may be an inverted-F patch antenna of which the end portion is connected to the ground electrode by way of a via as shown in Modification Example 3 of FIG. 39.

In Examples, the configuration in which the radiating elements and the ground electrode are formed in the same dielectric substrate has been described. Alternatively, as in the case of antenna modules of modifications shown in FIG. 59 to FIG. 61, a substrate in which radiating elements are formed and a substrate in which a ground electrode is formed may be separated, and these substrates may be connected by bonding, soldering, or the like.

Figure 59:
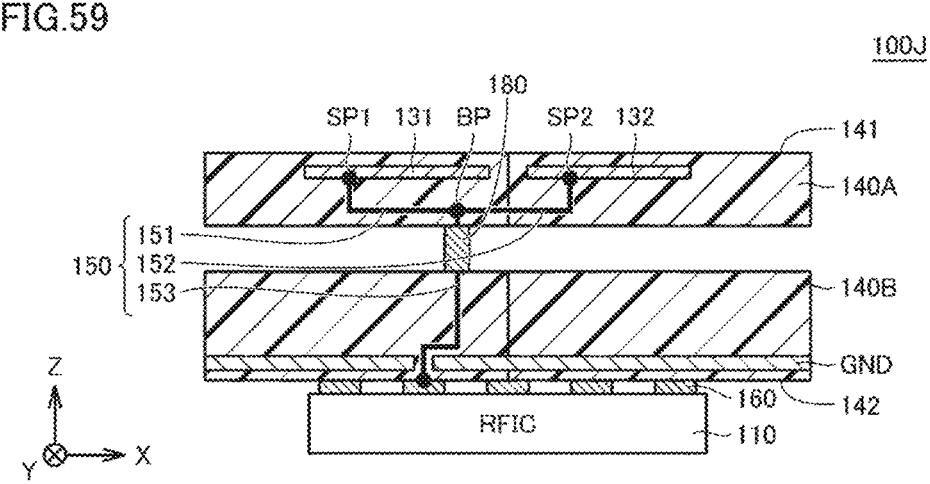
FIG. 59 is a side see-through view of an antenna module according to Modification Example 4.
Figure 60:
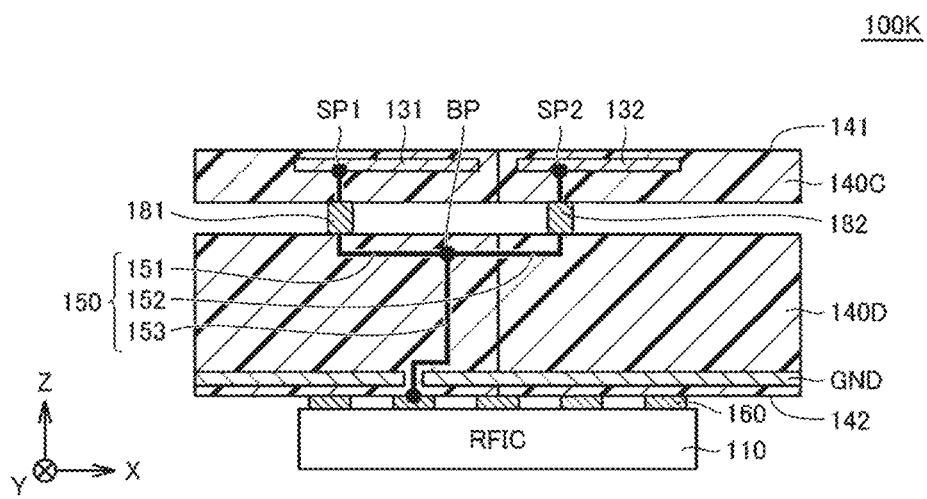
FIG. 60 is a side see-through view of an antenna module according to Modification Example 5.
Figure 61:
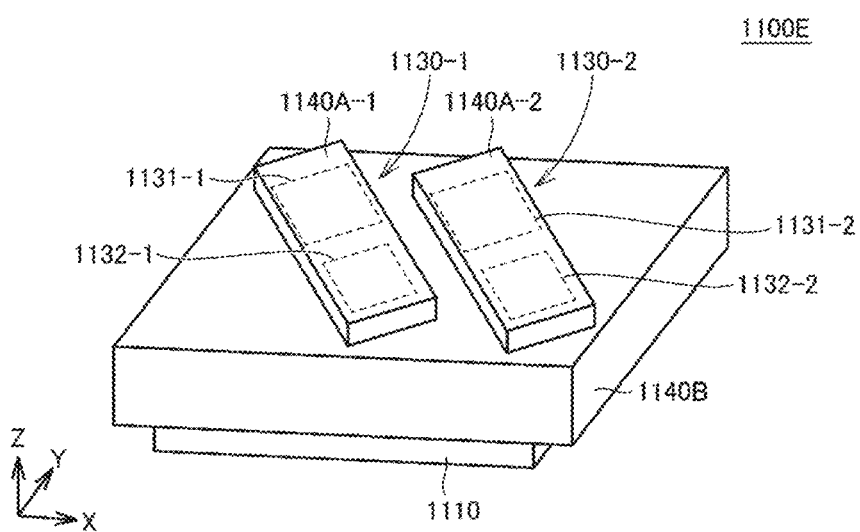
FIG. 61 is a perspective view of an antenna module according to Modification Example 6.

The antenna modules of FIG. 59 and FIG. 60 are modifications of the antenna module 100 of the first embodiment shown in FIG. 2. The antenna module of FIG. 61 is a modification of the antenna module 1100 of the second embodiment shown in FIG. 31. In FIG. 59 to FIG. 61, the description of elements that overlap those of FIG. 2 or FIG. 31 will not be repeated.

In an antenna module 100J of Modification Example 4 of FIG. 59, radiating elements 131, 132 are formed in a dielectric substrate 140A, and the ground electrode GND is formed in a dielectric substrate 140B. The common wire 153 transmits a radio-frequency signal from the dielectric substrate 140B to the dielectric substrate 140A via a solder bump 180. The common wire 153 bifurcates into the wire 151 and the wire 152 in the dielectric substrate 140A, and a radio-frequency signal is transmitted to the radiating elements 131, 132.

In an antenna module 100K of Modification Example 5 of FIG. 60, radiating elements 131, 132 are formed in a dielectric substrate 140C, and the ground electrode GND is formed in a dielectric substrate 140D. In the case of the antenna module 100K, the common wire 153 is disposed in the dielectric substrate 140D. The wire 151 branched off from the common wire 153 transmits a radio-frequency signal from the dielectric substrate 140D via a solder bump 181 to the radiating element 131 formed in the dielectric substrate 140C. The wire 152 branched off from the common wire 153 transmits a radio-frequency signal from the dielectric substrate 140D via a solder bump 182 to the radiating element 132 formed in the dielectric substrate 140C.

The dielectric substrate 140A in FIG. 59 and the dielectric substrate 140C in FIG. 60 each are, for example, the casing of a communication device.

In an antenna module 1100E of Modification Example 6 of FIG. 61, parts respectively corresponding to the sub-arrays 1130-1, 1130-2 that include radiating elements are respectively formed in dielectric substrates 1140A-1, 1140A-2, and the ground electrode GND is formed in a dielectric substrate 1140B. The dielectric substrates 1140A-1, 1140A-2 are connected by a solder bump (not shown), and a radio-frequency signal is transmitted from the dielectric substrate 1140B to radiating elements included in the sub-arrays 1130-1, 1130-2 via the solder bump.

As shown in FIG. 61, the dielectric substrates 1140A-1, 1140A-2 have sizes to such an extent that radiating elements of sub-arrays can be included, that is, the sizes (areas) of the dielectric substrates 1140A-1, 1140A-2 when the antenna module 1100E is viewed in plan are smaller than the dielectric substrate 1140B. In this way, the size of the dielectric substrate in which radiating elements are formed may be smaller than that of the dielectric substrate in which the ground electrode is formed.

The embodiments described above are illustrative in all respects and not restrictive. The scope of the present invention is recited not in the above description but in the appended claims. The present invention encompasses all modifications within the meaning and scope of equivalents of the appended claims.

REFERENCE SIGNS LIST 10 communication device
100, 100A to 100H, 100H1, 100H2, 100J, 100K, 100#, 1100, 1100A to 1100E, 1100#, 2100, 2100A to 2100F, 3100, 3100A to 3100D antenna module
110, 1110, 2110 RFIC
111A to 111D, 113A to 113D, 117 switch
112AR to 112DR low-noise amplifier
112AT to 112DT power amplifier
114A to 114D attenuator
115A to 115D signal phase shifter
116 signal combiner/splitter
118 mixer
119 amplifier circuit
120 antenna device
130, 130A to 130F, 130H, 130H1 to 130H4, 130H11 to 130H14, 130H21 to 130H24, 1130, 1130A to 1130D, 1130#, 3130, 3130A to 3130D sub-array
131, 131A to 131H, 131H1 to 131H4, 131H21 to 131H24, 131#, 132, 132A to 132H, 132H1 to 132H4, 132H21 to 132H24, 132#, 1131, 1131A to 1131D, 1131#, 1132, 1132A to 1132D, 1132#, 2130, 2130A to 2130F, 3131, 3131A, 3132, 3132A radiating element
131 #1, 131F1, 131G1, 132 #1, 132F1, 132G1, 3131B1 to 3131D1, 3132B1 to 3132D1 feed element
131 #2, 131F2, 131G2, 132 #2, 132F2, 132G2, 3131B2 to 3131D2, 3132B2 to 3132D2 parasitic element 140, 140A to 140D, 1140, 1140A, 1140B, 2140, 3140 dielectric substrate
141, 2141 surface
142, 2142 back surface
150, 155, 1150, 2150, 2150C, 2150D, 2150E feed conductor
151, 152, 156, 157 wire
153, 158 common wire
160, 180 to 182, 2160 solder bump
171, 172, 2170D, 3171A, 3172A, ST11, ST12, ST21, ST22 stub
200 BBIC
1401, 1402 dielectric
BP, BP1, BP2 branch point
CP1 to CP4 center
GND ground electrode
SP1, SP2, SP11 to SP14, SP21, SP22 feed point
V1, V2 via

The invention claimed is:

1. An antenna module that radiates a radio wave in response to receipt of a radio-frequency signal output from a feed circuit, the antenna module comprising:
a first radiating element that is flat and that radiates radio waves in a first polarization direction;
a second radiating element that is flat and that radiates radio waves in the first polarization direction;
a first feed conductor that supplies a radio-frequency signal from the feed circuit to the first radiating element;
a second feed conductor that supplies a radio-frequency signal from the feed circuit to the second radiating element; and
a ground electrode disposed opposite the first radiating element and the second radiating element, wherein
as viewed from the feed circuit, frequency characteristics of an impedance of the first radiating element are different from frequency characteristics of an impedance of the second radiating element, and
under a condition a frequency band in which a return loss is less than or equal to a predetermined value is defined as an operable band width in each of the radiating elements, the operable band width of the first radiating element partially overlaps the operable band width of the second radiating element.

2. The antenna module according to claim 1, wherein a size of the first radiating element is larger than a size of the second radiating element.

3. The antenna module according to claim 1, wherein a length of the first feed conductor is different from a length of the second feed conductor.

4. The antenna module according to claim 2, wherein a length of the first feed conductor is different from a length of the second feed conductor.

5. The antenna module according to claim 1, further comprising a first stub connected to the first feed conductor.

6. The antenna module according to claim 2, further comprising a first stub connected to the first feed conductor.

7. The antenna module according to claim 3, further comprising a first stub connected to the first feed conductor.

8. The antenna module according to claim 5, further comprising a second stub connected to the second feed conductor and different in length from the first stub.

9. The antenna module according to claim 1, further comprising:
a dielectric substrate on or in which the first radiating element, the second radiating element, and the ground electrode are disposed; and
an effective dielectric constant of a region between the first radiating element and the ground electrode is different from an effective dielectric constant of a region between the second radiating element and the ground electrode.

10. The antenna module according to claim 8, further comprising:
a dielectric substrate on or in which the first radiating element, the second radiating element, and the ground electrode are disposed; and
an effective dielectric constant of a region between the first radiating element and the ground electrode is different from an effective dielectric constant of a region between the second radiating element and the ground electrode.

11. The antenna module according to claim 1, wherein
the first feed conductor is connected to a first feed point of the first radiating element,
the second feed conductor is connected to a second feed point of the second radiating element, and
a distance from a center of the first radiating element to the first feed point is different from a distance from a center of the second radiating element to the second feed point.

12. The antenna module according to claim 1, wherein the first radiating element and the second radiating element are configured to radiate radio waves also in a second polarization direction different from the first polarization direction.

13. The antenna module according to claim 1, wherein each of the first radiating element and the second radiating element is configured to radiate radio waves in two different frequency bands.

14. The antenna module according to claim 13, wherein
the first radiating element includes
a first element, and
a second element disposed between the first element and the ground electrode and larger in size than the first element,
the second radiating element includes
a third element, and
a fourth element disposed between the third element and the ground electrode and larger in size than the third element,
the first feed conductor extends through the second element and is connected to the first element, and
the second feed conductor extends through the fourth element and is connected to the third element.

15. The antenna module according to claim 1, further comprising:
a third radiating element having the same configuration as the second radiating element;
a fourth radiating element having the same configuration as the first radiating element;
a third feed conductor that supplies a radio-frequency signal from the feed circuit to the third radiating element; and
a fourth feed conductor that supplies a radio-frequency signal from the feed circuit to the fourth radiating element, wherein
as viewed from the feed circuit,
frequency characteristics of an impedance of the third radiating element are the same as frequency characteristics of an impedance of the second radiating element,
frequency characteristics of an impedance of the fourth radiating element are the same as frequency characteristics of an impedance of the first radiating element, and the first radiating element to the fourth radiating element are arranged in a first direction in order of the first radiating element, the second radiating element, the third radiating element, and the fourth radiating element.

16. The antenna module according to claim 15, wherein
a pitch between the first radiating element and the second radiating element is different from a pitch between the second radiating element and the third radiating element, and
a pitch between the first radiating element and the second radiating element is equal to a pitch between the third radiating element and the fourth radiating element.

17. The antenna module according to claim 15, wherein
each of the first radiating element to the fourth radiating element makes up a sub-array that includes a fifth element and a sixth element disposed adjacent to each other in a second direction different from the first direction,
in each of the sub-arrays,
a common radio-frequency signal is supplied to each of the fifth element and the sixth element from an associated feed conductor, and
as the fifth element and the sixth element are viewed from a branch point of the feed conductor, frequency characteristics of an impedance of the fifth element are different from frequency characteristics of an impedance of the sixth element, and
an angle formed between the first direction and the second direction is larger than 0° and smaller than 90°.

18. The antenna module according to claim 16, wherein
each of the first radiating element to the fourth radiating element makes up a sub-array that includes a fifth element and a sixth element disposed adjacent to each other in a second direction different from the first direction,
in each of the sub-arrays,
a common radio-frequency signal is supplied to each of the fifth element and the sixth element from an associated feed conductor, and
as the fifth element and the sixth element are viewed from a branch point of the feed conductor, frequency characteristics of an impedance of the fifth element are different from frequency characteristics of an impedance of the sixth element, and
an angle formed between the first direction and the second direction is larger than 0° and smaller than 90°.

19. The antenna module according to claim 1, further comprising the feed circuit.

20. A communication device equipped with the antenna module according to claim 1.

* * * * *